(12) United States Patent
Xiong et al.

(10) Patent No.: US 12,511,006 B2
(45) Date of Patent: Dec. 30, 2025

(54) METHOD FOR SHARING INPUT DEVICE, ELECTRONIC DEVICE, AND SYSTEM

(71) Applicant: Huawei Technologies Co., Ltd., Shenzhen (CN)

(72) Inventors: Bin Xiong, Wuhan (CN); Binfei Li, Shenzhen (CN); Puliang Luo, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 18/254,984

(22) PCT Filed: Nov. 29, 2021

(86) PCT No.: PCT/CN2021/134032
§ 371 (c)(1),
(2) Date: May 30, 2023

(87) PCT Pub. No.: WO2022/111690
PCT Pub. Date: Jun. 2, 2022

(65) Prior Publication Data
US 2024/0045557 A1    Feb. 8, 2024

(30) Foreign Application Priority Data

Nov. 30, 2020   (CN) .......................... 202011377539.0
Jan. 30, 2021   (CN) .......................... 202110131920.7

(51) Int. Cl.
*G06F 3/0481*    (2022.01)
*G06F 3/0354*    (2013.01)
*G06F 3/0487*    (2013.01)

(52) U.S. Cl.
CPC ........ *G06F 3/0481* (2013.01); *G06F 3/03543* (2013.01); *G06F 3/0487* (2013.01);
(Continued)

(58) Field of Classification Search
CPC .. G06F 3/0481; G06F 3/03543; G06F 3/0487; G06F 2203/0381; G06F 2203/0384; G06F 3/04812; G06F 3/0354
See application file for complete search history.

(56) References Cited

U.S. PATENT DOCUMENTS

2009/0027302 A1*  1/2009  Li .......................... G06F 3/1454
                                                                345/1.1
2012/0262372 A1* 10/2012  Kim ...................... G06F 1/1694
                                                                345/158

FOREIGN PATENT DOCUMENTS

CN    101354639 A    1/2009
CN    103425408 A   12/2013
(Continued)

OTHER PUBLICATIONS

"Introducing scrcpy~rom 1v/blog," Mar. 8, 2018, 30 pages.

*Primary Examiner* — Patrick N Edouard
*Assistant Examiner* — Joseph P Fox
(74) *Attorney, Agent, or Firm* — Conley Rose, P.C

(57) ABSTRACT

After a first electronic device establishes a first connection to a second electronic device, a mouse pointer of the first electronic device may cross a boundary of a display interface and appear in a display interface of the second electronic device. When the mouse pointer is displayed on a display of the second electronic device, each time a user performs an input operation by using an input device, such as a mouse or a keyboard, of the first electronic device, the second electronic device may receive an input event from the first electronic device, and make a corresponding response to the input event. At the same time, the input event on the first electronic device side is shielded.

20 Claims, 34 Drawing Sheets

(52) U.S. Cl.
CPC ................ *G06F 2203/0381* (2013.01); *G06F 2203/0384* (2013.01)

(56) References Cited

FOREIGN PATENT DOCUMENTS

| | | |
|---|---|---|
| CN | 106293160 A | 1/2017 |
| CN | 109388257 A | 2/2019 |
| EP | 0172433 A2 * | 2/1984 |

* cited by examiner

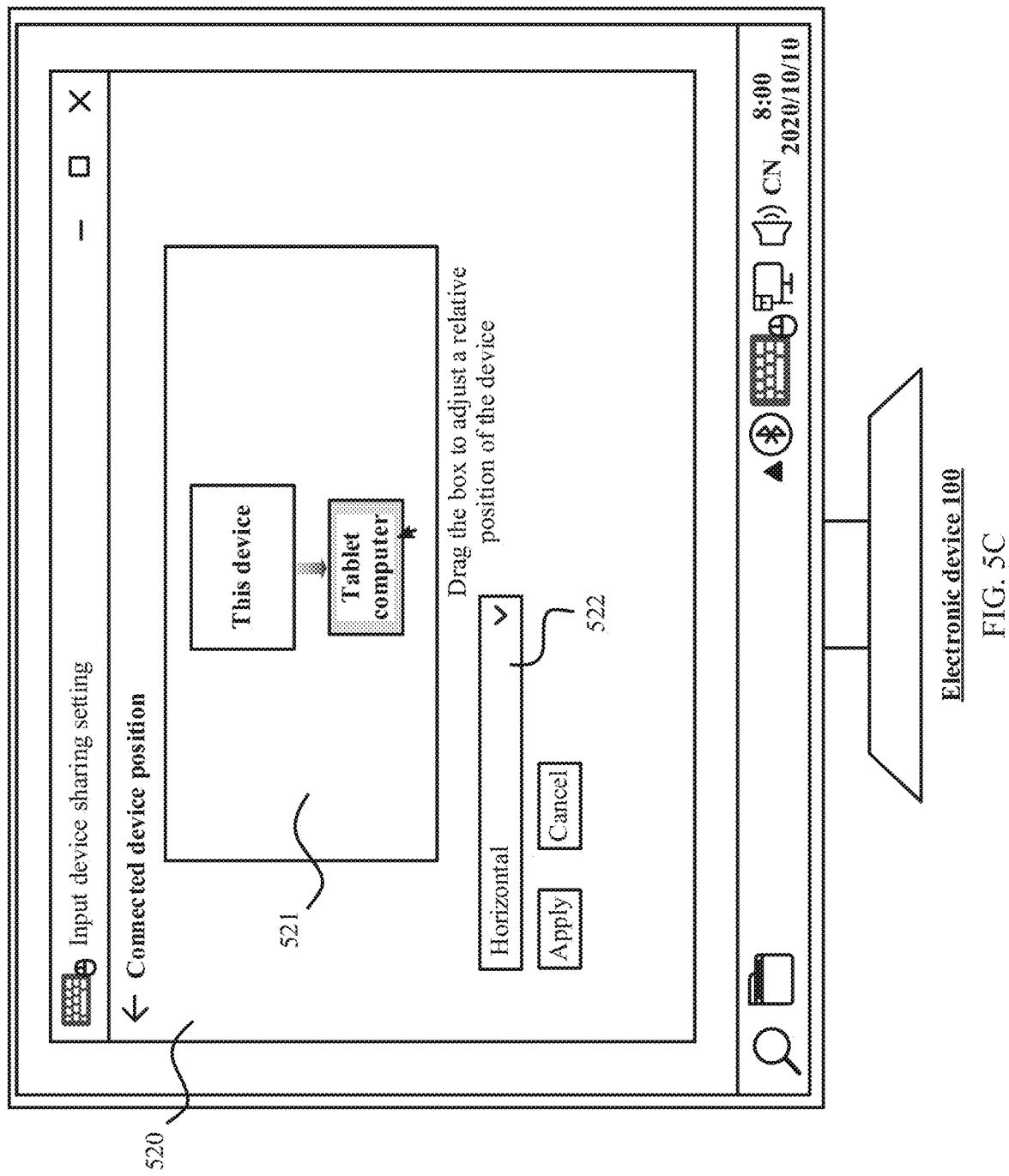

FIG. 6A-1

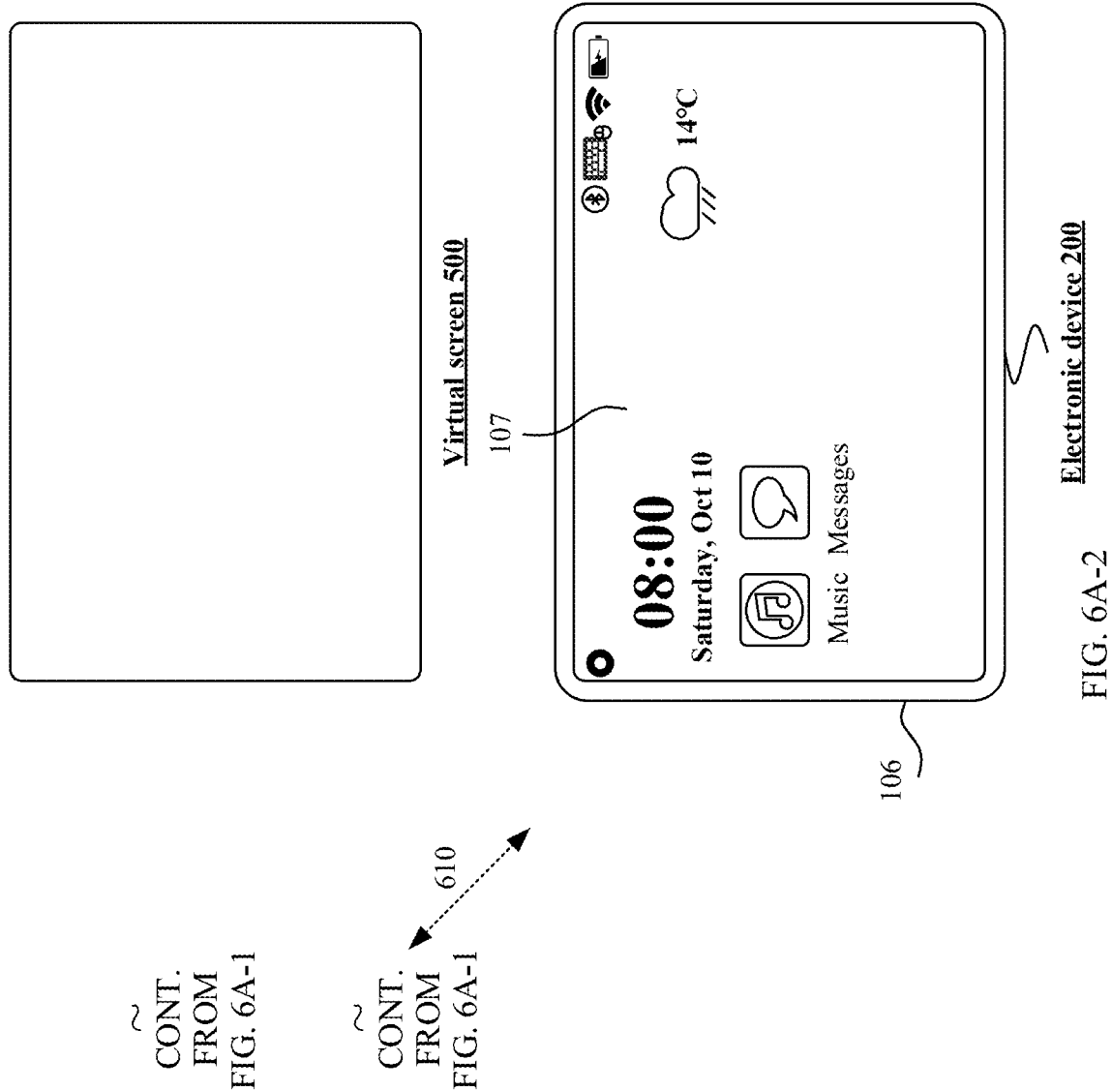

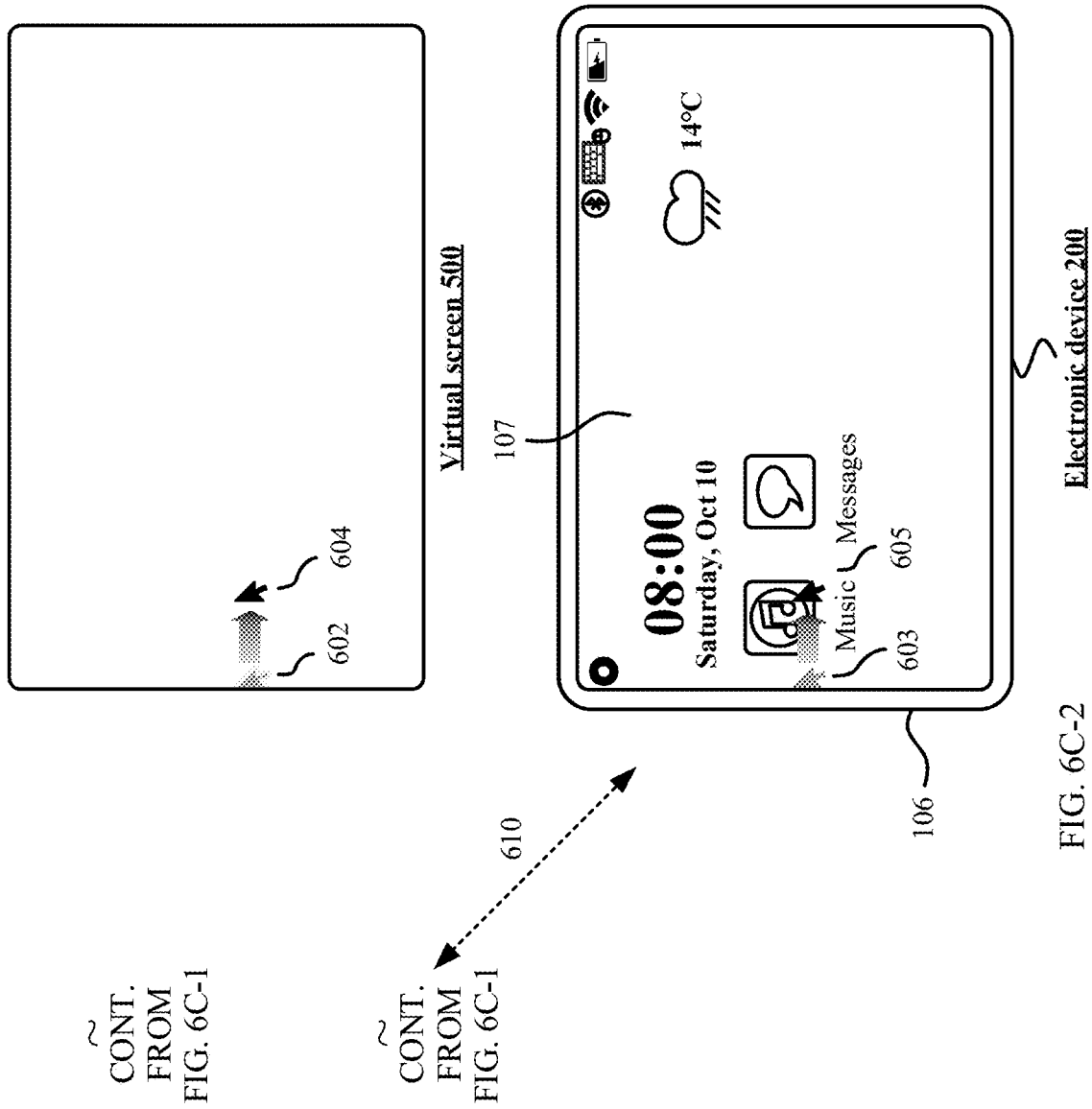

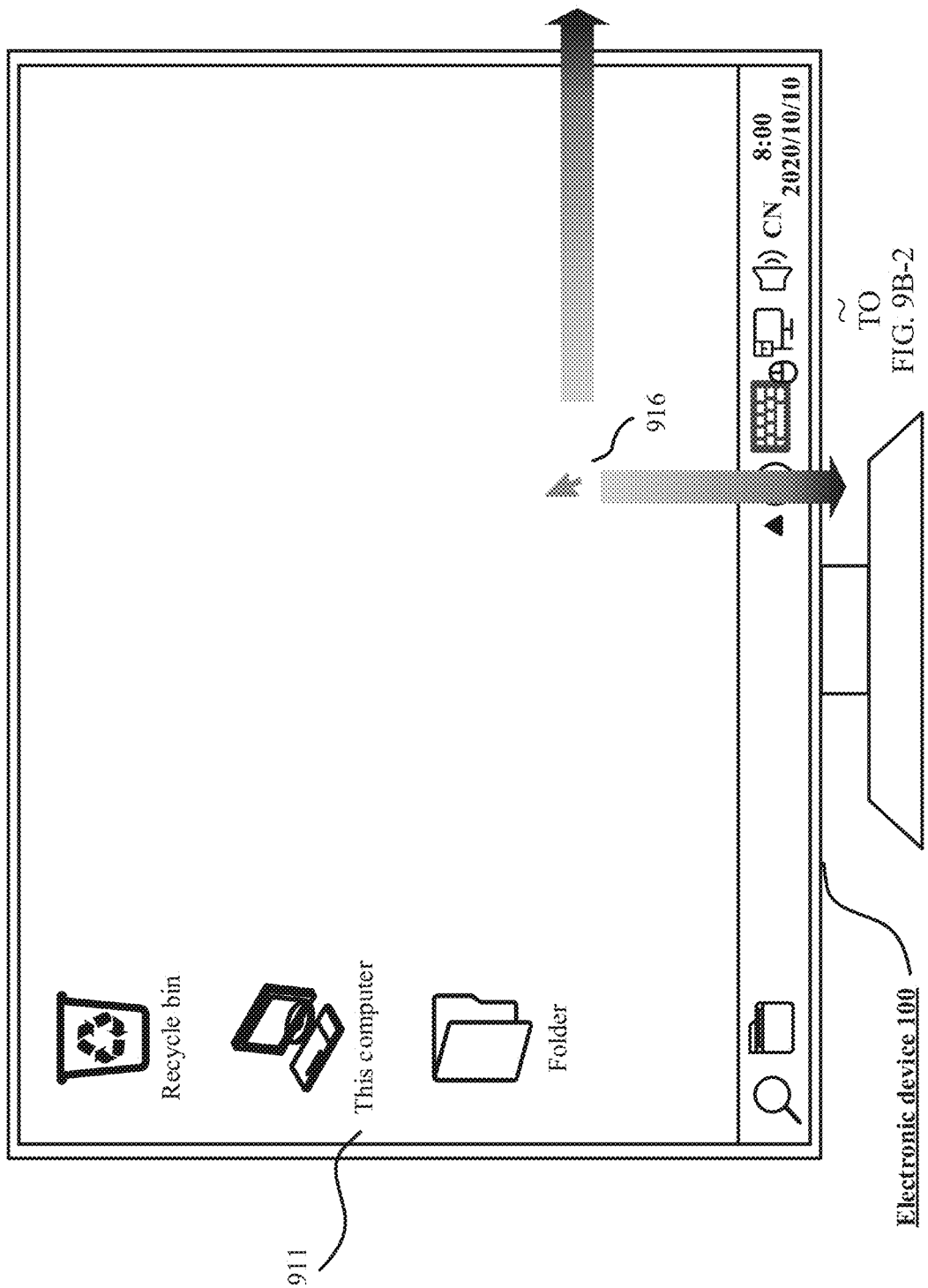

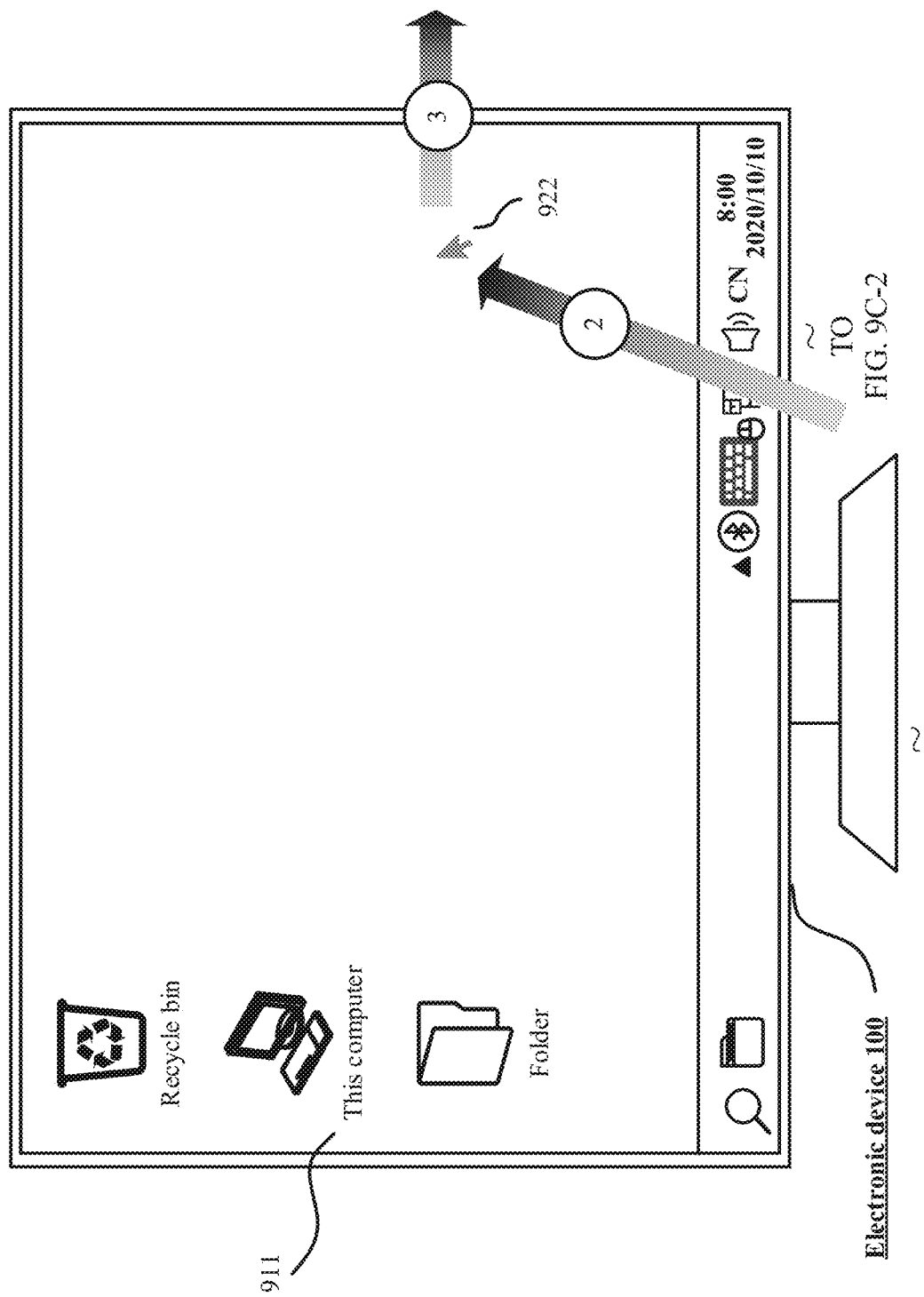

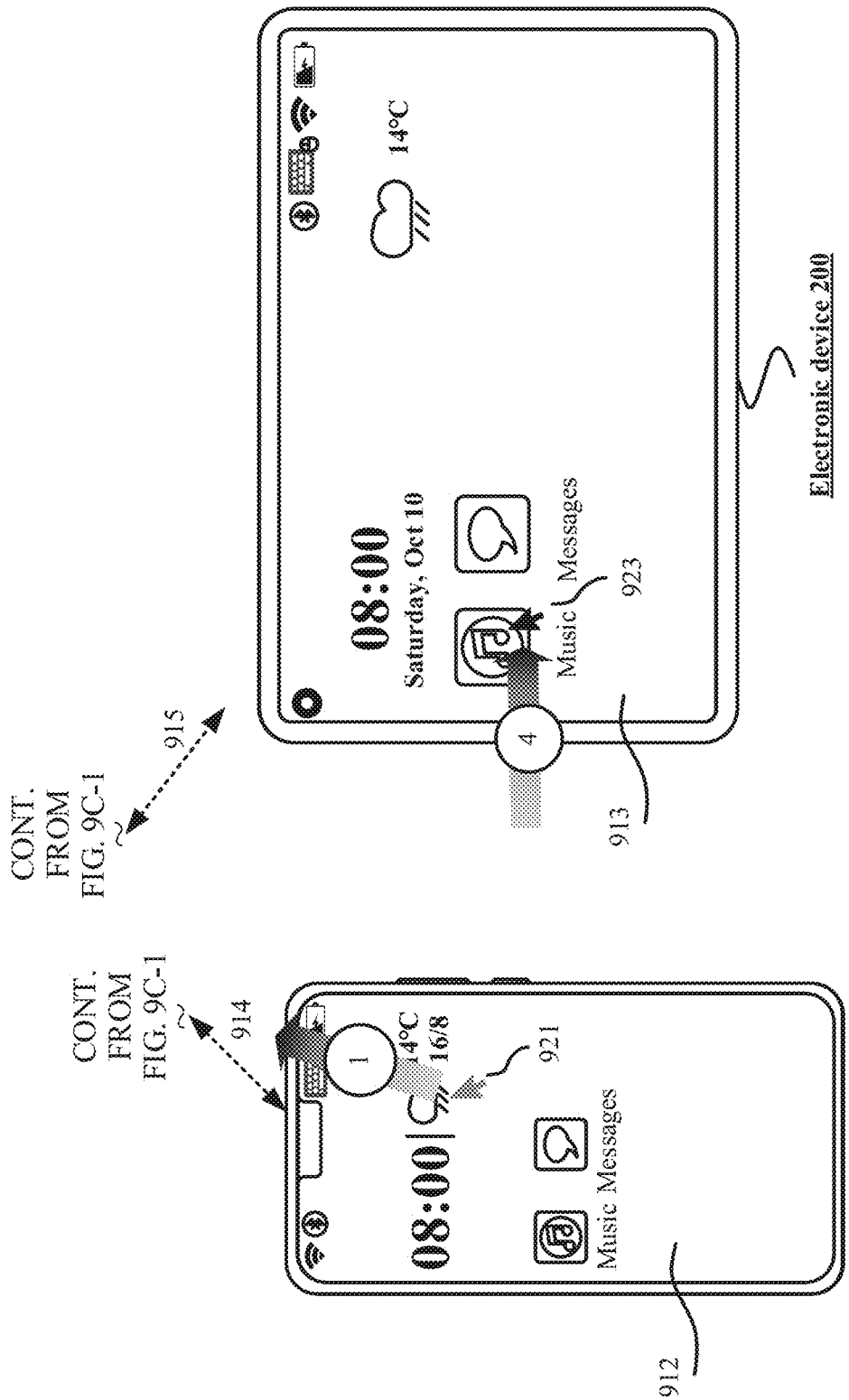

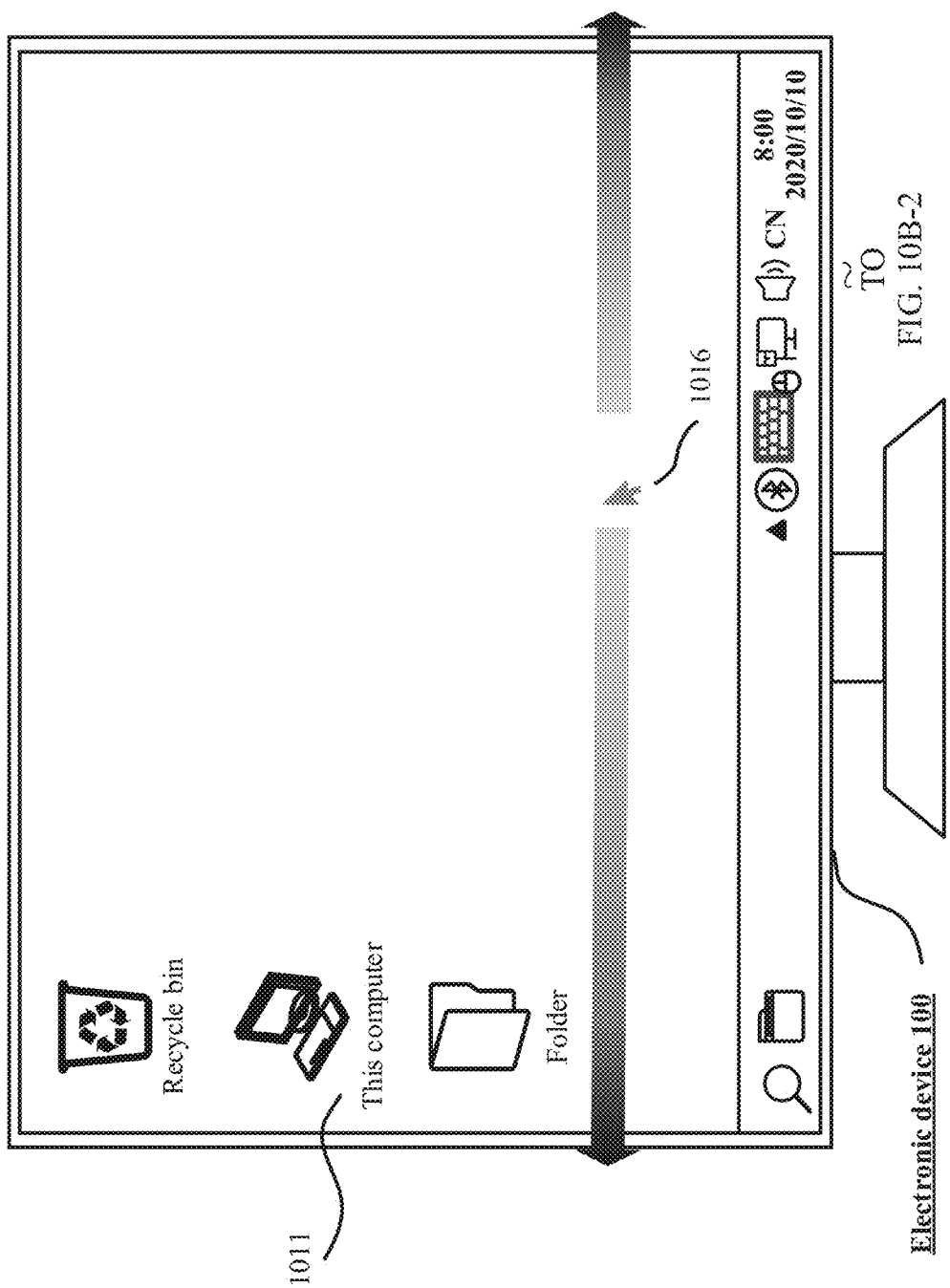

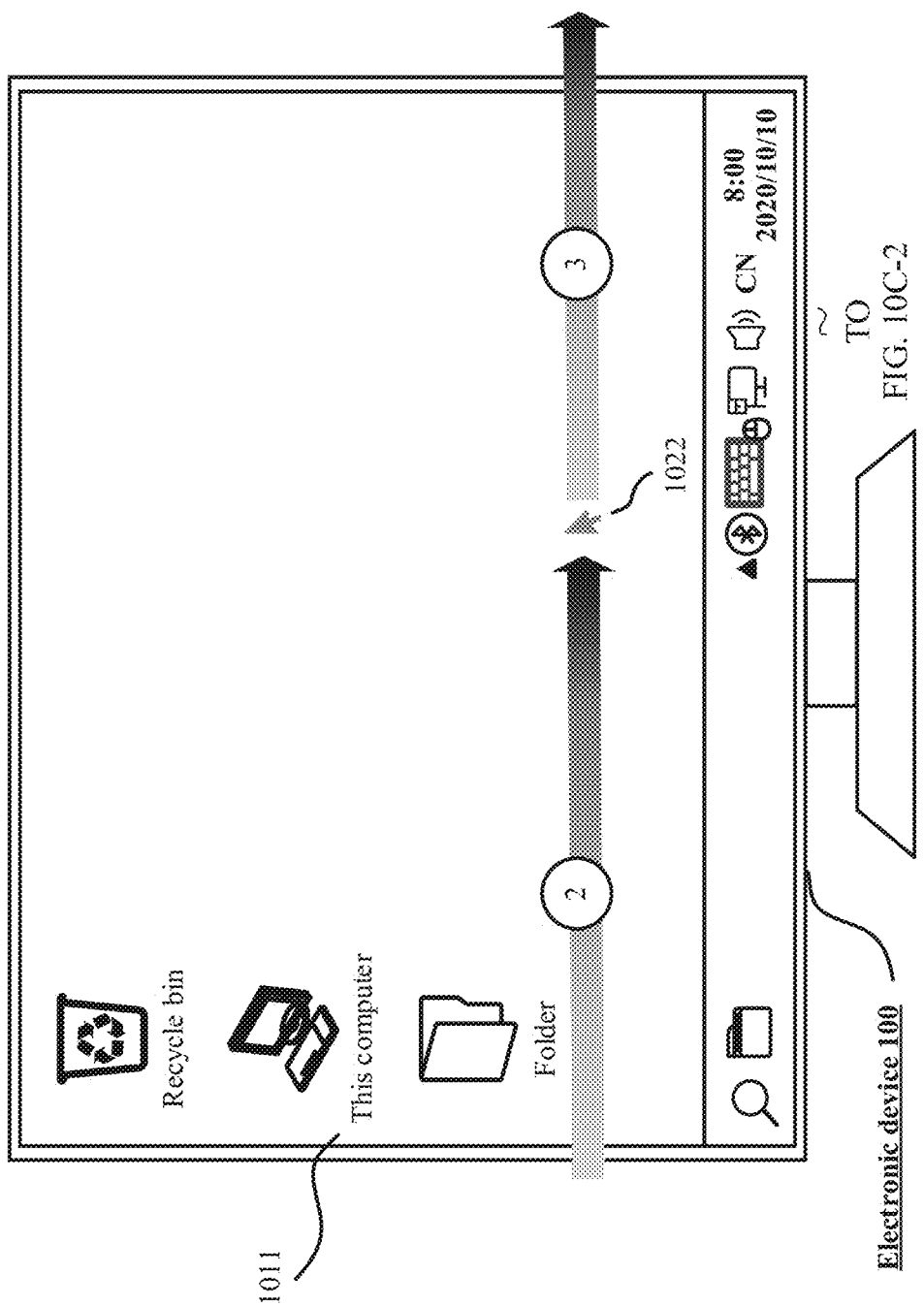

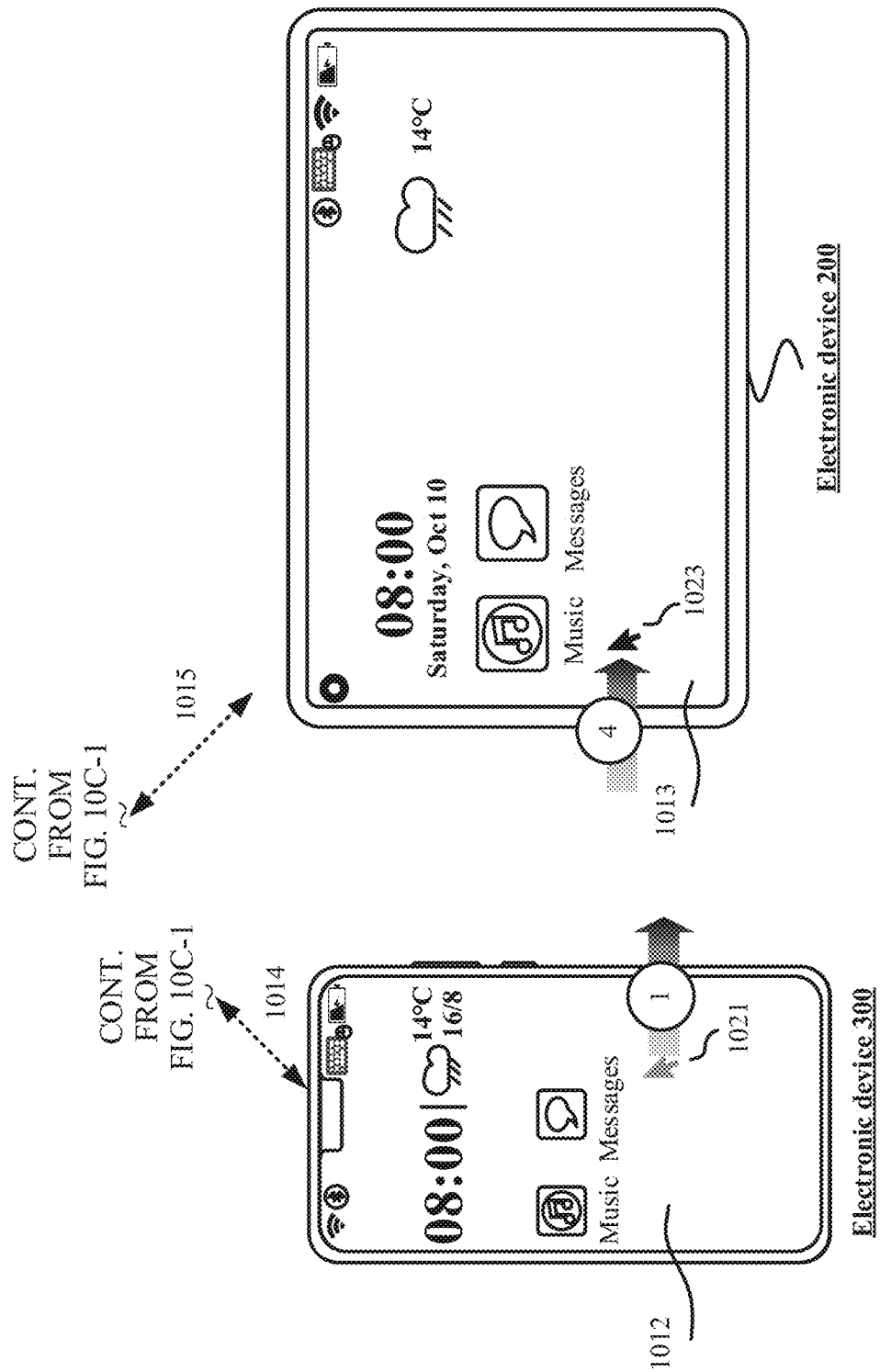

METHOD FOR SHARING INPUT DEVICE, ELECTRONIC DEVICE, AND SYSTEM

CROSS-REFERENCE TO RELATED APPLICATIONS

This is a U.S. National Stage of International Patent Application No. PCT/CN2021/134032 filed on Nov. 29, 2021, which claims priority to Chinese Patent Application No. 202011377539.0 filed on Nov. 30, 2020 and Chinese Patent Application No. 202110131920.7 filed on Jan. 30, 2021. All of the aforementioned applications are incorporated herein by reference in their entireties.

TECHNICAL FIELD

This application relates to the terminal field, and in particular, to a method for sharing an input device, an electronic device, and a system.

BACKGROUND

In daily life, there are various types of intelligent terminal devices, including mobile phones, personal computers (personal computers, PCs), tablet computers (portable android devices, PADs), televisions, and the like. Because terminal devices are independent of each other, and there may be differences in ecosystems between terminals (for example, a PC runs Windows® and a tablet computer runs Android®), each electronic device has an input device matching the electronic device, and input devices of different electronic devices cannot be shared. This causes input device redundancy, and a user needs to switch between input devices when using different electronic devices, which is inconvenient for the user and reduces user experience.

SUMMARY

This application provides a method for sharing an input device, a related electronic device, and a system, to support a user to perform input operations on different electronic devices by using a same input device.

The foregoing objective and other objectives are achieved by using features in the independent claims. Further implementations are embodied in the dependent claims, the specification, and the accompanying drawings.

According to a first aspect, an embodiment of this application provides a method for sharing an input device. The method includes: A first electronic device establishes a first connection to a second electronic device. The first electronic device detects a first movement operation. The first movement operation is an operation of indicating a first cursor to move out of a first display interface of the first electronic device, the first movement operation corresponds to a third offset, and the third offset represents that the first cursor moves out of the first display interface. Then, the first electronic device may send a first message to the second electronic device through the first connection. The first message may notify the second electronic device to display a second cursor. The second electronic device may display the second cursor at a first position in a second display interface based on the first message. After the second cursor is displayed on the second electronic device, the first electronic device detects a second movement operation. The second movement operation corresponds to a first offset. The first electronic device sends a second message to the second electronic device through the first connection. The second message carries the first offset. The second electronic device moves the second cursor from the first position to a second position. An offset of the second position relative to the first position is the first offset. For example, in some embodiments, after a PC establishes a connection to a PAD, an input device such as a mouse or a keyboard of the PC may be used to perform an input on the PAD. When a mouse pointer on the PC moves to a boundary of a display interface of the PC and continues to move outside the boundary, the PC sends a message to the PAD, to notify the PAD to display the mouse pointer. In response to the message of the PC, the PAD may display the mouse pointer in a display interface. Then, when a user inputs content by using the input device of the PC, the PAD may receive and respond to an input event from the PC. For example, when the user moves the mouse for a specific distance, the mouse pointer on the PAD may move a corresponding offset. When the user enters characters on the keyboard of the PC, the entered characters can be displayed on the PAD.

By implementing the method in the first aspect, a plurality of electronic devices may share an input device, and an input device of the first electronic device may be used to perform an input on the second electronic device. For example, the user may use the mouse and keyboard of the PC to perform an input on the PAD. According to the method, an input operation of the user can be more coherent, and the input operation can be quickly and conveniently switched between different devices without switching between input devices. This improves input experience of the user.

With reference to the first aspect, in some embodiments, the method may further include: The first electronic device detects a third movement operation. The third movement operation is an operation of indicating the second cursor to move out of the second display interface of the second electronic device, the third movement operation corresponds to a second offset, and the second offset represents that the second cursor moves out of the second display interface of the second electronic device. The first electronic device displays the first cursor at a third position in the first display interface. For example, when the mouse pointer reaches the boundary of the display interface of the PAD and continues to move outward, the mouse pointer may be displayed in the display interface of the PC again.

With reference to the first aspect, in some embodiments, the first electronic device includes a first input device, and the first input device may include one or more of the following: a mouse, a keyboard, a handwriting pad, a camera, a touchpad, a scanner, a stylus, a remote control lever, a voice input apparatus, and the like.

With reference to the first aspect, in some embodiments, the first movement operation, the second movement operation, or the third movement operation is detected by the first input device by using the first input device.

With reference to the first aspect, in some embodiments, the first position is located on a second boundary of the second display interface, and the third position is located on a first boundary of the first display interface.

With reference to the first aspect, in some embodiments, the first movement Operation, the second movement operation, or the third movement operation is an operation of moving the mouse by the user, operating a touch-sensitive panel by the user, operating the keyboard by the user, operating the handwriting pad by the user, operating the remote control lever by the user, operating the voice input apparatus by the user, moving eyes by the user, or inputting a program instruction for instructing a cursor to move.

With reference to the first aspect, in some embodiments, the first message carries coordinates of the first position.

With reference to the first aspect, in some embodiments, if the first position is located on a boundary of the second display interface, the first offset is used to indicate the second cursor to move towards the second display interface.

With reference to the first aspect, in some embodiments, the first display interface has four boundaries, the four boundaries are an upper boundary, a lower boundary, a left boundary, and a right boundary of the display interface in a forward layout, the second display interface has four boundaries, and the four boundaries are an upper boundary, a lower boundary, a left boundary, and a right boundary of the display interface in a forward layout. If the first boundary is the left boundary of the first display interface, the second boundary is the right boundary of the second display interface; if the first boundary is the right boundary of the first display interface, the second boundary is the left boundary of the second display interface; if the first boundary is the upper boundary of the first display interface, the second boundary is the lower boundary of the second display interface; or if the first boundary is the lower boundary of the first display interface, the second boundary is the upper boundary of the second display interface.

With reference to the first aspect, in some embodiments, the first electronic device runs a first operating system, and the second electronic device runs a second operating system.

With reference to the first aspect, in some embodiments, the method further includes: When the second cursor is displayed in the second display interface, the first electronic device detects a first input event. The first input event comes from an input operation collected by the first input device of the first electronic device. The first electronic device maps the first input event to a second input event. The first electronic device stores a first mapping table, and the first mapping table stores a mapping relationship between the first input event and the second input event. The first electronic device sends a third message to the second electronic device. The third message carries the second input event. The second electronic device receives the second input event.

With reference to the first aspect, in some embodiments, when the first input device is a keyboard, the first input event includes a first key code value generated when the user taps the keyboard, and the second input event includes a second key code value. A character or a control command corresponding to the first key code value in the first operating system is consistent with a character or a control command corresponding to the second key code value in the second operating system.

With reference to the first aspect, in some embodiments, a display area of the first display interface is a visible area corresponding to first resolution, and a display area of the second display interface is a visible area corresponding to second resolution.

With reference to the first aspect, in some embodiments, the method further includes: After the first electronic device detects the first movement operation, the first electronic device determines, based on coordinates of the first cursor in the first display interface, the first resolution of the first display interface, and the second resolution of the second display interface obtained from the second electronic device, the coordinates of the first position of the second cursor displayed in the second display interface.

With reference to the first aspect, in some embodiments, the method further includes: The first electronic device creates a virtual screen. Resolution of the virtual screen is the second resolution. When the second electronic device displays the second cursor at the first position in the second display interface, the first electronic device moves the first cursor to a fourth position on the virtual screen. Coordinate values of the fourth position and the first position are the same. When detecting the second movement operation, the first electronic device moves the first cursor from the fourth position to a fifth position. Coordinate values of the fifth position and the second position are the same. For example, the PC creates a virtual screen whose resolution is the same as that of a display of the PAD. After moving out of a boundary of a display of the PC, the mouse pointer moves to the virtual screen, and a mouse pointer is simultaneously displayed on the display of the PAD. A position of the mouse pointer on the virtual screen corresponds to a coordinate position of the mouse pointer displayed on the PAD, and coordinate values are the same. In this way, coordinates of the mouse pointer on the virtual screen may be directly sent to the PAD, and complex coordinate conversion is not required. This saves processor power consumption.

With reference to the first aspect, in some embodiments, when the second cursor is displayed in the second display interface, the first cursor is not displayed in the first display interface of the first electronic device. For example, when the mouse pointer is displayed in the display interface of the PAD, an input event on the PC side may be shielded. In other words, the PC does not respond to the input event of the input device.

With reference to the first aspect, in some embodiments, the method further includes: When a display interface layout of the second electronic device changes from the second display interface to a third display interface, the second electronic device changes a position of the second cursor from the second position to a sixth position. The second display interface and the third display interface include a same interface element, and resolution of the second display interface is different from resolution of the third display interface. For example, when the PAD switches from a landscape mode to a portrait mode, if a layout of the display interface of the PAD changes, a position of the mouse pointer may change accordingly, and the mouse pointer may point to a same pixel or a same interface element. Alternatively, when a foldable phone switches between an unfolded state and a folded state, a position of the mouse pointer may also change with the display interface.

With reference to the first aspect, in some embodiments, the second position and the sixth position point to a same interface element.

According to a second aspect, an embodiment of this application provides a method for sharing an input device, applied to a first electronic device. The method includes: The first electronic device establishes a first connection to a second electronic device. The first electronic device detects a first movement operation. The first movement operation is an operation of indicating a first cursor to move out of a first display interface of the first electronic device, the first movement operation corresponds to a third offset, and the third offset represents that the first cursor moves out of the first display interface. The first electronic device sends a first message to the second electronic device through the first connection. The first message notifies the second electronic device to display a second cursor. The first electronic device detects a second movement operation. The second movement operation corresponds to a first offset. The first electronic device sends a second message to the second electronic device through the first connection. The second message carries the first offset, the second message notifies the second electronic device to move the second cursor from a first position to a second position, and an offset of the second position relative to the first position is the first offset. For example, in some embodiments, after a PC establishes a connection to a PAD, an input device such as a mouse or a keyboard of the PC may be used to perform an input on the PAD. When a mouse pointer on the PC moves to a boundary of a display interface of the PC and continues to move outside the boundary, the PC sends a message to the PAD, to notify the PAD to display the mouse pointer. In response to the message of the PC, the PAD may display the mouse pointer in a display interface. Then, when a user inputs content by using the input device of the PC, the PAD may receive and respond to an input event from the PC. For example, when the user moves the mouse for a specific distance, the mouse pointer on the PAD may move a corresponding offset. When the user enters characters on the keyboard of the PC, the entered characters can be displayed on the PAD.

By implementing the method in the second aspect, a plurality of electronic devices may share an input device, and an input device of the first electronic device may be used to perform an input on the second electronic device. For example, the user may use the mouse and keyboard of the PC to perform an input on the PAD. According to the method, an input operation of the user can be more coherent, and the input operation can be quickly and conveniently switched between different devices without switching between input devices. This improves input experience of the user.

With reference to the second aspect, in some embodiments, the method further includes: The first electronic device detects a third movement operation. The third movement operation is an operation of indicating the second cursor to move out of a second display interface of the second electronic device, the third movement operation corresponds to a second offset, and the second offset may represent that the second cursor moves out of the second display interface of the second electronic device. The first electronic device displays the first cursor at a third position in the first display interface.

With reference to the second aspect, in some embodiments, the first electronic device includes a first input device, and the first input device may include one or more of the following: a mouse, a keyboard, a handwriting pad, a camera, a touchpad, a scanner, a stylus, a remote control lever, a voice input apparatus, and the like.

With reference to the second aspect, in some embodiments, the first movement operation, the second movement operation, or the third movement operation is detected by the first input device by using the first input device.

With reference to the second aspect, in some embodiments, the first position is located on a second boundary of the second display interface, and the third position is located on a first boundary of the first display interface.

With reference to the second aspect, in some embodiments, the first movement operation, the second movement operation, or the third movement operation is an operation of moving the mouse by the user, operating a touch-sensitive panel by the user, operating the keyboard by the user, operating the handwriting pad by the user, operating the remote control lever by the user, operating the voice input apparatus by the user, moving eyes by the user, or inputting a program instruction for instructing a cursor to move.

With reference to the second aspect, in some embodiments, the first message carries coordinates of the first position.

With reference to the second aspect, in some embodiments, if the first position is located on a boundary of the second display interface, the first offset is used to indicate the second cursor to move towards the second display interface.

With reference to the second aspect, in some embodiments, the first display interface has four boundaries, the four boundaries are an upper boundary, a lower boundary, a left boundary, and a right boundary of the display interface in a forward layout, the second display interface has four boundaries, and the four boundaries are an upper boundary, a lower boundary, a left boundary, and a right boundary of the display interface in a forward layout. If the first boundary is the left boundary of the first display interface, the second boundary is the right boundary of the second display interface; if the first boundary is the right boundary of the first display interface, the second boundary is the left boundary of the second display interface; if the first boundary is the upper boundary of the first display interface, the second boundary is the lower boundary of the second display interface; or if the first boundary is the lower boundary of the first display interface, the second boundary is the upper boundary of the second display interface.

With reference to the second aspect, in some embodiments, the first electronic device runs a first operating system, and the second electronic device runs a second operating system.

With reference to the second aspect, in some embodiments, the method further includes: When the second cursor is displayed in the second display interface, the first electronic device detects a first input event. The first input event comes from an input operation collected by the first input device of the first electronic device. Then, the first electronic device maps the first input event to a second input event. The first electronic device stores a first mapping table, and the first mapping table stores a mapping relationship between the first input event and the second input event. The first electronic device sends a third message to the second electronic device. The third message carries the second input event.

With reference to the second aspect, in some embodiments, a display area of the first display interface is a visible area corresponding to first resolution, and a display area of the second display interface is a visible area corresponding to second resolution. The method further includes: After the first electronic device detects the first movement operation, the first electronic device determines, based on coordinates of the first cursor in the first display interface, the first resolution of the first display interface, and the second resolution of the second display interface obtained from the second electronic device, the coordinates of the first position of the second cursor displayed in the second display interface.

With reference to the second aspect, in some embodiments, when the first input device is a keyboard, the first input event includes a first key code value generated when the user taps the keyboard, and the second input event includes a second key code value. A character or a control command corresponding to the first key code value in the first operating system is consistent with a character or a control command corresponding to the second key code value in the second operating system.

With reference to the second aspect, in some embodiments, the method further includes: The first electronic device creates a virtual screen. Resolution of the virtual screen is the second resolution. When the second electronic device displays the second cursor at the first position in the second display interface, the first electronic device moves the first cursor to a fourth position on the virtual screen. Coordinate values of the fourth position and the first position are the same. When detecting the second movement operation, the first electronic device moves the first cursor from the fourth position to a fifth position. Coordinate values of the fifth position and the second position are the same.

With reference to the second aspect, in some embodiments, when the second cursor is displayed in the second display interface, the first cursor is not displayed in the first display interface of the first electronic device. For example, when the mouse pointer is displayed in the display interface of the PAD, an input event on the PC side may be shielded. In other words, the PC does not respond to the input event of the input device.

According to a third aspect, an embodiment of this application provides a method for sharing an input device, applied to a second electronic device. The method may include: The second electronic device establishes a first connection to a first electronic device. The second electronic device receives a first message from the first electronic device through the first connection. The first message is used by the first electronic device to notify the second electronic device to display a second cursor. The first message is generated after the first electronic device detects a first movement operation. The first movement operation is an operation of indicating a first cursor to move out of a first display interface of the first electronic device. The first movement operation corresponds to a third offset, and the third offset represents that the first cursor moves out of the first display interface of the first electronic device. The second electronic device displays the second cursor at a first position in a second display interface based on the first message. The second electronic device receives a second message from the first electronic device through the first connection. The second message carries a first offset, the second message is generated after the first electronic device detects a second movement operation, and the second movement operation corresponds to the first offset. The second electronic device moves the second cursor from the first position to a second position. An offset of the second position relative to the first position is the first offset. For example, in some embodiments, after a PAD establishes a connection to a PC, the PAD may use an input device such as a mouse or a keyboard of the PC to perform an input on the PAD. When a mouse pointer on the PC moves to a boundary of a display interface of the PC and continues to move outside the boundary, the PC sends a message to the PAD, to notify the PAD to display the mouse pointer. In response to the message of the PC, the PAD may display the mouse pointer in a display interface. Then, when a user inputs content by using the input device of the PC, the PAD may receive and respond to an input event from the PC. For example, when the user moves the mouse for a specific distance, the mouse pointer on the PAD may move a corresponding offset. When the user enters characters on the keyboard of the PC, the entered characters can be displayed on the PAD.

By implementing the method in the third aspect, a plurality of electronic devices may share an input device. When the input device is inconvenient, the second electronic device may use an input device of the first electronic device to perform an input on the second electronic device. For example, the user may use the mouse and keyboard of the PC to perform an input on the PAD. According to the method, an input operation of the user can be more coherent, and the input operation can be quickly and conveniently switched between different devices without switching between input devices. This improves input experience of the user.

With reference to the third aspect, in some embodiments, the method may further include: The second electronic device receives a second offset sent by the first electronic device. The second offset is an offset corresponding to a third movement operation. The third movement operation is an operation of indicating the second cursor to move out of the second display interface of the second electronic device. The second offset represents that the second cursor moves out of the second display interface of the second electronic device. Then, the second electronic device cancels displaying of the second cursor.

With reference to the third aspect, in some embodiments, when the second electronic device cancels displaying of the second cursor, the first cursor is displayed at a third position in the first display interface of the first electronic device.

With reference to the third aspect, in some embodiments, the first position is located on a second boundary of the second display interface, and the third position is located on a first boundary of the first display interface.

With reference to the third aspect, in some embodiments, the first electronic device includes a first input device, and the first input device may include one or more of the following: a mouse, a keyboard, a handwriting pad, a camera, a touchpad, a scanner, a stylus, a remote control lever, a voice input apparatus, and the like.

With reference to the third aspect, in some embodiments, the first movement operation, the second movement operation, or the third movement operation is detected by the first input device by using the first input device.

With reference to the third aspect, in some embodiments, the first movement operation, the second movement operation, or the third movement operation is an operation of moving the mouse by the user, operating a touch-sensitive panel by the user, operating the keyboard by the user, operating the handwriting pad by the user, operating the remote control lever by the user, operating the voice input apparatus by the user, moving eyes by the user, or inputting a program instruction for instructing a cursor to move.

With reference to the third aspect, in some embodiments, the first message carries coordinates of the first position.

With reference to the third aspect, in some embodiments, if the first position is located on a boundary of the second display interface, the first offset is used to indicate the second cursor to move towards the second display interface.

With reference to the third aspect, in some embodiments, the first display interface has four boundaries, the four boundaries are an upper boundary, a lower boundary, a left boundary, and a right boundary of the display interface in a forward layout, the second display interface has four boundaries, and the four boundaries are an upper boundary, a lower boundary, a left boundary, and a right boundary of the display interface in a forward layout. If the first boundary is the left boundary of the first display interface, the second boundary is the right boundary of the second display interface; if the first boundary is the right boundary of the first display interface, the second boundary is the left boundary of the second display interface, if the first boundary is the upper boundary of the first display interface, the second boundary is the lower boundary of the second display interface; or if the first boundary is the lower boundary of the first display interface, the second boundary is the upper boundary of the second display interface.

With reference to the third aspect, in some embodiments, the method may further include: When the second cursor is displayed in the second display interface, the second electronic device receives a third message from the first electronic device through the first connection. The third message carries a second input event, and the second input event is an input event mapped to a first input event. The first electronic device stores a first mapping table, the first mapping table stores a mapping relationship between the first input event and the second input event, the first input event comes from an input operation collected by the first input device of the first electronic device.

With reference to the third aspect, in some embodiments, when the first input device is a keyboard, the first input event includes a first key code value generated when the user taps the keyboard, and the second input event includes a second key code value. A character or a control command corresponding to the first key code value in the first operating system is consistent with a character or a control command corresponding to the second key code value in the second operating system.

With reference to the third aspect, in some embodiments, the first electronic device runs a first operating system, and the second electronic device runs a second operating system.

With reference to the third aspect, in some embodiments, a display area of the first display interface is a visible area corresponding to first resolution, a display area of the second display interface is a visible area corresponding to second resolution, and coordinates of the first position of the second cursor displayed in the second display interface are determined by the first electronic device based on coordinates of the first cursor in the first display interface, the first resolution of the first display interface, and the second resolution of the second display interface obtained from the second electronic device.

With reference to the third aspect, in some embodiments, a coordinate value of the first position of the second cursor in the second display interface is the same as a coordinate value of a fourth position of the first cursor on a virtual screen, the virtual screen is created by the first electronic device, resolution of the virtual screen is the second resolution, and the fourth position is a position at which the first cursor appears on the virtual screen after the first cursor moves out of the first display interface. A coordinate value of the second position of the second cursor in the second display interface is the same as a coordinate value of a fifth position of the first cursor on the virtual screen, and an offset of the fifth position relative to the fourth position is the first offset.

With reference to the third aspect, in some embodiments, the method may further include: When a display interface layout of the second electronic device changes from the second display interface to a third display interface, the second electronic device changes a position of the second cursor from the second position to a sixth position. The second display interface and the third display interface include a same interface element, and resolution of the second display interface is different from resolution of the third display interface. For example, when the PAD switches from a landscape mode to a portrait mode, if a layout of the display interface of the PAD changes, a position of the mouse pointer may change accordingly, and the mouse pointer may point to a same pixel or a same interface element. Alternatively, when a foldable phone switches between an unfolded state and a folded state, a position of the mouse pointer may also change with the display interface.

With reference to the third aspect, in some embodiments, the second position and the sixth position point to a same interface element.

According to a fourth aspect, an embodiment of the present invention provides an electronic device. The electronic device may include a communication apparatus, a memory, one or more processors, and one or more programs. The one or more processors are configured to execute one or more computer programs stored in the memory, so that the electronic device can implement any function of the first electronic device in the second aspect.

According to a fifth aspect, an embodiment of this application provides an electronic device. The electronic device may include a communication apparatus, a memory, one or more processors, and one or more programs. The one or more processors are configured to execute one or more computer programs stored in the memory, so that the electronic device can implement any function of the second electronic device in the third aspect.

According to a sixth aspect, an embodiment of this application provides a communication system. The communication system may include the first electronic device and the second electronic device described in the foregoing aspects. It may be understood that, based on a same invention idea, for steps performed by the first electronic device and the second electronic device in the system according to the sixth aspect, refer to steps performed by the first electronic device and the second electronic device when corresponding functions are implemented in the method according to the first aspect, and for functions and other descriptions of the first electronic device and the second electronic device, refer to the related descriptions in the fourth aspect and the fifth aspect. Details are not described herein again.

According to a seventh aspect, an embodiment of the present invention provides a computer storage medium. The storage medium stores a computer program, the computer program includes executable instructions, and when the executable instructions are executed by a processor, the processor is enabled to perform operations corresponding to the method according to the first aspect, the second aspect, or the third aspect.

According to an eighth aspect, an embodiment of this application provides a chip system. The chip system may be applied to an electronic device. The chip includes one or more processors, and the processor is configured to invoke computer instructions, so that the electronic device implements any possible implementation of the first aspect, any possible implementation of the second aspect, or any possible implementation of the third aspect.

According to a ninth aspect, an embodiment of this application provides a computer program product including instructions. When the computer program product runs on an electronic device, the electronic device is enabled to perform any possible implementation of the first aspect, any possible implementation of the second aspect, or any possible implementation of the third aspect.

According to the method for sharing an input device provided in this application, a plurality of electronic devices may share the input device. For example, a user may use a mouse and a keyboard of a PC to perform an input on a PAD. According to the method, an input operation of the user can be more coherent, and the input operation can be quickly and conveniently switched between different devices without switching between input devices. This improves input experience of the user. Moreover, according to the method, implementation steps are optimized, complex coordinate conversion is reduced, and power consumption of a processor is reduced.

BRIEF DESCRIPTION OF DRAWINGS

FIG. 5A to FIG. 5C are a schematic diagram of a group of user interfaces according to an embodiment of this application;

FIG. 6A-1 to FIG. 6C-2 are a schematic diagram of a group of scenario interfaces according to an embodiment of this application;

FIG. 9A to FIG. 9C-2 are a schematic diagram of a group of scenarios according to an embodiment of this application;

FIG. 10A to FIG. 10C-2 are a schematic diagram of another group of scenarios according to an embodiment of this application;

DESCRIPTION OF EMBODIMENTS

Figure 1A:
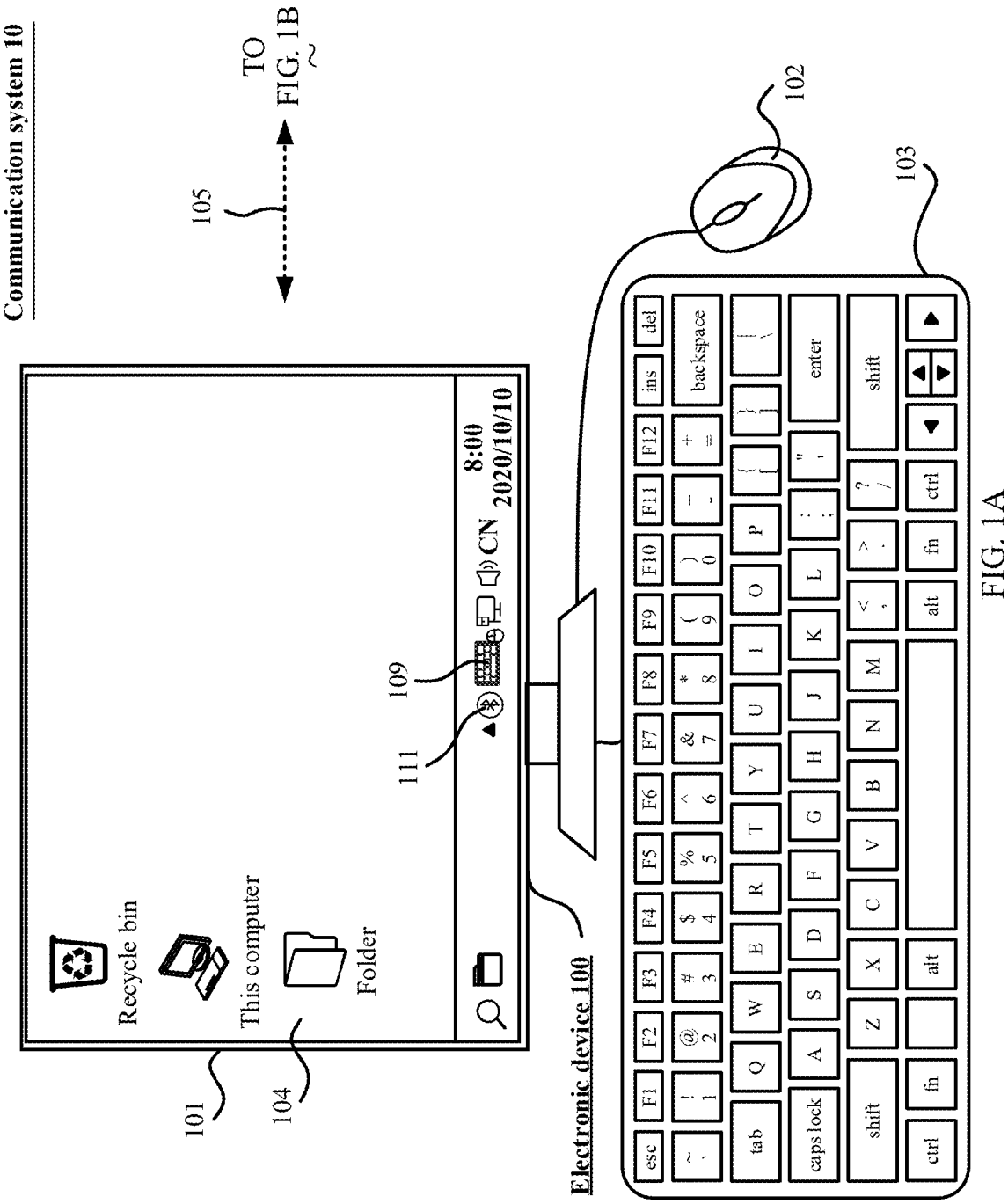
FIG. 1A and FIG. 1B are a schematic diagram of a communication system according to an embodiment of this application.

The following clearly and completely describes the technical solutions in embodiments of this application with reference to the accompanying drawings. In descriptions of embodiments of this application. "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. The following terms "first" and "second" are merely used for description, and shall not be understood as an indication or implication of relative importance or implicit indication of a quantity of indicated technical features. Therefore, features defined as "first" and "second" may explicitly or implicitly include one or more features. In addition, in the descriptions of embodiments of this application, "a plurality of" means two or more.

There are various types of intelligent terminal devices, including mobile phones, PCs, PADs, televisions, and the like. Terminal devices are independent of each other, and there may be differences in ecosystems between terminals, for example, a PC runs Windows® and a tablet computer runs Android®. Therefore, each electronic device has an input device matching the electronic device, and input devices of different electronic devices cannot be shared generally. For example, the PC usually needs to use a mouse, a keyboard, a handwriting pad, and the like to perform an input operation, and the PAD or the mobile phone usually performs an input by using a touch operation. However, in some cases, for example, using the keyboard or mouse to enter text is more convenient than using a touch soft keyboard. A user needs to use the mouse or keyboard when writing documents on the PAD. In a scenario in which the user uses the PC and the PAD at the same time, if another keyboard and mouse device is provided for the PAD, input device redundancy is caused, and the user needs to switch between input devices when using different electronic devices, which is inconvenient for the user and reduces user experience.

An example in which a PC and a PAD share input devices such as a mouse and a keyboard of the PC is used for description. In an implementable screen projection solution, a screen projection interface of the PAD is established in a display interface of the PC, and a user may perform input operations in the screen projection interface by using input devices such as a mouse and a keyboard. Then, the input operations are sent to the PAD end through a projection connection, and the PAD responds to the input operations. In this implementation solution, the screen projection interface of the PAD blocks and occupies space of the display interface of the PC, causing a waste of the display interface of the PC. In addition, a position of the mouse in the screen projection interface of the PAD needs relatively complex conversion to correspond to a position in an actual display interface of the PAD, and calculation is relatively complex. In addition, maintaining a projection function requires high power consumption for a processor.

An embodiment of this application provides a method for sharing an input device. The method may be applied to a communication system that includes a plurality of electronic devices. An example in which a PC and a PAD share an input device such as a mouse or a keyboard of the PC is used for description. According to the method provided in this application, after the PC establishes a connection to the PAD for sharing the input device, a mouse pointer of the PC may reach a boundary of a display interface of the PC. In addition, when detecting an offset by which the mouse continues to move outside the boundary, the PC may calculate a first position at which the mouse pointer is to appear in a display interface of the PAD, and send the first position to the PAD, to notify the PAD to display the mouse pointer in the display interface of the PAD. Then, the PAD may draw the mouse pointer at the first position based on a message sent by the PC. The first position may be located on a boundary of the display interface of the PAD. In some embodiments, after establishing the connection for sharing the input device to the PAD, the PC may create a virtual screen whose resolution is the same as that of the PAD. When the mouse pointer reaches the boundary of the display interface of the PC and continues to move outside the boundary, the mouse pointer may penetrate from the display interface of the PC and move to the virtual screen. At the same time, the PAD may draw the mouse pointer in the display interface of the PAD based on the message sent by the PC. Because the resolution of the virtual screen is the same as resolution of a PAD display, a position of the mouse pointer on the virtual screen is in a one-to-one correspondence with a coordinate position displayed on the PAD, and coordinates of the mouse pointer on the virtual screen may be directly sent to the PAD without complex coordinate conversion.

When the mouse pointer is displayed on the PAD, each time the PC receives an input event from the mouse or the keyboard, the PC may map the input event to a corresponding input event acting on the PAD, and send the input event to the PAD. After receiving the input event from the input device of the PC, the PAD responds to the input event accordingly. At the same time, an input event on the PC side is shielded. In other words, the PC does not respond to the input event of the input device.

According to the method for sharing an input device provided in this application, a plurality of electronic devices may share the input device. For example, a user may use the mouse and the keyboard of the PC to perform an input on the PAD. According to the method, an input operation of the user can be more coherent, and the input operation can be quickly and conveniently switched between different devices without switching between input devices. This improves input experience of the user. In addition, compared with the foregoing screen projection solution, in the method, complex coordinate conversion is reduced, and power consumption of a processor is reduced.

The following describes some related terms and concepts in embodiments of this application.

A pixel (pixel, PX) is a basic unit of image display. Each pixel can have a color value of the pixel and can be displayed in three primary colors. For example, a pixel can be divided into three subpixels: red, green, and blue (RGB color gamut), or cyan, magenta, yellow, and black (CMYK color gamut). An image is a collection of pixels. Generally, more pixels in a unit area indicate higher resolution, and a displayed image is close to a real object. On an electronic device, a quantity of pixels may be divided into a quantity of horizontal pixels and a quantity of vertical pixels. The quantity of horizontal pixels indicates a quantity of pixels contained in a horizontal direction, and the quantity of vertical pixels indicates a quantity of pixels contained in a vertical direction.

Resolution refers to a quantity of pixels in the horizontal and vertical directions. A unit is px, and 1 px=1 pixel. The resolution may be used to determine information to be displayed, and is measured by the quantity of horizontal pixels and the quantity of vertical pixels, that is, resolution=quantity of horizontal pixels×quantity of vertical pixels, for example, 1960×1080. For images of a same physical size, when resolution is relatively low (for example, 640×480), a quantity of displayed pixels is small, a size of a single pixel is relatively large, and a display effect is relatively rough. When resolution is relatively high (for example, 1600×1200), a quantity of displayed pixels is large, a size of a single pixel is relatively small, and a display effect is relatively fine.

A user interface (user interface, UI) is a medium interface for interaction and information exchange between an application or an operating system and a user, and implements conversion between an internal form of information and a form acceptable to the user. The user interface is usually represented in a form of a graphical user interface (graphical user interface, GUI), and is a user interface that is related to a computer operation and that is displayed in a graphic manner. The user interface may be an interface element such as an icon, a window, or a control displayed on a display of an electronic device, and the control may include a visual interface element such as an icon, a button, a menu, a tab, a text box, a dialog box, a status bar, a navigation bar, or a widget.

An input device (input device) is a device that inputs data and information to an electronic device, and is a bridge between a user and an electronic device or between an electronic device and another electronic device. The input device is one of main apparatuses for information exchange between a user and an electronic device, and includes but is not limited to a keyboard (keyboard), a mouse (mouse), a camera, a scanner, a handwriting pad, a stylus, a remote control lever, a touchscreen (touch panel), a voice input apparatus, and the like. The input device may generate input data from a detected user operation and input the input data to the electronic device. The generated input data may be numeric data, or may be non-numeric data, for example, a graph, an image, or sound. A type of the input device and the input data generated by the input device are not limited in this embodiment of this application.

Figure 1B:
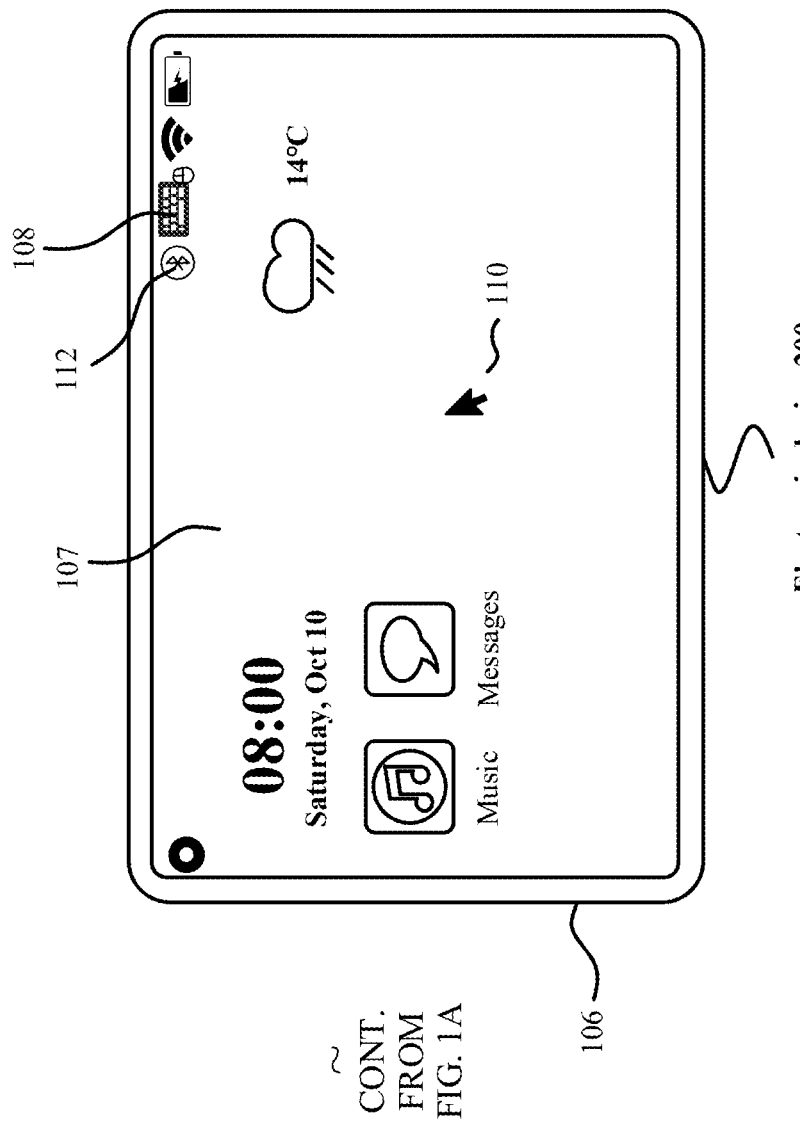

FIG. 1A and FIG. 1B show a communication system 10 according to an embodiment of this application. The communication system 10 may include an electronic device 100 and an electronic device 200, and a first connection 105 is established between the electronic device 100 and the electronic device 200. The electronic device 100 may be a smartphone, a tablet computer, a notebook computer, a desktop computer, or another type of electronic device. This is not limited in this application. In some embodiments, as shown in FIG. 1A and FIG. 1B, the electronic device 100 may be a PC, and the electronic device 200 may be a tablet computer.

In the communication system 10 shown in FIG. 1A and FIG. 1B, the electronic device 100 (for example, the PC) may include a display 101 and input devices such as a mouse 102 and a keyboard 103. The input devices such as the mouse 102 and the keyboard 103 may be connected to the electronic device 100 through a wired connection, for example, a universal serial bus (universal serial bus, USB) connection, or may be connected to the electronic device 100 through a wireless connection, for example, a Bluetooth (Bluetooth, BT) connection, or a wireless fidelity (wireless fidelity, Wi-Fi) connection. A connection manner of the input device is not limited in this application. After the input devices such as the mouse 102 and the keyboard 103 are connected to the electronic device 100, a user may input content to the electronic device 100 by using the mouse 102 and the keyboard 103.

The electronic device 200 may include a screen 106, and the like. The screen 106 may be configured to receive a touch operation of the user and display a corresponding user interface.

The first connection 105 is established between the electronic device 100 and the electronic device 200. The first connection 105 may be a wired connection, for example, a USB connection, or the first connection 105 may be a wireless connection, for example, a Bluetooth connection or a Wi-Fi connection. A type of the first connection is not limited in this embodiment of this application. The electronic device 100 and the electronic device 200 may have a Bluetooth (Bluetooth, BT) module and/or a wireless local area network (wireless local area network, WLAN) module. The Bluetooth module may provide a solution for Bluetooth communication including one or more of classic Bluetooth (Bluetooth 2.1) or Bluetooth low energy (Bluetooth low energy, BLE). The WLAN module may provide a solution for WLAN communication including one or more of a wireless fidelity peer-to-peer (wireless fidelity peer-to-peer, Wi-Fi P2P) connection, a wireless fidelity local area network (wireless fidelity local area network, Wi-Fi LAN), or a wireless fidelity software access point (wireless fidelity software access point, Wi-Fi softAP). In some embodiments, the first connection 105 may be Wi-Fi P2P, and the Wi-Fi P2P means that devices in a wireless network can be connected to each other in a point-to-point manner without using a wireless router, and may also be referred to as wireless fidelity direct (wireless fidelity direct, Wi-Fi direct) in an Android® system. Devices that have established a Wi-Fi P2P connection can exchange data over Wi-Fi (which needs to be in a same frequency band) without connecting to a network or hotspot. In this way, point-to-point communication is implemented, for example, data such as a file, a picture, or a video is transmitted. Compared with Bluetooth, Wi-Fi P2P has advantages of faster search speed, faster transmission speed, and longer transmission distance.

The electronic device 100 and the electronic device 200 may transmit data through the first connection 105. For example, in some embodiments, the electronic device 100 may send coordinate data and an input event of the mouse 102 and an input event of the keyboard 103 to the electronic device 200 through the first connection 105. After receiving a message sent by the electronic device 100, the electronic device 200 may display a mouse pointer 110 on the screen 106, or make corresponding responses to input events of the mouse 102 and the keyboard 103. Therefore, the user may perform an input operation on the electronic device 200 by using the mouse 102 and the keyboard 103 of the electronic device 100. The electronic device 100 and the electronic device 200 share one set of input devices, and the electronic device 200 does not need to be equipped with an additional input device.

The electronic device 100 and the electronic device 200 may run iOS®, Android®, Windows®, OS®, Linux®, or an operating system of another type. Operating systems of the electronic device 100 and the electronic device 200 may be the same or different. This is not limited in this application.

In some embodiments, as shown in FIG. 1A and FIG. 1B, the electronic device 100 displays an interface 104. The interface 104 is a desktop of the electronic device 100, and the interface 104 may display a control 109 and a control 111. The control 111 may indicate that the electronic device 100 has established a Bluetooth connection to another electronic device (the electronic device 200 herein), and the control 109 may indicate that the electronic device 100 and the connected device (the electronic device 200 herein) share input devices, such as the mouse 102 and the keyboard 103. The screen 106 of the electronic device 200 may display an interface 107. The interface 107 may be a desktop of the electronic device 200. The interface 107 may display a control 108 and a control 112. The control 112 may indicate that the electronic device 200 has established a Bluetooth connection to another electronic device (the electronic device 100 herein). The control 108 may indicate that the electronic device 200 establishes a connection for sharing an input device. Herein, the control 108 may indicate that the electronic device 200 may use input devices such as the mouse 102 and the keyboard 103 of the connected device (the electronic device 100 herein). When the user moves a mouse cursor (which may also be referred to as a mouse pointer) to an edge of the interface 104 of the electronic device 100, the mouse pointer 110 may shuttle to an edge of the interface 107 of the electronic device 200, and then the mouse pointer 110 is displayed on the screen 106 of the electronic device 200, and may change positions with movement of the mouse 102.

Figure 2:
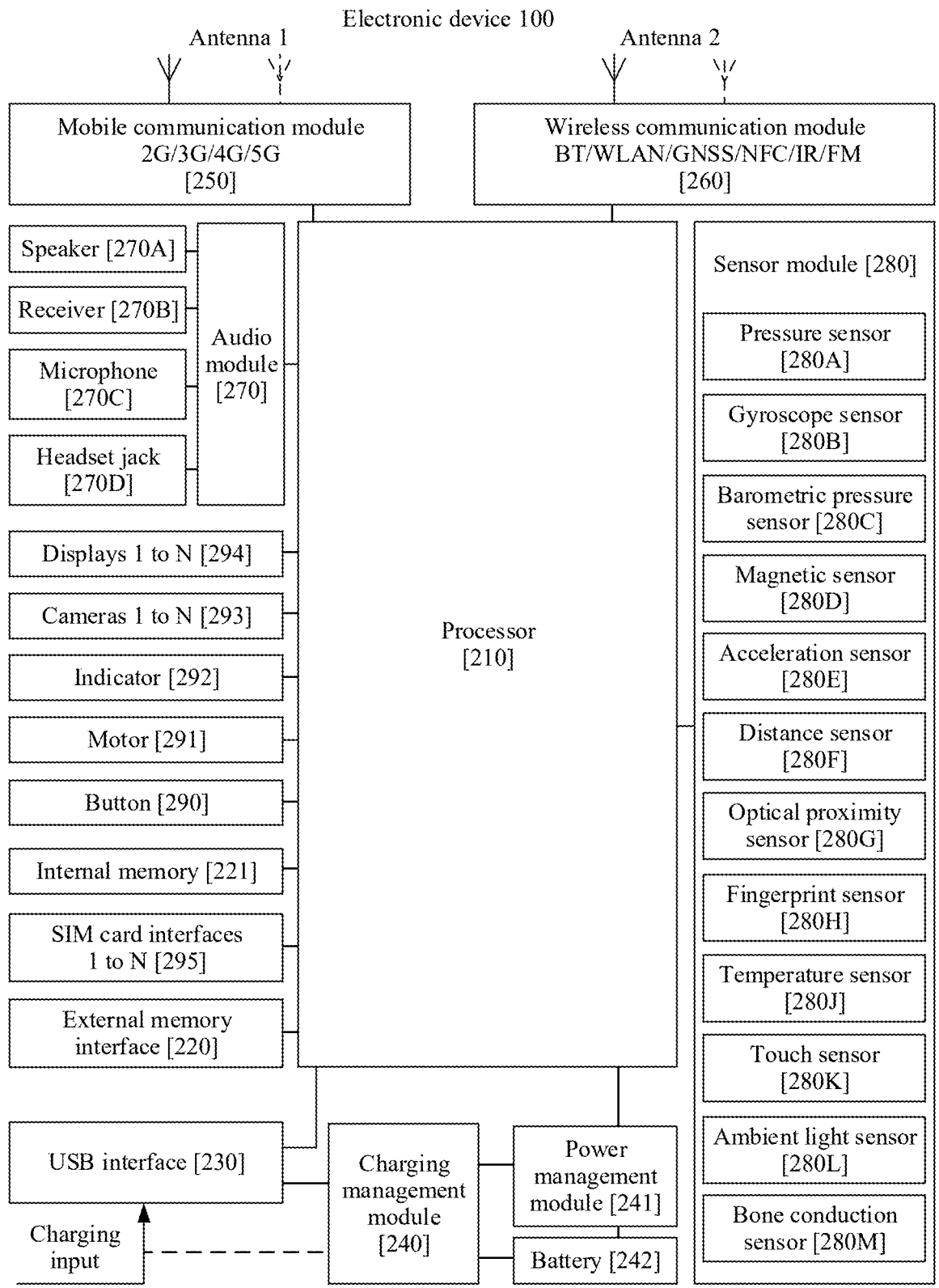
FIG. 2 is a schematic diagram of a hardware structure of an electronic device according to an embodiment of this application.

FIG. 2 is a schematic diagram of a structure of the electronic device 100. FIG. 2 may also be a schematic diagram of a structure of the electronic device 200.

The electronic device 100 may be a mobile phone, a tablet computer, a desktop computer, a laptop computer, a hand-held computer, a notebook computer, an ultra-mobile personal computer (ultra-mobile personal computer UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. These devices may be provided with an input device or connected to an external input device, such as a keyboard or a mouse. A specific type of the electronic device is not specially limited in this embodiment of this application.

The electronic device 100 may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (subscriber identification module, SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces waiting time of the processor 210, thereby improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface MIPI), a general-purpose input/output (general-purpose input/output, GPIO) interface, a subscriber identity module (subscriber identity module, SIMS interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 210 may include a plurality of groups of I2C buses. The processor 210 may be separately coupled to the touch sensor 280K, a charger, a flash, the camera 293, and the like through different I2C bus interfaces. For example, the processor 210 may be coupled to the touch sensor 280K through the I2C interface; so that the processor 210 communicates with the touch sensor 280K through the I2C bus interface, to implement a touch function of the electronic device 100.

The I2S interface may be configured to perform audio communication. In some embodiments, the processor 210 may include a plurality of groups of I2S buses. The processor 210 may be coupled to the audio module 270 through the I2S bus, to implement communication between the processor 210 and the audio module 270. In some embodiments, the audio module 270 may transmit an audio signal to the wireless communication module 260 through the I2S interface, to implement a function of answering a call by using a Bluetooth headset.

The PCM interface may also be used to perform audio communication, and sample, quantize, and code an analog signal. In some embodiments, the audio module 270 may be coupled to the wireless communication module 260 through a PCM bus interface. In some embodiments, the audio module 270 may alternatively transmit an audio signal to the wireless communication module 260 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communication bus, and converts to-be-transmitted data between serial communication and parallel communication. In some embodiments, the UART interface is generally configured to connect the processor 210 and the wireless communication module 260. For example, the processor 210 communicates with a Bluetooth module in the wireless communication module 260 through the UART interface, to implement a Bluetooth function. In some embodiments, the audio module 270 may transmit an audio signal to the wireless communication module 260 through the UART interface, to implement a function of playing music by using a Bluetooth headset.

The MIPI interface may be configured to connect the processor 210 and a peripheral component such as the display 294 or the camera 293. The MIPI interface includes a camera serial interface (camera serial interface, CSI), a display serial interface (display serial interface, DSI), and the like. In some embodiments, the processor 210 communicates with the camera 293 through the CSI interface, to implement an image shooting function of the electronic device 100. The processor 210 communicates with the display 294 through the DSI interface, to implement a display function of the electronic device 100.

The GPIO interface may be configured by software. The GPIO interface may be configured as a control signal or a data signal. In some embodiments, the GPIO interface may be configured to connect the processor 210 to the camera 293, the display 294, the wireless communication module 260, the audio module 270, the sensor module 280, or the like. The GPIO interface may alternatively be configured as an I2C interface, an I2S interface, a UART interface, an MIPI interface, or the like.

The USB interface 230 is an interface that conforms to a USB standard specification, and may be specifically a mini USB interface, a micro USB interface, a USB Type-C interface, or the like. The USB interface 230 may be configured to connect to a charger to charge the electronic device 100, or may be configured to transmit data between the electronic device 100 and a peripheral device, or may be configured to connect to a headset for playing audio through the headset, or may be configured to connect to a mouse and a keyboard, input operation instructions by using the mouse and keyboard, and input character strings by using the keyboard. The interface may be further configured to connect to another electronic device such as an AR device.

It may be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 240 is configured to receive a charging input from a charger. The charger may be a wireless charger or a wired charger. In some embodiments of wired charging, the charging management module 240 may receive a charging input of a wired charger through the USB interface 230. In some embodiments of wireless charging, the charging management module 240 may receive a wireless charging input through a wireless charging coil of the electronic device 100. The charging management module 240 may further supply power to the electronic device by using the power management module 241 while charging the battery 42.

The power management module 241 is configured to connect to the battery 242, the charging management module 240, and the processor 210. The power management module 241 receives an input from the battery 242 and/or the charging management module 240, and supplies power to the processor 210, the internal memory 221, the display 294, the camera 293, the wireless communication module 260, and the like. The power management module 241 may be further configured to monitor parameters such as a battery capacity, a battery cycle count, and a battery health status (an electric leakage or impedance). In some other embodiments, the power management module 241 may alternatively be disposed in the processor 210. In some other embodiments, the power management module 241 and the charging management module 240 may alternatively be disposed in a same component.

A wireless communication function of the electronic device 100 may be implemented by using the antenna 1, the antenna 2, the mobile communication module 250, the wireless communication module 260, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 250 may provide a wireless communication solution that is applied to the electronic device 100 and that includes 2G/3G/4G/5G. The mobile communication module 250 may include at least one filter, a switch, a power amplifier, a low noise amplifier (low noise amplifier, LNA), and the like. The mobile communication module 250 may receive an electromagnetic wave through the antenna 1, perform processing such as filtering or amplification on the received electromagnetic wave, and transmit the electromagnetic wave to the modem processor for demodulation. The mobile communication module 250 may further amplify a signal modulated by the modem processor, and convert the signal into an electromagnetic wave for radiation through the antenna 1. In some embodiments, at least some function modules in the mobile communication module 250 may be disposed in the processor 210. In some embodiments, at least some function modules in the mobile communication module 250 may be disposed in a same component as at least some modules in the processor 210.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 270A, the receiver 270B, or the like), or displays an image or a video by using the display 294. In some embodiments, the modem processor may be an independent component. In some other embodiments, the modem processor may be independent of the processor 210, and is disposed in a same component as the mobile communication module 250 or another function module.

The wireless communication module 260 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 260 may be one or more components integrating at least one communication processing module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

In some embodiments, in the electronic device 100, the antenna 1 and the mobile communication module 250 are coupled, and the antenna 2 and the wireless communication module 260 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 294, the application processor, and the like. The GPU is a microprocessor for image processing, and is connected to the display 294 and the application processor. The GPU is configured to: perform mathematical and geometric computation, and render an image. The processor 210 may include one or more GPUs that execute program instructions to generate or change display information.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 294, where N is a positive integer greater than 1.

The electronic device 100 may implement an image shooting function by using the ISP, the camera 293, the video codec, the GPU, the display 294, the application processor, and the like.

The ISP is configured to process data fed back by the camera 293. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of an image shooting scenario. In some embodiments, the ISP may be disposed in the camera 293.

The camera 293 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 293, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The internal memory 221 may include one or more random access memories (random access memories, RAMs) and one or more nonvolatile memories (nonvolatile memories, NVMs).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a 5th generation DDR SDRAM, usually referred to as a DDR5 SDRAM), and the like.

The nonvolatile memory may include a magnetic disk storage device and a flash memory (flash memory).

The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (English: universal flash storage, UFS), an embedded multi media card (embedded multi media Card, eMMC), and the like according to storage specifications.

The random access memory may be directly read and written by using the processor 210, and may be configured to store an executable program (for example, a machine instruction) of an operating system or another running program, and may be further configured to store data of a user, an application program, and the like.

The nonvolatile memory may also store an executable program, data of a user, data of an application, and the like, which may be loaded into the random access memory in advance for directly reading and writing by the processor 210.

The external memory interface 220 may be configured to connect to an external nonvolatile memory, to extend a storage capability of the electronic device 100. The external nonvolatile memory communicates with the processor 210 through the external memory interface 220, to implement a data storage function. For example, files such as music and videos are stored in the external nonvolatile memory.

The electronic device 100 may implement an audio function, such as music playing and recording, by using the audio module 270, the speaker 270A, the receiver 270B, the microphone 270C, the headset jack 270D, the application processor, and the like.

The audio module 270 is configured to convert digital audio information into an analog audio signal for output, and is also configured to convert an analog audio input into a digital audio signal. The audio module 270 may be further configured to code and decode an audio signal. In some embodiments, the audio module 270 may be disposed in the processor 210, or some function modules in the audio module 270 are disposed in the processor 210.

The speaker 270A, also referred to as a "loudspeaker", is configured to convert an audio electrical signal into a sound signal. The electronic device 100 may be used to listen to music or answer a call in a hands-free mode over the speaker 270A.

The receiver 270B, also referred to as an "earpiece", is configured to convert an audio electrical signal into a sound signal. When a call is answered or voice information is received through the electronic device 100, the receiver 270B may be put close to a human ear to listen to a voice.

The microphone 270C, also referred to as a "mike" or a "mic", is configured to convert a sound signal into an electrical signal. When making a call or sending voice information, a user may make a sound by moving a human mouth close to the microphone 270C to input a sound signal to the microphone 270C. At least one microphone 270C may be disposed in the electronic device 100. In some other embodiments, two microphones 270C may be disposed in the electronic device 100, to collect a sound signal and implement a noise reduction function. In some other embodiments, three, four, or more microphones 270C may alternatively be disposed in the electronic device 100, to collect a sound signal, implement noise reduction, and identify a sound source, so as to implement a directional recording function and the like.

The headset jack 270D is configured to connect to a wired headset. The headset jack 270D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 280A is configured to sense a pressure signal, and may convert the pressure signal into an electrical signal. In some embodiments, the pressure sensor 280A may be disposed on the display 294. There are many types of pressure sensors 280A, such as a resistive pressure sensor, an inductive pressure sensor, and a capacitive pressure sensor. The capacitive pressure sensor may include at least two parallel plates made of conductive materials.

Capacitance between electrodes changes when a force is applied to the pressure sensor 280A. The electronic device 100 determines pressure intensity based on the change in the capacitance. When a touch operation is performed on the display 294, the electronic device 100 detects intensity of the touch operation based on the pressure sensor 280A. The electronic device 100 may also calculate a touch position based on a detection signal of the pressure sensor 280A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 280B may be configured to determine a motion posture of the electronic device 100. In some embodiments, an angular velocity of the electronic device 100 around three axes (namely, axes x, y, and z) may be determined by using the gyroscope sensor 280B. The gyroscope sensor 280B may be configured to implement image stabilization during image shooting. For example, when the shutter is pressed, the gyroscope sensor 280B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 280B may also be used in a navigation scenario and a somatic game scenario.

The barometric pressure sensor 280C is configured to measure barometric pressure. In some embodiments, the electronic device 100 calculates an altitude by using the barometric pressure measured by the barometric pressure sensor 280C, to assist in positioning and navigation.

The magnetic sensor 280D includes a Hall effect sensor. The electronic device 100 may detect opening and closing of a flip cover by using the magnetic sensor 280D. In some embodiments, when the electronic device 100 is a clamshell phone, the electronic device 100 may detect opening and closing of a flip cover by using the magnetic sensor 280D. Further, a feature such as automatic unlocking of the flip cover is set based on a detected opening or closing state of a leather case or a detected opening or closing state of the flip cover.

The acceleration sensor 280E may detect accelerations in various directions (usually on three axes) of the electronic device 100. When the electronic device 100 is still, a magnitude and a direction of gravity may be detected. The acceleration sensor 280E may be further configured to identify a posture of the electronic device, and is used in an application such as switching between a landscape mode and a portrait mode or a pedometer.

The distance sensor 280F is configured to measure a distance. The electronic device 100 may measure the distance in an infrared manner or a laser manner. In some embodiments, in an image shooting scenario, the electronic device 100 may measure a distance through the distance sensor 280F to implement quick focusing.

The optical proximity sensor 280G may include a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object through the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 280G, that the user holds the electronic device 100 close to an ear for a call, to automatically turn off a screen for power saving. The optical proximity sensor 280G may also be used for automatic screen unlocking and locking in a smart cover mode or a pocket mode.

The ambient light sensor 280L is configured to sense ambient light brightness. The electronic device 100 may adaptively adjust brightness of the display 294 based on the sensed ambient light brightness. The ambient light sensor 280L may also be configured to automatically adjust white balance during photographing. The ambient light sensor 280L may also cooperate with the optical proximity sensor 280G to detect whether the electronic device 100 is in a pocket, to prevent an accidental touch.

The fingerprint sensor 280H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 280J is configured to detect a temperature. In some embodiments, the electronic device 100 executes a temperature processing policy based on the temperature detected by the temperature sensor 280J. For example, when the temperature reported by the temperature sensor 280J exceeds a threshold, the electronic device 100 lowers performance of a processor located near the temperature sensor 280J, to reduce power consumption and implement thermal protection. In some other embodiments, when the temperature is lower than another threshold, the electronic device 100 heats the battery 242 to prevent the electronic device 100 from being shut down abnormally due to a low temperature. In some other embodiments, when the temperature is lower than still another threshold, the electronic device 100 boosts an output voltage of the battery 242 to avoid abnormal shutdown caused by a low temperature.

The touch sensor 280K is also referred to as a "touch control device". The touch sensor 280K may be disposed in the display 294, and the touch sensor 280K and the display 294 form a touchscreen, which is also referred to as a "touch screen". The touch sensor 280K is configured to detect a touch operation performed on or near the touch sensor 280K. The touch sensor may transfer the detected touch operation to the application processor to determine a type of the touch event. A visual output related to the touch operation may be provided by using the display 294. In some other embodiments, the touch sensor 280K may alternatively be disposed on a surface of the electronic device 100, or disposed in a position different from the display 294.

The bone conduction sensor 280M may obtain a vibration signal. In some embodiments, the bone conduction sensor 280M may obtain a vibration signal of a vibration bone of a human vocal-cord part. The bone conduction sensor 280M may also contact a pulse of a human body and receive a blood pressure pulse signal. In some embodiments, the bone conduction sensor 280M may also be disposed in the headset, to combine into a bone conduction headset. The audio module 270 may obtain a voice signal through parsing based on the vibration signal that is of the vibration bone of the vocal-cord part and that is obtained by the bone conduction sensor 280M, to implement a voice function. The application processor may parse heart rate information based on the blood pressure beating signal obtained by the bone conduction sensor 280M, to implement a heart rate detection function.

The button 290 includes a power button, a volume button, and the like. The button 290 may be a mechanical button, or may be a touch button. The electronic device 100 may receive a button input, and generate a button signal input related to a user setting and function control of the electronic device 100.

The motor 291 may generate a vibration prompt. The motor 291 may be configured to provide an incoming call vibration prompt and a touch vibration feedback. For example, touch operations performed on different applications (for example, photographing and audio playing) may correspond to different vibration feedback effects. The motor 291 may also generate different vibration feedback effects for touch operations performed on different areas of the display 294. Different application scenarios (for example, a time reminder, information receiving, an alarm clock, and a game) may also correspond to different vibration feedback effects. A touch vibration feedback effect may be further customized.

The indicator 292 may be an indicator light, and may be configured to indicate a charging status and a power change, or may be configured to indicate a message, a missed call, a notification, or the like.

The SIM card interface 295 is configured to connect to a SIM card. The SIM card may be inserted into the SIM card interface 295 or removed from the SIM card interface 295, to implement contact with or separation from the electronic device 100. The electronic device 100 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or different types. The SIM card interface 295 may also be compatible with different types of SIM cards. The SIM card interface 295 may also be compatible with the external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

The following describes a system software architecture provided in an embodiment of this application. A communication system 10 including the electronic device 100 and the electronic device 200 in the present invention is used as an example to describe a system software structure provided in this embodiment of this application.

Figure 3:
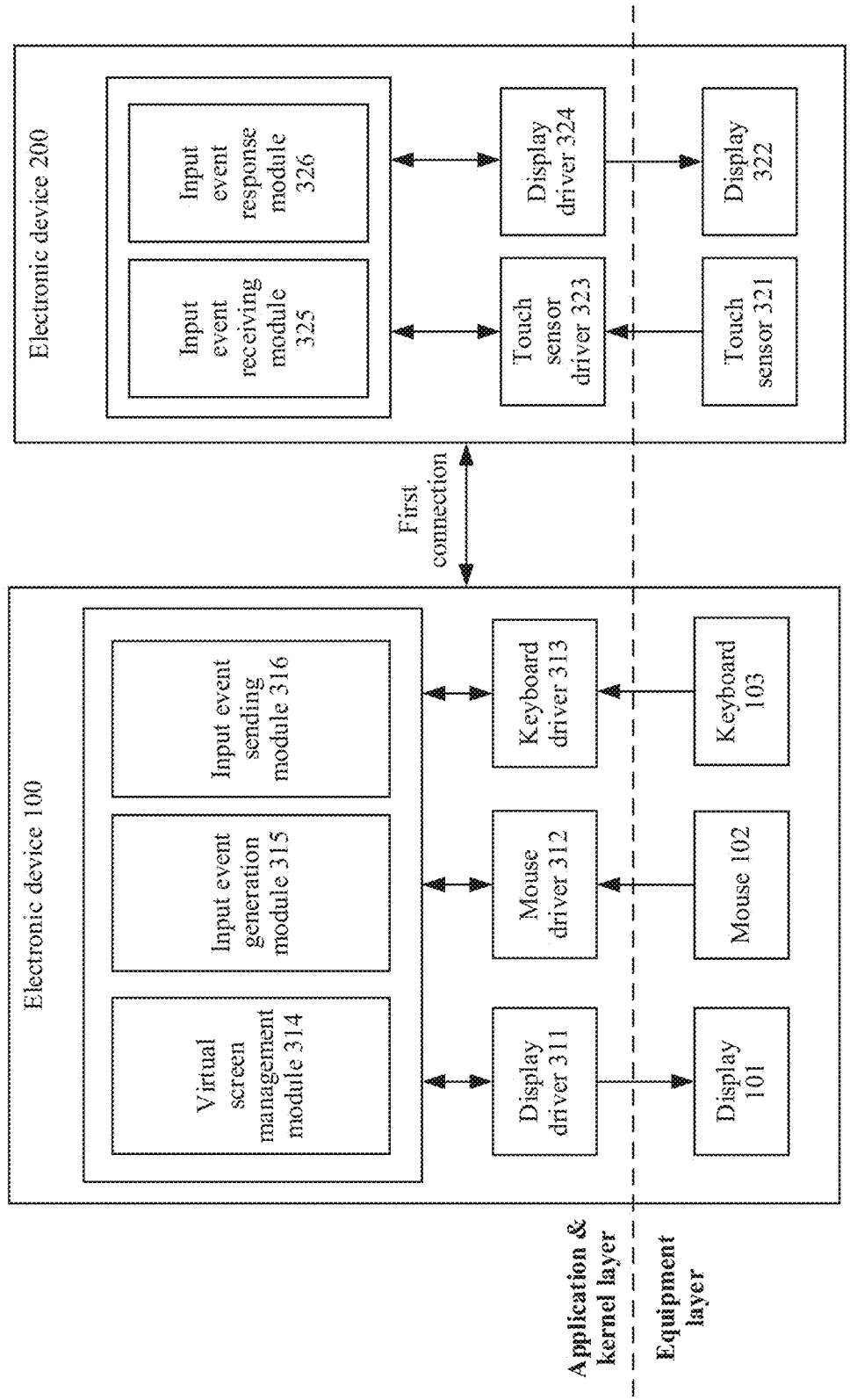
FIG. 3 is a schematic diagram of a software architecture of a communication system according to an embodiment of this application.

FIG. 3 is a block diagram of a system software architecture of the communication system 10 according to an embodiment of this application.

As shown in FIG. 3, a software architecture of the communication system 10 includes the electronic device 100 and the electronic device 200. A first connection may be established between the electronic device 100 and the electronic device 200, and communication may be performed through the first connection. The first connection may be a Bluetooth connection, a Wi-Fi connection, or the like. A connection manner of the first connection is not limited in this embodiment.

In some embodiments, a software architecture of the communication system 10 may be divided into an application & kernel (application & kernel) layer and an equipment (equipment) layer. The application layer may include a series of application packages. The system software architecture is described herein by using an example in which the electronic device 100 is a PC and the electronic device 200 is a tablet computer. An input device of the PC may be the mouse 102, the keyboard 103, or the like, and the tablet computer may have a touchscreen.

An equipment layer of the electronic device 100 may include input/output devices such as the display 101, the mouse 102, and the keyboard 103.

The display 101 is an output device for displaying an image, a video, or the like. The display 101 includes a display panel. The electronic device 100 may include one or more displays 101, where N is a positive integer greater than 1.

The mouse 102 is an input device, and is an indicator for positioning vertical and horizontal coordinates in a display system of an electronic device. Using the mouse can make an operation on the electronic device easier and faster. A mouse type may include a trackball mouse, an optical mouse, a wireless mouse, and the like. In this application, the mouse may be extended to any device that can generate a cursor and for clicking.

The keyboard 103 is an input device, and a user may enter a character, a number, a punctuation mark, a control instruction, and the like into the electronic device by using the keyboard.

An application & kernel layer of the electronic device 100 may include a display driver 311, a mouse driver 312, a keyboard driver 313, and the like. A driver (driver) may communicate with a hardware device through a bus, control hardware to enter various working states, and obtain a value of a related register of a component, to obtain a status of a device. For example, a user operation event, such as a mouse input, a keyboard input, or an electronic device rotation, may be obtained by using the driver, and the event may be converted into data.

The display driver 311 may be a program for driving a display.

The mouse driver 312 may be responsible for completing the following three tasks: displaying a mouse cursor on a screen and maintaining movement of the cursor; providing a status of the mouse to an application, where the status includes a position of the mouse cursor on the screen and a state of each button of the mouse being pressed or released; and providing some auxiliary functions of mouse operations for the application.

The keyboard driver 313 is an interrupt program, may generate a scan code based on a pressed key, then obtain an American standard code for information interchange (American standard code for information interchange, ASCII) from the scan code, and then put the code into a cache queue for output or other invocation.

The application & kernel layer of the electronic device 100 may further include a virtual screen management module 314, an input event generation module 315, an input event sending module 316, and the like.

The virtual screen management module 314 may be configured to create a virtual screen. In some embodiments, for example, in a Windows® 10 operating system the virtual screen may be created by creating an IDDCX_MONITOR object. The created virtual screen may have the same resolution as a display of the electronic device 200, and the virtual screen is invisible to the user. The electronic device 100 creates the virtual screen, so that a mouse pointer may penetrate from a display of the electronic device 100, and coordinates of the mouse pointer on the virtual screen may be directly sent to the electronic device 200 without complex coordinate conversion. If no virtual screen is created or no new external display is connected, the mouse pointer is limited within an edge range of the display of the electronic device 100, and the mouse pointer cannot be displayed on different displays (including the virtual screen). After the mouse pointer moves to the virtual screen, because the resolution of the virtual screen is the same as the resolution of the display of the electronic device 200, coordinates of the mouse pointer on the virtual screen may be directly sent to the electronic device 200, and complex coordinate conversion is not required. This is simple and convenient, and reduces CPU resource consumption.

The input event generation module 315 may be configured to convert an obtained input event of an input device into a corresponding input event that can act on the electronic device 200. For example, when it is detected that the mouse pointer reaches an edge of the display of the electronic device 100, the electronic device 100 may calculate a start position of the mouse pointer displayed on the display of the electronic device 200, and send the start position of the mouse pointer to the electronic device 200 by using the input event sending module 316. The electronic device 200 receives a message and displays the mouse pointer at a corresponding position. This forms a visual effect that the mouse pointer shuttles from the electronic device 100 to the electronic device 200. For another example, after the mouse pointer moves to the display of the electronic device 200, an input event of an input device (such as a mouse, a keyboard, or a handwriting pad) of the electronic device 100 is captured, and then a corresponding input event that can act on the electronic device 200 is generated based on a mapping relationship in a first mapping table, and is sent to the electronic device 200. The input event includes but is not limited to a mouse movement event, a mouse click event, a mouse wheel scrolling event, a keyboard input event, a remote control lever movement event, a voice input event, and the like. For example, the electronic device 100 may map an input event of a Windows® system to an input event of a Linux® system according to the first mapping table, and the input event of the Linux® system may act on the electronic device 200. For example, a left mouse button click event on the Windows® system may be mapped to a click event on the Linux® system, and a right mouse button click event on the Windows® system may be mapped to a touch and hold event on the Linux® system. A key value of a first key in the Windows® system may be mapped to a corresponding key value in the Linux® system. For example, for a character "a", a key code in the Windows® system may be different from a key code in the Linux® system.

The input event sending module 316 may be configured to send, by the electronic device 100, the input event or the like to the electronic device 200 through the first connection.

An equipment layer of the electronic device 200 may include a touch sensor 321 and a display 322.

The touch sensor 321 is also referred to as a "touch panel". The touch sensor 321 may be disposed on the display 322, and the touch sensor 321 and the display 322 form a touchscreen, which is also referred to as a "touch screen". The touch sensor 321 is configured to detect a touch operation performed on or near the touch sensor. The touch sensor 321 may transfer the detected touch operation to an application processor to determine a type of a touch event.

The display 322 is an output device, and may be configured to display an image and a color. The display 322 may provide a visual output related to the touch operation.

An application & kernel layer of the electronic device 200 may include a touch sensor driver 323, a display driver 324, an input event receiving module 325, and an input event response module 326. The touch sensor driver 323 and the display driver 324 are programs for driving hardware devices of the touch sensor and the display.

The input event receiving module 325 may be configured to monitor a communication interface, and obtain, through the first connection, a message sent by the electronic device 100, including but not limited to an instruction for displaying a mouse pointer, absolute coordinates of the mouse pointer, offset coordinates of the mouse pointer, a pressing event of a mouse button, a scrolling event of a mouse wheel, a pressing event of a keyboard key, a key value corresponding to a keyboard key, and the like.

The input event response module 326 may be configured to process the input event after the input event receiving module 325 receives the message from the electronic device 100. For example, when the input event receiving module 325 receives, from the electronic device 100, a message that carries coordinates (padX, padY) and indicates to display a mouse pointer, the input event response module 326 may respond to the message and draw a mouse pointer at the coordinates (padX, padY), and displays the mouse pointer on the display 322. For another example, after the input event receiving module 325 receives an input event such as mouse movement, mouse clicking, mouse wheel scrolling, a keyboard input, and remote control lever movement from the electronic device 100, the input event response module 326 may process the input event.

For specific implementation, refer to the following description. Details are not described herein.

The foregoing description of the software architecture of the communication system 10 is merely an example. It may be understood that the software architecture shown in this embodiment of the present invention does not constitute a specific limitation on this application. In some other embodiments of this application, the communication system 10 may include more or fewer modules than those shown in the figure, or combine some modules, or split some modules, or have different architectural arrangements. The components shown in the figure may be implemented by hardware, software, or a combination of software and hardware.

The following describes an internal implementation method according to an embodiment of this application.

In this embodiment, an example in which input devices such as a mouse and a keyboard are shared between a PC running a Windows® operating system and a tablet computer running an Android® operating system is used for description. The example provided in this embodiment does not constitute any limitation on this application. The method for sharing an input device provided in this application may also be implemented in sharing an input device of a notebook computer among a plurality of other types of electronic devices, for example, a mobile phone, a notebook computer, and a tablet computer. This embodiment of this application does not impose any limitation on operating systems running on different electronic devices and types of input devices. For example, the input device may alternatively be a handwriting pad, a voice input apparatus, a camera, or the like.

In this application, top, bottom, left, and right are relative concepts of directions. For example, it may be defined that when an electronic device is in a vertical state, downward is a direction of gravity, or when eyes of a user face a display interface in a forward layout, a left side is a left side from an angle of view of the user, a right side is a right side from the angle of view of the user, an upper side is a direction in which the eyes face the head from the angle of view of the user, and a lower side is a direction in which the eyes face the torso from the angle of view of the user. The display interface in the forward layout means that text, symbols, and icons on the display interface are arranged in a layout direction that best meets reading requirements of the user. Because the direction is a relative concept, the foregoing description manner is merely an example, and does not constitute a limitation.

In this embodiment, a PC establishes a first connection to a PAD. The PC has a display for displaying a user interface, and further has input devices such as a mouse and a keyboard. The PC may create a virtual screen invisible to a user. The virtual screen and a display of the PAD have a same size and same resolution. When a mouse pointer reaches an edge of the display of the PC, the mouse pointer may move to the virtual screen through the display of the PC, and the PAD may draw the mouse pointer at a corresponding position between the virtual screen of the PC and the display of the PAD. When the mouse pointer is displayed on the PAD, when the PC receives an input event from the mouse or the keyboard, the PC may map the input event to a corresponding input event on the PAD, and send the input event to the PAD. After receiving the input event, the PAD responds to the input event accordingly. Therefore, the user may use the input device of the PC to perform an input on the PAD.

Specific implementation of this embodiment may be divided into three parts: (1) Creation of the virtual screen; (2) Shuttle of the mouse pointer; (3) Response to the input event.

(1) Creation of the Virtual Screen

Specifically, the PC may create one or more virtual screens by using an application programming interface (application programming interface, API) function of the Windows® operating system. Resolution of the created virtual screen is the same as that of the display of the PAD, and the virtual screen is invisible to the user. Certainly, if there are a plurality of electronic devices that need to share an input device, a plurality of virtual screens may be created to correspond to the electronic devices, and each virtual screen has the same screen resolution as the electronic device corresponding to the virtual screen. An example in which the PC creates a virtual screen that has the same screen resolution as the PAD is used for description. In some embodiments, for example, in the Windows® 10 operating system, the virtual screen may be created by creating the IDDCX_MONITOR object. Specifically, creating the virtual screen may include the following steps:

(1) Define Specifications of the Virtual Screen.

Initialization is first performed to configure related parameters. Initialization may be performed by using functions such as IDD_CX_CLIENT_CONFIG_INIT, to set callback functions and configure a display mode, for example, parameters such as resolution and a refresh rate. For example, the resolution is set to be the same as the resolution of the display of the PAD obtained by the PC.

(2) Create the Virtual Screen.

After initialization is completed, an IddCxMonitorCreate function can be used to create the IDDCX_MONITOR object, namely, the virtual screen.

(3) Insert the Virtual Screen.

After the IDDCX_MONITOR object is successfully created, an IddCxMonitorArrival function is invoked to notify the system that the virtual screen is inserted. If the system displays a message indicating successful insertion, the virtual screen is successfully created and can be used. At this time, the virtual screen is detected in display settings of the Windows® system.

If the virtual screen needs to be deleted or deregistered from the system later, an IddCxMonitorDeparture function may be invoked. Each time a virtual display is "inserted", an IDDCX_MONITOR object is successfully created in the system, and then the virtual display is "deleted" means the IDDCX_MONTIOR object is destroyed.

At this time, the PC creates a virtual screen whose resolution is the same as that of the PAD. In addition, a relative position between the display of the PC and the virtual screen may be set. For example, it may be set that the virtual screen is located on the right side of the display of the PC, that is, a right edge of the display of the PC is connected to a left edge of the virtual screen. In this case, the mouse pointer may penetrate from the right edge of the display of the PC, and enter from a corresponding position at the left edge of the virtual screen. If it is set that the virtual screen is located at the bottom of the display of the PC, that is, a lower edge of the display of the PC is connected to an upper edge of the virtual screen, the mouse pointer may penetrate from the lower edge of the display of the PC and enter from a corresponding position at the upper edge of the virtual screen. The same applies to other edges. If a plurality of virtual screens are created, generally, to avoid a conflict, the plurality of virtual screens may be correspondingly connected to different edges of the display of the PC. For example, if a virtual screen 1 is set to be located on the right side of the display of the PC, a virtual screen 2 may be set to be located at the bottom of the display of the PC.

(2) Shuffle of the Mouse Pointer

Figure 4A:
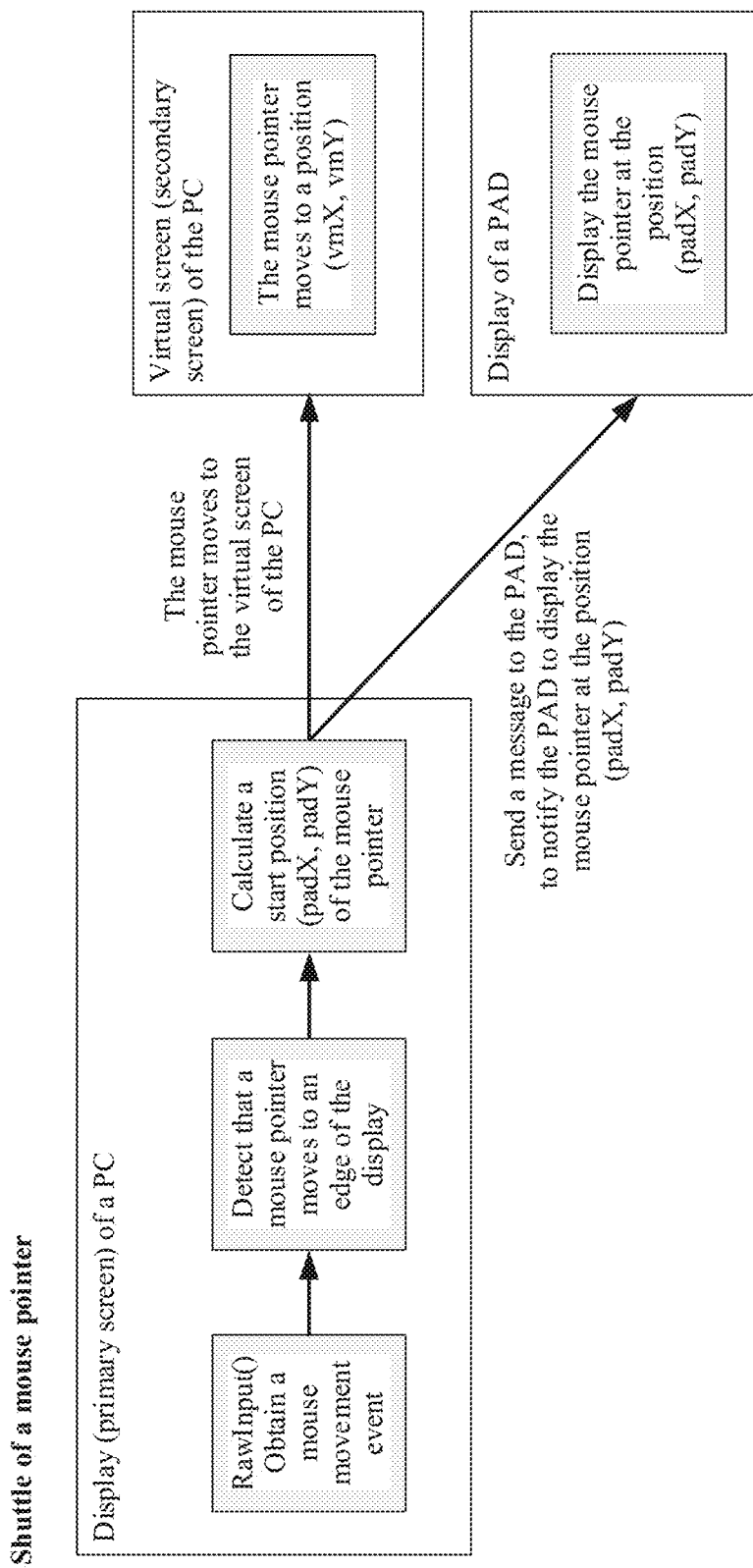
FIG. 4A and FIG. 4B are a schematic diagram of an internal implementation method according to an embodiment of this application.

Visually, the mouse pointer can "shuffle" from the display of the PC to the display of the PAD. An example in which the mouse pointer "shuttles" from the right edge of the display of the PC to the left edge of the PAD is used for description. The PC and the PAD are arranged horizontally, that is, left and right edges of the PC and the PAD are short edges of the device. Refer to FIG. 4A. Specifically, the following steps may be included:

(1) Detect that the Mouse Pointer Reaches an Edge of the Display of the PC.

Specifically, the PC may use a GetPhysicalCursorPos function of the Windows® system to obtain absolute coordinates (pcX, pcY) of a position at which the mouse pointer is located. A maximum value of the absolute coordinates (pcX, pcY) of a position at which the mouse pointer is located may be a value of display resolution of the display of the PC. For example, if current display resolution (screenWidth, screenHeight) of the display of the PC is 1920×1080 (pixels), absolute coordinates of the upper left corner of the display may be an origin (0, 0), absolute coordinates of the lower right corner may be (1920, 1080), absolute coordinates of the lower left corner are (0, 1080), and absolute coordinates of the upper right corner are (1920, 0). Absolute coordinates of any position on the display of the PC are within a range of (0, 0) to (1920, 1080). The display resolution of the display of the PC can be obtained by using a GetSystemMetrics function.

When the mouse moves a specific distance, the PC may obtain, by using a RawInput function, an offset of the mouse pointer corresponding to the mouse movement distance. The offset is a difference between a movement start position and a movement end position. The offset may be a vector, including a direction and a distance, and the offset may be represented by offset coordinates (relX, relY).

For example, it is detected that the mouse pointer reaches the right edge of the display of the PC. If (pcX+relX)>screenWidth, a result indicating that the mouse cursor reaches the edge of the PC desktop is returned. If (pcY+relY)>screenHeight, a result indicating that the mouse cursor reaches the lower edge of the PC desktop is returned. A case in which the mouse pointer reaches the upper edge and the left edge of the display of the PC may be deduced by analogy, and details are not described herein again.

(2) Calculate a Start Position of the Mouse Pointer on the Display of the PAD.

When the PC detects that the mouse pointer reaches the edge of the display of the PC, the PC calculates coordinates of a start point of the mouse pointer displayed on the display of the PAD. The PC may calculate the start position (padX, padY) of the mouse pointer on the display of the PAD based on the absolute coordinates (pcX, pcY) of the mouse pointer that currently reaches the edge of the display of the PC, the display resolution (screenWidth, screenHeight) of the display of the PC, and display resolution (remoteWidth, remoteHeight) of the display of the PAD.

For example, the upper left corner of the display of the PAD is an absolute coordinate origin. In some embodiments, when the mouse pointer moves to a right edge ($pcX_{max}$, pcY) of the display of the PC, ($pcX_{max}$) indicates that the horizontal coordinate is a maximum value, that is, a value is screenWidth. Then, the start position (padX, padY) of the mouse pointer on the display of the PAD is calculated as follows:

$$\begin{cases} padX = 0 \\ padY = pcY * \dfrac{remoteHeight}{screenHeight} \end{cases}$$

According to the foregoing calculation formula, a horizontal coordinate of the start position at which the mouse pointer appears on the display of the PAD is 0, and a vertical coordinate of the start position is a position that is calculated based on a ratio of the display resolution of the PC to the display resolution of the PAD and that is in proportion to a vertical coordinate position of the PC. That is, the start position of the mouse pointer is on the left edge of the display of the PAD. For example, if the mouse pointer leaves a middle position of the right edge of the display of the PC, the mouse pointer may appear at a middle position of the left edge of the display of the PAD. In this way, the user can feel that an entire shuttle process of the mouse pointer is continuous, and user experience is good.

Similarly, when the mouse pointer moves to a left edge ($pcX_{min}$, pcY) of the display of the PC, ($pcX_{min}$) indicates that the horizontal coordinate is a minimum value, that is, the value is 0. In this case, the start position (padX, padY) of the mouse pointer on the display of the PAD is calculated as follows:

$$\begin{cases} padX = remoteWidth \\ padY = pcY * \dfrac{remoteHeight}{screenHeight} \end{cases}$$

That is, the start position of the mouse pointer on the display of the PAD is a position at the right edge of the display of the PAD.

Similarly, when the mouse pointer moves to an upper edge (pcX, $pcY_{min}$) of the display of the PC, ($pcY_{min}$) indicates that the vertical coordinate is a minimum value, that is, the value is 0. In this case, the start position (padX, padY) of the mouse pointer on the display of the PAD is calculated as follows:

$$\begin{cases} padX = pcX * \dfrac{remoteWidth}{screenWidth} \\ padY = remoteHeight \end{cases}$$

That is, the start position of the mouse pointer on the display of the PAD is a position at the lower edge of the display of the PAD.

Similarly, when the mouse pointer moves to a lower edge (pcX, $pcY_{max}$) of the display of the PC, ($pcX_{max}$) indicates that the vertical coordinate is a maximum value, that is, the value is screenHeight. In this case, the start position (padX, padY) of the mouse pointer on the display of the PAD is calculated as follows:

$$\begin{cases} padX = pcX * \dfrac{remoteWidth}{screenWidth} \\ padY = 0 \end{cases}$$

That is, the start position of the mouse pointer on the display of the PAD is a position at the upper edge of the display of the PAD.

The foregoing method for calculating the start position of the mouse pointer on the display of the PAD is merely an example, and does not constitute any limitation on this application.

In some other embodiments, when it is detected that the mouse pointer moves out of any edge of the display of the PC, the mouse pointer may appear at fixed coordinates of the display of the PAD, for example, at an origin. That is, (padX, padY) is (0, 0). This embodiment of this application imposes no limitation on a position at which the mouse pointer appears on the display of the PAD.

(3) the Mouse Pointer is Displayed on the Display of the PAD.

After the PC calculates the start position (padX, padY) of the mouse pointer to be displayed on the display of the PAD, the PC may send a message to the PAD, where the message carries the coordinates (padX, padY), to notify the PAD to display the mouse pointer at the coordinates (padX, padY). At the same time, the mouse pointer of the PC moves to coordinates (vmX, vmY) of the virtual screen of the PC. The coordinates (vmX, vmY) correspond to the coordinates (padX, padY), and values of the coordinates are the same.

For example, the display resolution of the display of the PC is 2560×1600 (pixels), the display resolution of the display of the PAD is 1280×800 (pixels), and display resolution of the virtual screen created by the PC is the same as that of the PAD, that is, 1280×800 (pixels). When the coordinates (pcX, pcY) of the mouse pointer reaching the right edge of the PC are (2560, 1000), the start position (padX, padY) at which the mouse pointer appears on the display of the PAD and that is obtained by the PC through calculation may be (0, 500). Similarly, the coordinates (vmX, vmY) at which the mouse pointer moves to the virtual screen are (0, 500). Then, the mouse pointer of the PC moves from the right edge (2560, 1000) of the PC to the left edge (0, 500) of the virtual screen. At the same time, the PC sends a message to the PAD, where the message carries coordinates (0, 500), to notify the PAD to display the mouse pointer at the coordinates (0, 500). In response to the notification of the PC, the PAD displays the mouse pointer at the coordinates (0, 500). Visually, the mouse pointer shuttles from the display of the PC to the display of the PAD. Other cases in which the mouse pointer "shuttles" from the PC to the PAD are the same. The foregoing examples do not constitute any limitation on this embodiment.

The PC creates the virtual screen, so that the mouse pointer may penetrate from the display of the PC, and jumping display between different displays (including the virtual screen) can be implemented. In addition, the coordinates of the mouse pointer on the virtual screen may be directly sent to the PAD without complex coordinate conversion. If no virtual screen is created or no new external display is connected, the mouse pointer is limited within an edge range of the display of the PC. After the mouse pointer moves to the virtual screen, because the resolution of the virtual screen is the same as the resolution of the display of the PAD, coordinates of the mouse pointer on the virtual screen may be directly sent to the PAD, and complex coordinate conversion is not required. This is simple and convenient, and reduces CPU resource consumption.

(3) Response to the Input Event

Figure 4B:
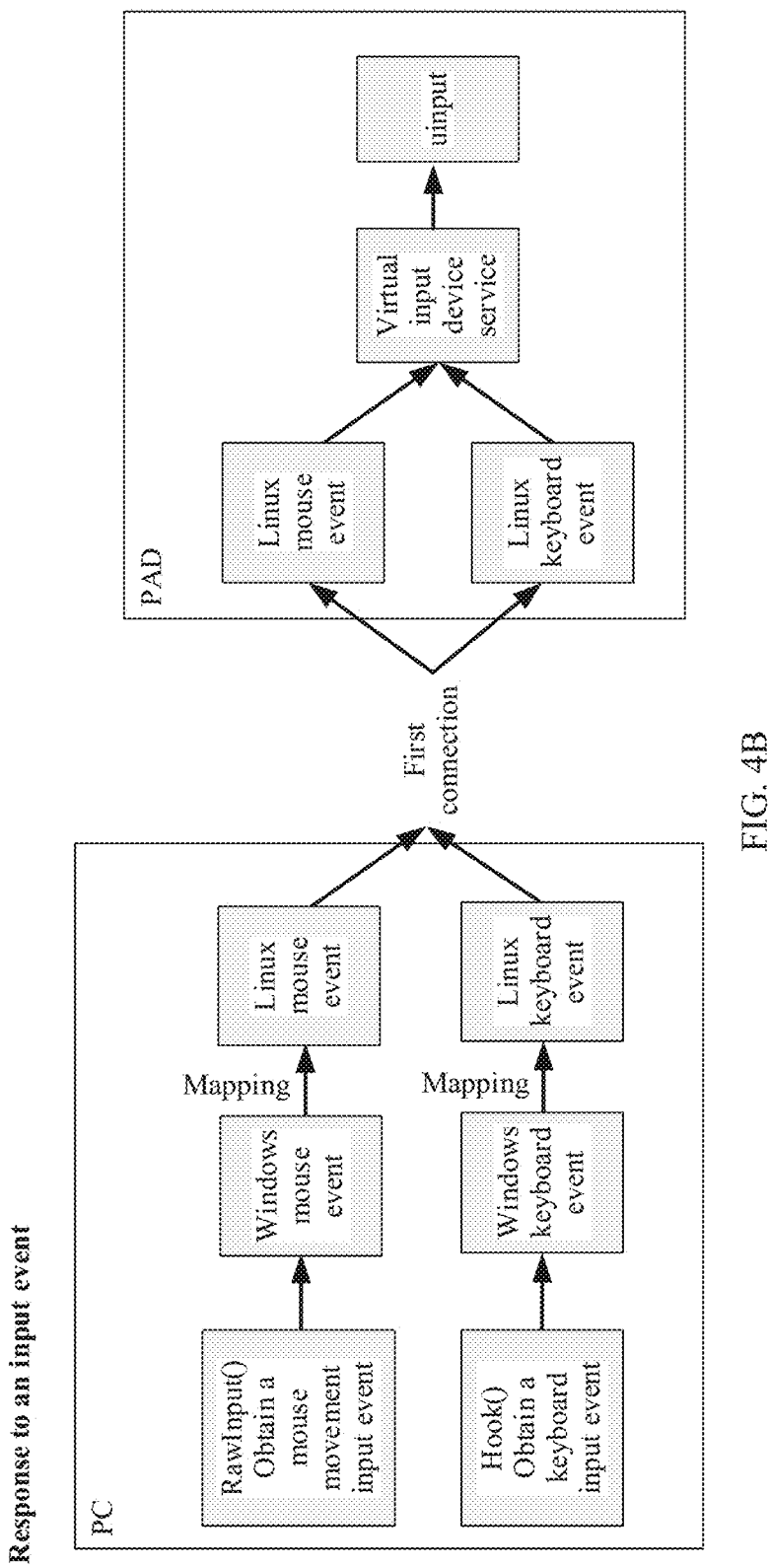

After the mouse pointer moves to the display of the PAD, input events of input devices (such as the mouse, the keyboard, and the handwriting pad) of the PC are captured and sent to the PAD. The PAD may respond to the input events of the input devices of the PC. At the same time, an input event on the PC side is shielded. In other words, the PC does not respond to the input event of the input device. Refer to FIG. 4B. Specifically, the following steps may be included:

(1) Obtain an Input Event.

When the input device such as the mouse, the keyboard, the voice input apparatus, the handwriting pad, or the camera detects that an input operation is performed by the user, the PC may capture the input operation, for example, movement of the mouse, clicking of the mouse, or tapping of a keyboard key, and generate a corresponding input event. For example, the PC running Windows® system can use the RawInput function to obtain a MOUSE_MOVE event of the mouse and generate the corresponding offset coordinates (relX, relY) of the mouse pointer. That is, the PC may obtain a moving distance and direction of the mouse, and correspondingly convert the moving distance and direction of the mouse into an offset distance and direction of the mouse pointer. If MOUSE_MOVE is specified as a MOUSE_MOVE_RELATIVE value, it indicates that the offset coordinates (relX, relY) are offset coordinates relative to a previous arouse position. If MOUSE_MOVE is specified as a MOUSE_MOVE_ABSOLUTE value, it indicates that the offset coordinates (relX, relY) are offset coordinates relative to a fixed position. However, in either way, the offset coordinates (relX, relY) indicate data of relative movement. According to the screen coordinate axis, relY is a negative value when the cursor moves upward, relY is a positive value when the cursor moves downward, relX is a negative value when the cursor moves leftward, and relX is a positive value when the cursor moves rightward.

In addition, the PC may further obtain a pressing event of a mouse button and a scrolling event of a mouse wheel. For example, in the Windows® system, an RI_MOUSE_LEFT_BUTTON_DOWN value may indicate that a left mouse button is pressed, an RI_MOUSE_LEFT_BUTTON_UP value may indicate that the left mouse button is released, an RI_MOUSE_MIDDLE_BUTTON_DOWN value may indicate that a middle mouse button is pressed, an RI_MOUSE_MIDDLE_BUTTON_UP value may indicate that the middle mouse button is released, an RI_MOUSE_RIGHT_BUTTON_DOWN value may indicate that a right mouse button is pressed, and an RI_MOUSE_RIGHT_BUTTON_UP value may indicate that the right mouse button is released. RI_MOUSE_WHEEL may indicate an input from the mouse wheel. A positive value of a wheel increment indicates that the wheel rotates forward and a negative value indicates that the wheel rotates backward. RI_MOUSE_H-WHEEL may indicate an input from a horizontal mouse wheel. A positive value of a wheel increment indicates that the wheel rotates rightward and a negative value indicates that the wheel rotates leftward.

The PC may obtain an input event of the keyboard by using a Hook function. For example, when a first key of the keyboard is pressed, the PC may obtain a state KEYDOWN in which the first key is pressed and a key value (key code) of the first key. If the first key is released, the first key is restored to a released state KEYUP. Each key of the keyboard corresponds to a key value. The key value can comply with an ASCII code table. When a character key is pressed, a corresponding character can be entered. When a control key is pressed, a corresponding control function can be invoked.

The foregoing embodiments are merely some examples, and constitute no limitation on this embodiment of this application. The input event may alternatively be a voice input, a handwriting input, a touch input, and a combination thereof.

(2) Map the Input Event.

In some embodiments, the PC may store a first mapping table Map, and the first mapping table may indicate a mapping relationship between an input event of the PC and an input event of the PAD. The input event includes but is not limited to a mouse movement event, a mouse click event, a mouse wheel scrolling event, a keyboard input event, a remote control lever movement event, a voice input event, and the like. For example, the PC may map an input event of the Windows® system to an input event of a Linux® system according to the first mapping table, and the input event of the Linux® system may act on the PAD. For example, a left mouse button click event on the Windows® system may be mapped to a click event on the Linux® system, and a right mouse button click event on the Windows® system may be mapped to a touch and hold event on the Linux® system. A key code value of a first key in the Windows® system may be mapped to a corresponding key code value in the Linux® system. For example, for a character "a", a key code in the Windows® system may be different from a key code in the Linux® system.

Because the resolution of the virtual screen of the PC is the same as that of the display of the PAD, the coordinate value of the mouse pointer on the virtual screen of the PC may be the same as the coordinate value of the mouse pointer on the PAD, and the absolute coordinates and the offset coordinates of the mouse pointer on the virtual screen of the PC may be directly sent to the PAD without complex coordinate conversion. This is simple and convenient, and reduces CPU resource consumption.

(3) Send and Respond to Input Data.

In some embodiments, the Linux® system has its own input (input) subsystem, configured to manage input events in a unified manner. A uinput implemented based on the input subsystem can conveniently simulate input events in userspace (userspace). For example, the uinput may be used to create a virtual device (such as a virtual mouse or a virtual keyboard) and configure attributes of the virtual device. Then, an input event inputevent sequence obtained from the PC can be written to a /dev/uinput device file and the input event is delivered. In this way, the PAD can obtain an input event of the input device such as the mouse or the keyboard of the PC when there is no input device such as a mouse or a keyboard.

The PC may pack the input event obtained from the first mapping table into a data packet that conforms to a format of a first connection transmission protocol, and then send the data packet to the PAD through the first connection (for example, Wi-Fi Direct). After receiving the input event, the PAD injects the input event into the uinput, and the PAD responds to the input event. Data of the input event may include an occurrence time (time) of the input event, an input event type (type), a code (code) of the input event type, a value (value) of the input event, and the like.

For example, the input event type (type) is EVENT_KEY (keyboard), the code (code) of the input event type is a device keyboard code, and code values 0 to 127 are key codes on the keyboard. If the value (value) of the input event is 1, the key is pressed. If the value is 0, the key is released. If the input event type (type) is EVENT_MOUSE (mouse), the code (code) of the input event type is a device mouse code. Code values 0x110 to 0x116 are mouse button codes. 0x110 (BTN_LEFT) is a code of the left mouse button, 0x111 (BTN_RIGHT) is a code of the right mouse button, and 0x112 (BTN_MIDDLE) is a code of the middle mouse button. If the value (value) of the input event is 1, the key is pressed. If the value is 0, the key is released. If the input event type (type) is EVENT_REL (relative coordinate), the code (code) value of the input event type indicates a track type. For example, REL_X indicates that the mouse pointer offsets in an X-axis direction (code: 0x00), REL_Y indicates that the mouse pointer offsets in a Y-axis direction (code: 0x01), and REL_WHEEL indicates a moving direction of the mouse wheel (code: 0x08). Positive and negative values indicate two values in different directions. For code meanings of other input events, refer to an include/linux/input.h file.

After the foregoing steps, after the PC establishes the first connection to the PAD, when the mouse pointer moves over an edge of the display of the PC, the mouse pointer may be correspondingly displayed on the display of the PAD. In addition, when the mouse pointer is displayed on the PAD, an input event from the input device of the PC may be converted and sent to the PAD, and the PAD responds to the input event, for example, mouse movement, mouse clicking, and a keyboard character input.

The implementation described in the foregoing embodiment is merely an example for description, and constitutes no limitation on this application. Specific internal implementations may vary with different types of the electronic device, different operating systems running on the electronic device, different programs used, and different interfaces invoked. This is not limited in this embodiment of this application, provided that functions described in this embodiment of this application can be implemented.

Figure 5A:
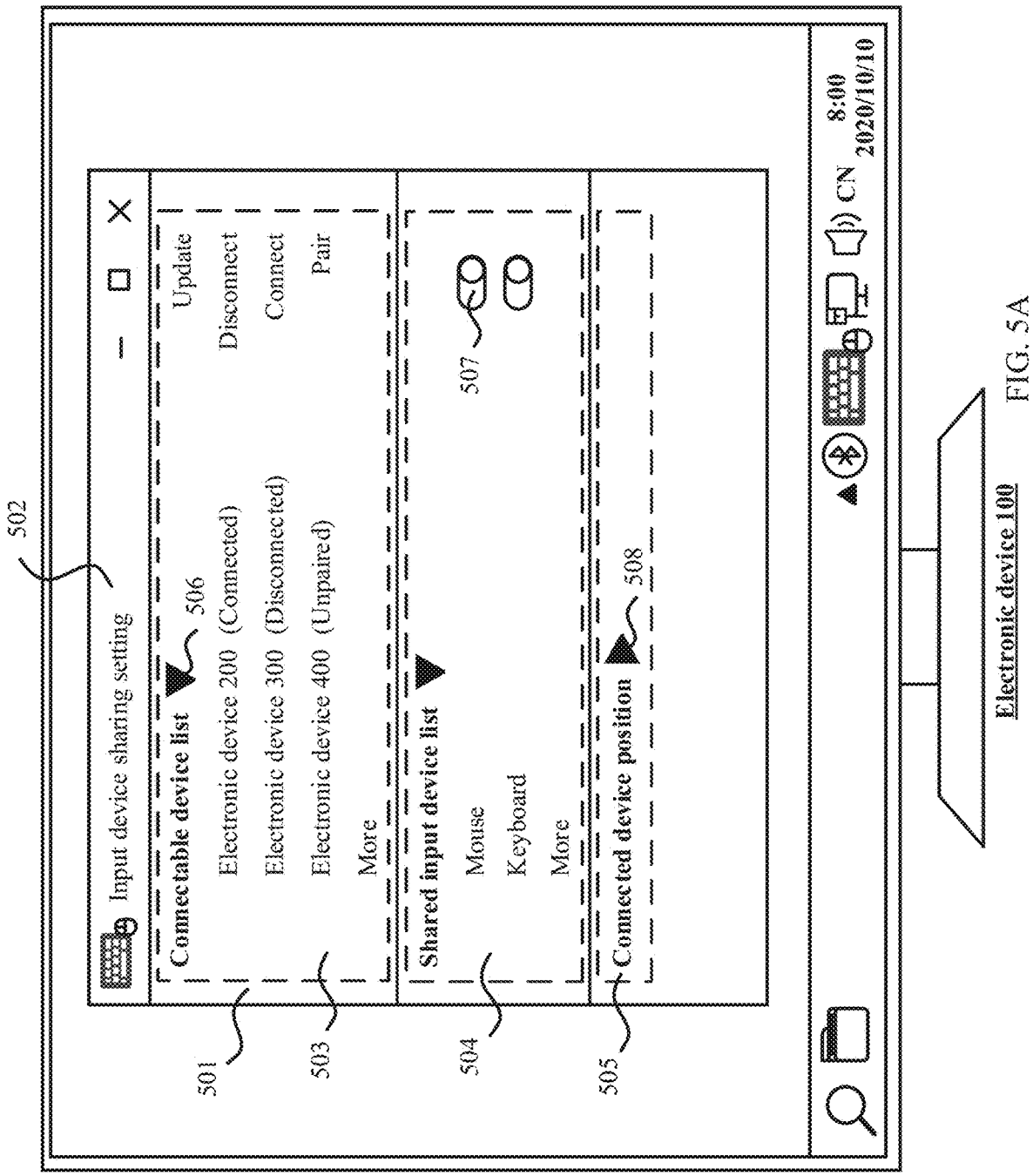
Figure 5B:
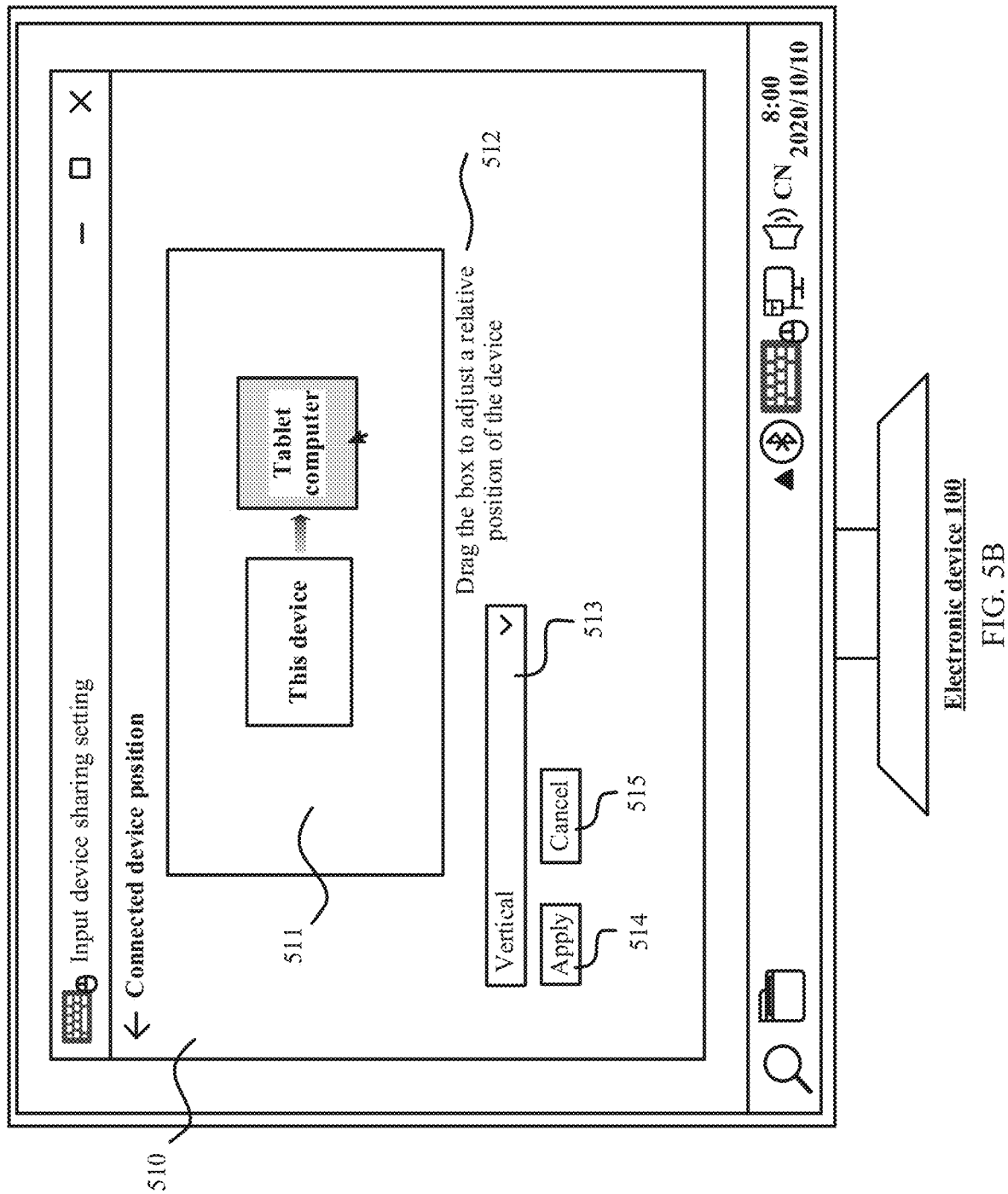

FIG. 5A, FIG. 5B, and FIG. 5C are a schematic diagram of some user interfaces according to an embodiment of this application. In some embodiments, as shown in FIG. 5A, based on a function of sharing an input device provided in another embodiment of this application, an input device sharing setting interface such as an interface 501 may be added to the electronic device 100. The interface 501 may include a title bar 502, and the title bar 502 may display a title text "input device sharing device" and an icon. The interface 501 further includes a plurality of option lists, for example, a connectable device list 501, a shared input device list 504, and a connected device position 505.

The connectable device list 503 may display devices that can be connected currently to use a shared input device function. These devices may be listed in sequence in the connectable device list 503, and a connection status of the device is displayed, for example, connected, paired but not connected, or unpaired. In FIG. 5A, the electronic device 200 is in a connected state and may share an input device with this device, an electronic device 300 is in a paired but not connected state and can share the input device only after being connected, and an electronic device 400 is in an unpaired state and can be connected only after the electronic device 100 initiates pairing and succeeds in pairing. The connectable device list 503 further includes a refresh control, and the current connectable device list may be refreshed after the refresh control is selected. The connectable device list 503 further includes a display/hide list control 506, and all or some connectable devices may be displayed or hidden by clicking the display/hide list control 506. The connectable device list 503 may display only some commonly used or closest electronic devices. If a searched electronic device is not listed in the connectable device list, a "More" control may be clicked, and the electronic device 100 may display all connectable devices in another user interface. A connection between the electronic device 100 and the electronic device 200 may be manually initiated by a user, or it may be set that a connection is automatically established when the function is enabled next time after the connection succeeds. A user operation for initiating a connection may be that the user taps a "connect" control in a setting interface, or may be that the user brings the electronic device 200 closer to the electronic device 100, for example, a "touch" operation is an operation for triggering a connection, or may be a user operation such as a first gesture. This is not limited in this embodiment of this application.

The shared input device list 504 may display an existing input device, such as a mouse, a keyboard, a handwriting pad, and a camera. The user may independently select an input device that needs to be shared, and a switch control 507 is an On/Off control for selecting an input device. In FIG. 5A, the switch control 507 of the mouse and the keyboard is displayed as an On state, that is, the mouse and the keyboard of the current electronic device 100 may be shared with the electronic device 200. Similarly, there is a display/hide list in the shared input device list 504, and all or some input devices may be displayed or hidden by clicking a display/hide list control. Similarly, only some commonly used input devices may be displayed in the shared input device list 504. If a searched input device is not listed in the input device list, a "More" control may be clicked, and the electronic device 100 may display another input device.

The connected device position 505 control is used to facilitate the user to set a relative position relationship between a plurality of electronic devices. By clicking a control 508, detailed setting interfaces shown in FIG. 5B and FIG. 5C may be displayed.

FIG. 5B is a schematic diagram of setting a connected device position. As shown in FIG. 5B, a connected device position interface 510 may include a schematic box 511 of a device position relationship, and a prompt 512 "Drag the box to adjust a relative position of the device". The schematic box 511 of a device position relationship in FIG. 5B shows that a right edge of the electronic device 100 (this device) is connected to a left edge of a tablet computer, and a mouse pointer may penetrate from the right edge of the electronic device 100 (this device), and then enter from the left edge of the tablet computer. In the interface 510, a horizontal/vertical selection box 513 may be further displayed. That is, after a device is selected in the schematic box 511, the user may select an orientation of a long edge or a short edge of the device in the horizontal/vertical selection box 513. For example, horizontal indicates that the long edges of the device are in the upper and lower sides, and the short edges are in the left and right sides. Vertical indicates that the long edges of the device are in the left and right sides, and the long edges are in the upper and lower sides. In FIG. 5B, the tablet computer is selected by the user, and an area is gray, indicating that the tablet computer is in a selected state. The horizontal/vertical selection box 513 is vertical, that is, the long edges of the tablet computer are in the left and right sides, and the long edges are in the upper and lower sides. The horizontal/vertical direction affects an edge, long edge or short edge, connected between electronic devices, and affects calculation of a position of the mouse pointer on the edge of the device. For example, if the tablet computer is vertical, the right edge of this device is connected to the long edge of the tablet computer; or if the tablet computer is horizontal, the right edge of this device is connected to the long edge of the tablet computer. The position of the mouse pointer shuttling between devices varies with different edge connection relationship. After the position relationship of the device is adjusted, an apply control 514 may be clicked to save and take effect the setting. If the setting needs to remain unchanged, a cancel control 515 may be clicked.

The user may drag a schematic device in the schematic box 511, to change an edge connection relationship between the devices. For example, in FIG. 5B, the user drags the tablet computer from the right side of this device to the lower side of this device, to display a connected device position interface 520 shown in FIG. 5C, that is, as shown in a schematic box 521, the tablet computer is located on a lower side of this device, indicating that the mouse pointer may penetrate from the bottom edge of this device and enter from the top edge of the tablet computer. In a horizontal/vertical selection box 522, the tablet computer is set to be horizontal, that is, the long edges of the tablet computer are located in the upper and lower sides.

The setting-related user interfaces shown in FIG. 5A, FIG. 5B, and FIG. 5C are merely some examples, and constitute no limitation on this embodiment of this application. The setting interface of the shared input device may include more or fewer controls or functions than the example interface. For example, setting a font size, setting resolution, and the like. In addition, the setting interface of the shared input device may not only be disposed on the electronic device 100, and a same or similar setting interface of the shared input device may be also disposed on a peer electronic device, for example, the electronic device 200. Related settings of the shared input device can be performed on both terminals, and the function is the same.

FIG. 6A-1 to FIG. 6B-2 illustrate a process in which a mouse pointer moves from an edge of a display of the electronic device 100 to an edge of a display of the electronic device 200, that is, a process in which the mouse pointer shuttles.

Figure 6A-1:
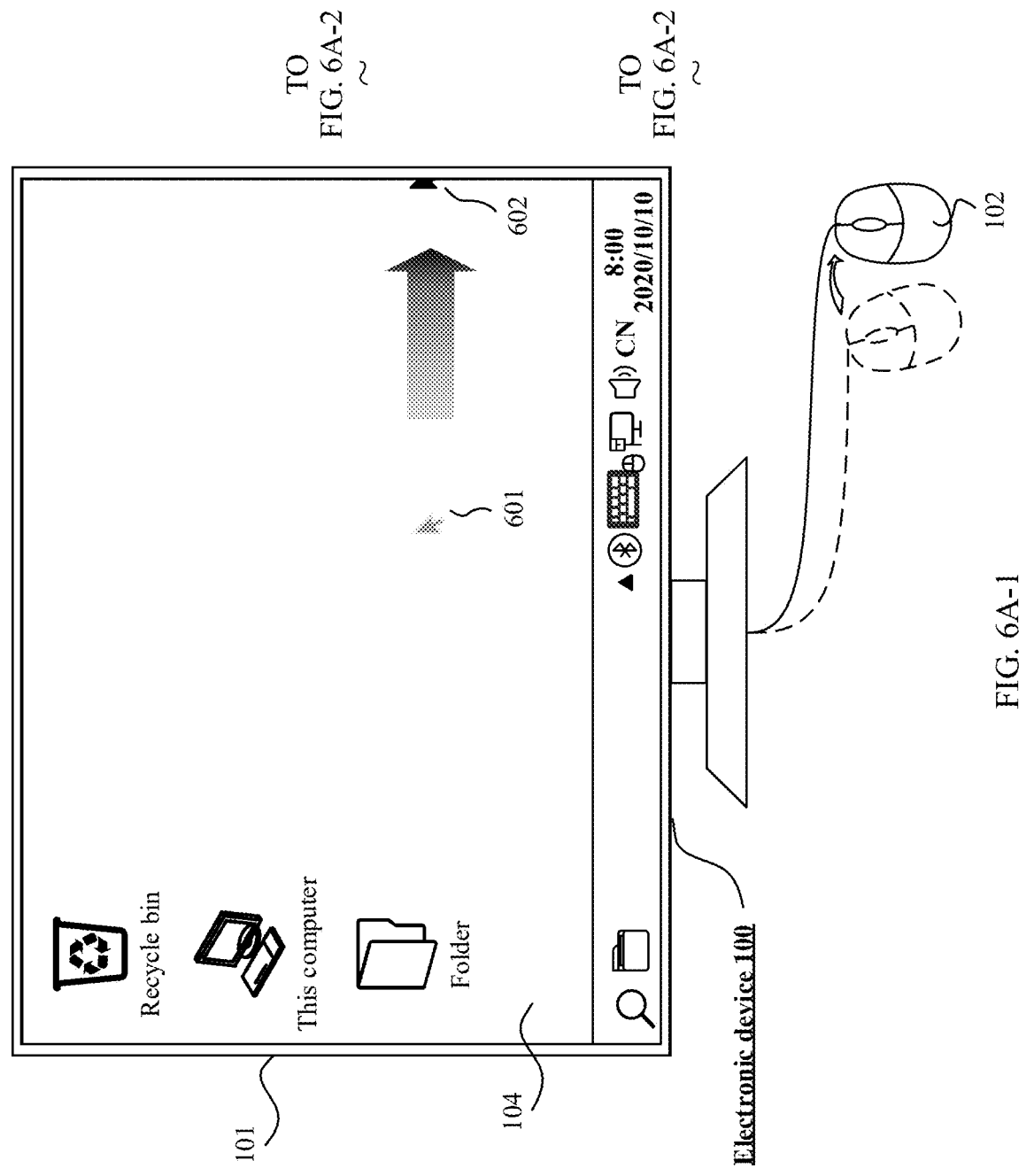
Figures 1, 6B:
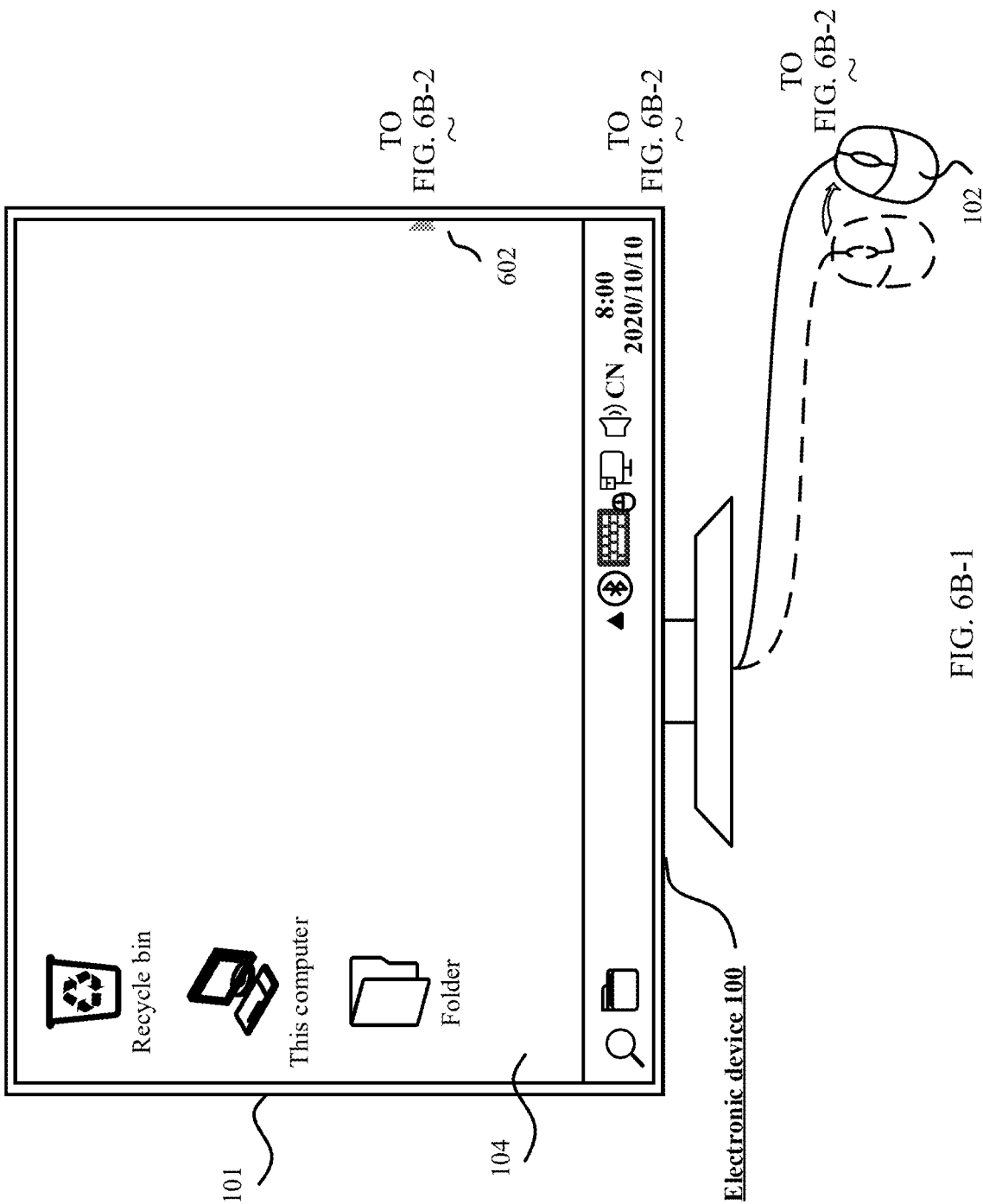
Figures 2, 6B:
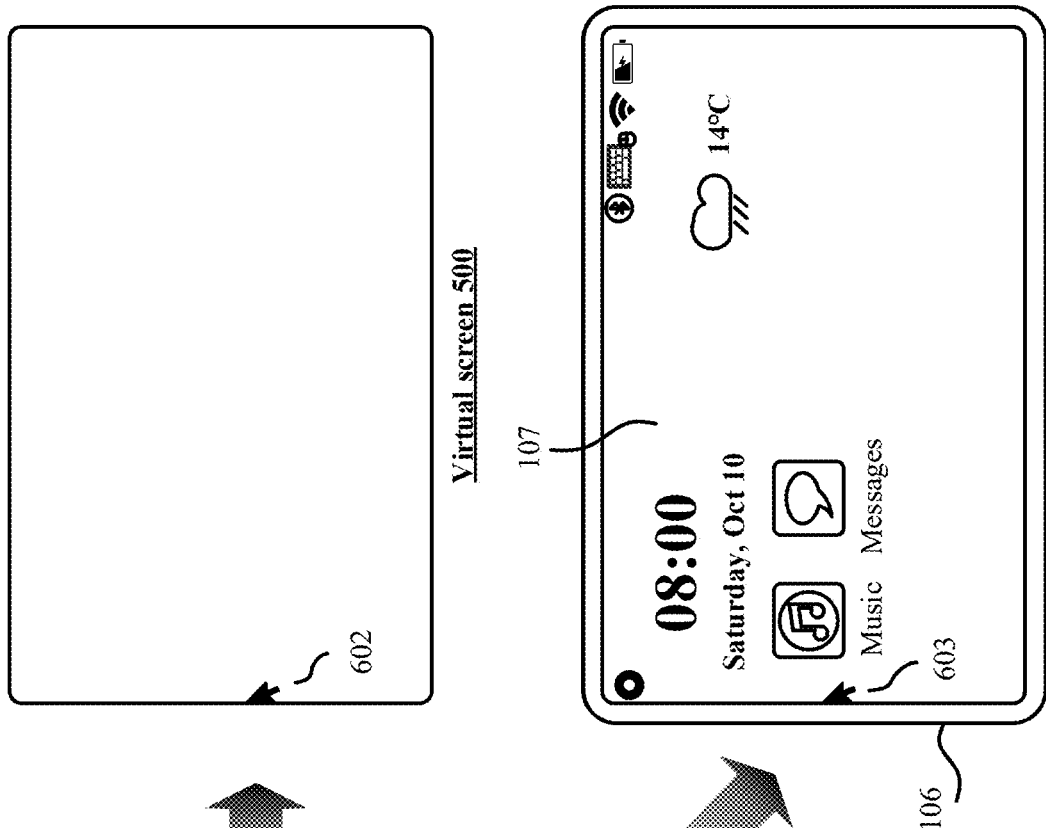

As shown in FIG. 6A-1 to FIG. 6B-2, the electronic device 100 and the electronic device 200 have established a first connection 610 that supports a shared input device function. After the first connection 610 is established, the electronic device 200 may create a virtual screen 500 whose resolution is the same as that of the electronic device 200. In the example in FIG. 6A-1 and FIG. 6A-2, it may be set that a left edge of the virtual screen 500 is connected to a right edge of the electronic device 100. In this way, a mouse pointer 601 may penetrate from a right edge of the interface 104 of the electronic device 100 and enter from a left edge of an interface of the virtual screen 500. At the same time, a mouse pointer 603 is displayed at a left edge of the interface 107 of the electronic device 200, as shown in FIG. 6B-1 and FIG. 6B-2.

As shown in FIG. 6A-1 and FIG. 6A-2, the interface 104 is displayed on the display 101 of the electronic device 100. The interface 104 is a desktop of the electronic device 100, and the mouse pointer 601 is displayed in the interface 104. When the user moves the mouse 102 rightward, as shown in the figure, the mouse moves rightward from the dotted line position to the solid line position, the mouse pointer 601 may move along the arrow direction in the figure to a position (pcX, pcY) of the mouse pointer 602 at the right edge of the interface 104. Then, the electronic device 100 may calculate, based on (pcX, pcY), a position (padX, padY) at which the mouse pointer is to appear correspondingly at the left edge of the interface 107 of the electronic device 200, and a position (vmX, vmY) at which the mouse pointer 602 is to be displayed at the left edge of the virtual screen 500. Because the resolution of the virtual screen 500 is set to be the same as the resolution of the electronic device 200 to simplify coordinate conversion, the position (vmX, vmY) of the mouse pointer in the virtual screen 500 has the same coordinate value as the position (padX, padY) of the mouse pointer in the electronic device 200.

As shown in FIG. 6B-1 and FIG. 6B-2, when the mouse pointer 602 of the electronic device 100 is located on the right edge of the interface 104, when the user continues to move the mouse 102 rightward, as shown in the figure, the mouse moves rightward from the dotted line position to the solid line position, the mouse pointer 602 may move along the arrow direction in the figure to the position (vmX, vmY) at the left edge of the virtual screen 500. In addition, the electronic device 100 may send a message carrying the position (padX, padY) to the electronic device 200 through the first connection 610, to notify the electronic device 200 to display the mouse pointer at the position (padX, padY). When receiving the message, the electronic device 200 displays the mouse pointer 603 at the position (padX, padY) at a right edge of the interface 107. The position (vmX, vmY) of the mouse pointer 602 on the virtual screen 500 corresponds to the position (padX, padY) of the mouse pointer 603 on the electronic device 200. Visually, a continuous effect in which the mouse pointer shuttles from the right edge of the desktop interface 104 of the electronic device 100 to the left edge of the desktop interface 107 of the electronic device 200 may be presented.

Figures 1, 6C:
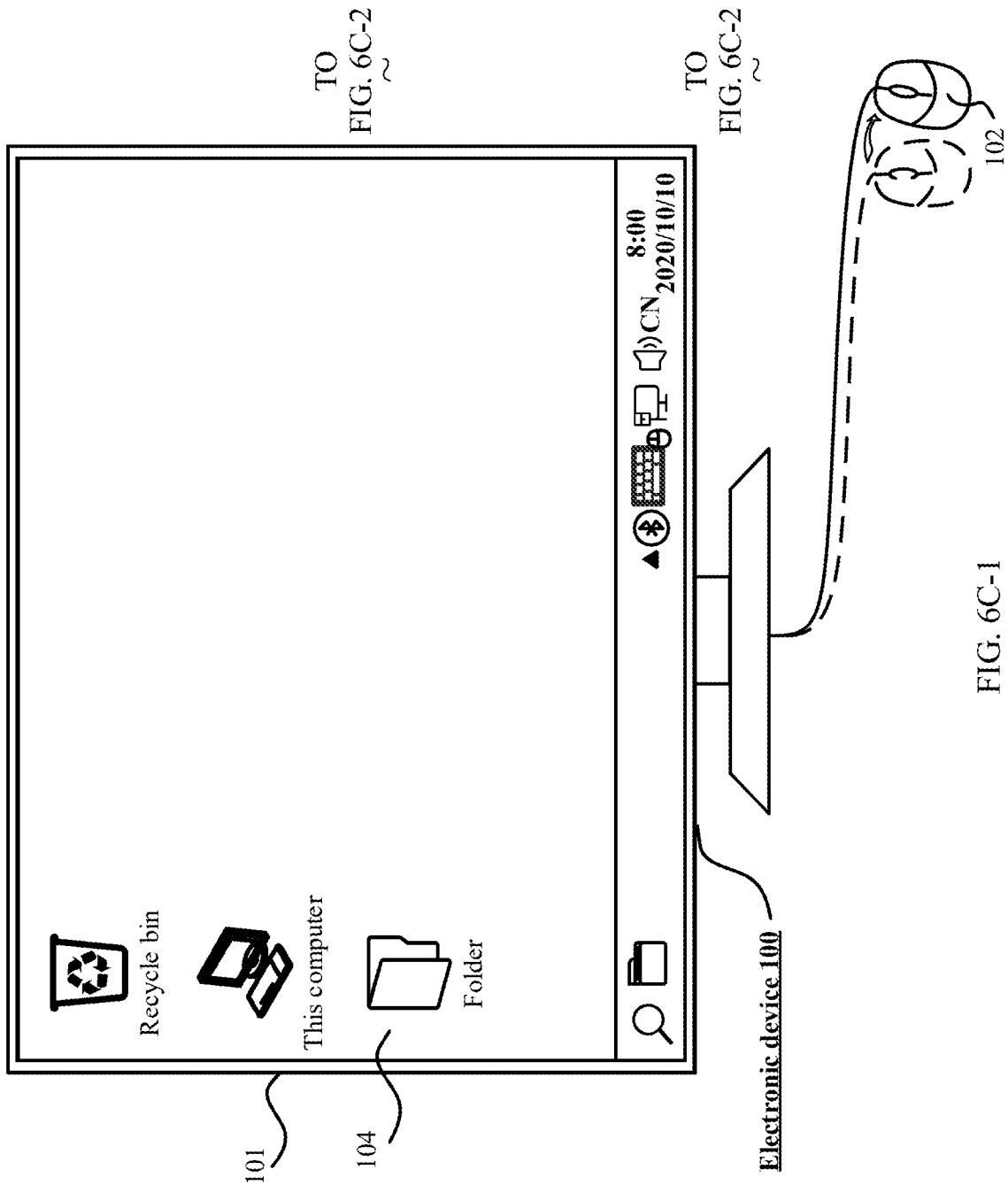

As shown in FIG. 6C-1 and FIG. 6C-2, after the mouse pointer 603 is displayed at the left edge of the electronic device 200, if the user continues to move the mouse 102 rightward, as shown in the figure, the mouse moves rightward from a dotted line position to a solid line position, a specific movement distance of the mouse 102 corresponds to offset coordinates (relX, relY). According to the offset coordinates (relX, relY), on the virtual screen 500, the mouse pointer 602 may move to a position of a mouse pointer 604 along an arrow direction in the figure. In addition, the electronic device 100 may send, to the electronic device 200 through the first connection 610, a message carrying the offset coordinates (relX, relY), to notify the mouse pointer 603 of the electronic device 200 to shift rightward by a distance (relX, relY). After the message is received, the mouse pointer 603 in the interface 107 of the electronic device 200 is shifted rightward to a mouse pointer 605. A position (vmX, vmY) of the mouse pointer 604 on the virtual screen 500 corresponds to a position (padX, padY) of the mouse pointer 605 on the electronic device 200. In a user's view, a visual effect that the mouse pointer on the desktop interface 107 of the electronic device 200 moves with the movement of the mouse 102 may be presented. This is not limited to a case in which the mouse pointer enters from the left edge of the electronic device 200 after penetrating from the right edge of the electronic device 100 shown in FIG. 6A-1 and FIG. 6A-2, FIG. 6B-1 and FIG. 6B-2, and FIG. 6C-1 and FIG. 6C-2. Alternatively, the mouse pointer may penetrate from another edge, such as an upper edge, a lower edge, or a left edge, of the electronic device 100, and then enter from any other edge of the electronic device 200. For a display interface, refer to FIG. 6A-1 to FIG. 6C-2. Details are not described herein again.

Figure 7A:
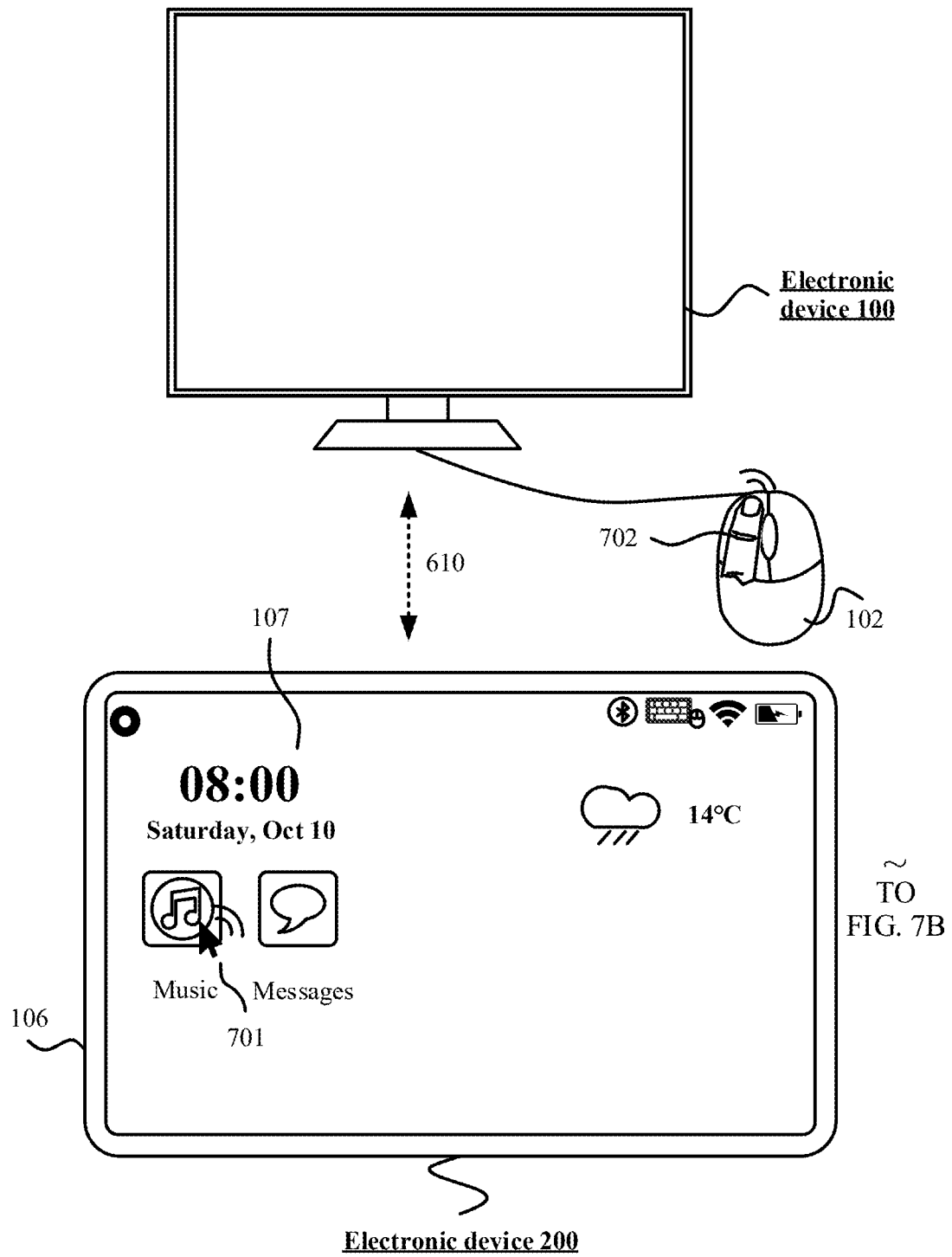
FIG. 7A and FIG. 7B are a schematic diagram of a user interface according to an embodiment of this application.
Figure 7B:
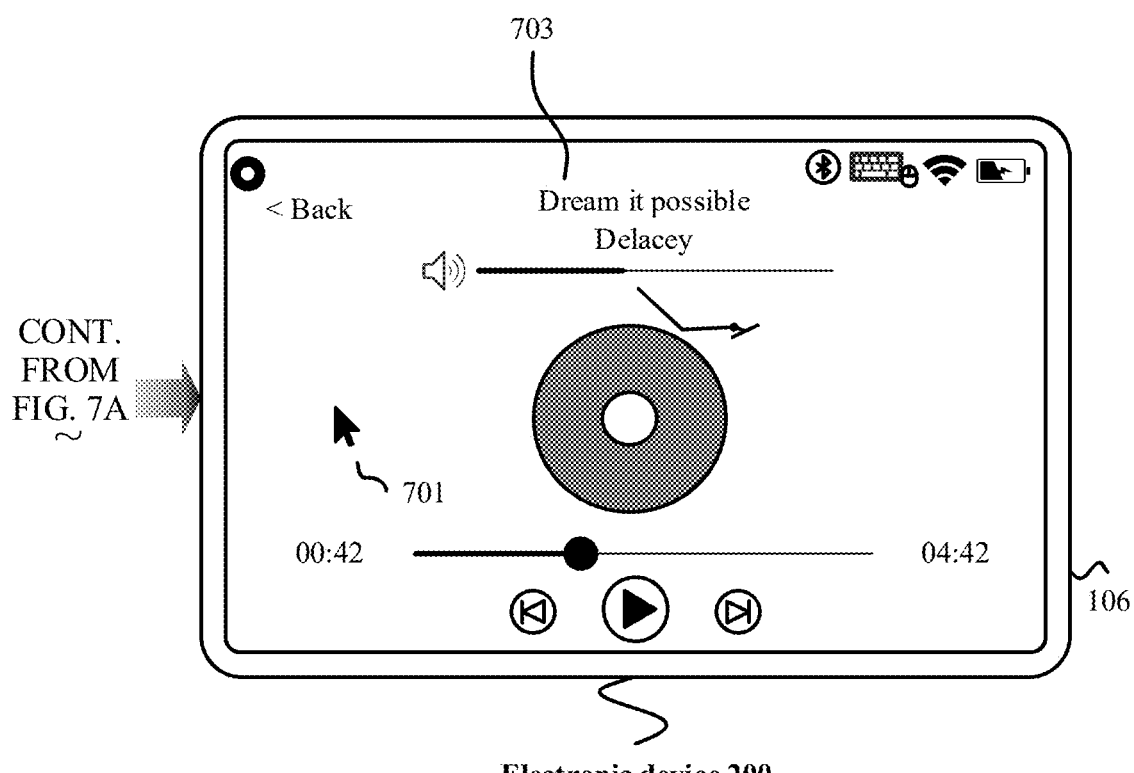

FIG. 7A and FIG. 7B are a schematic diagram of the electronic device 200 responding to a click event of the mouse 102. After the mouse pointer "shuttles" to the interface 107 of the electronic device 200 shown in FIG. 6A-1 to FIG. 6C-2, as shown in FIG. 7A and FIG. 7B, the user may control the input device such as the mouse 102 or the keyboard 103 of the electronic device 100 to generate an input event. The electronic device 200 may respond after receiving the input event from the electronic device 100. For example, in FIG. 7A and FIG. 7B, the user may perform a mouse click operation 702 by moving a mouse pointer 701 to an icon of "Music" in the interface 107 of the electronic device 200. After obtaining the mouse click operation 702, the electronic device 100 may map, according to the first mapping table, a mouse click operation 702 event to a click event that can act on the electronic device 200, and send the click event to the electronic device 200 through the first connection 610. In response to the click event of the "Music" icon, the electronic device 200 opens Music, and displays an application interface 703. Then, the user may further perform operations such as playing music, adjusting volume, and switching a song on the application interface 703 by controlling the mouse 102.

Figure 8A:
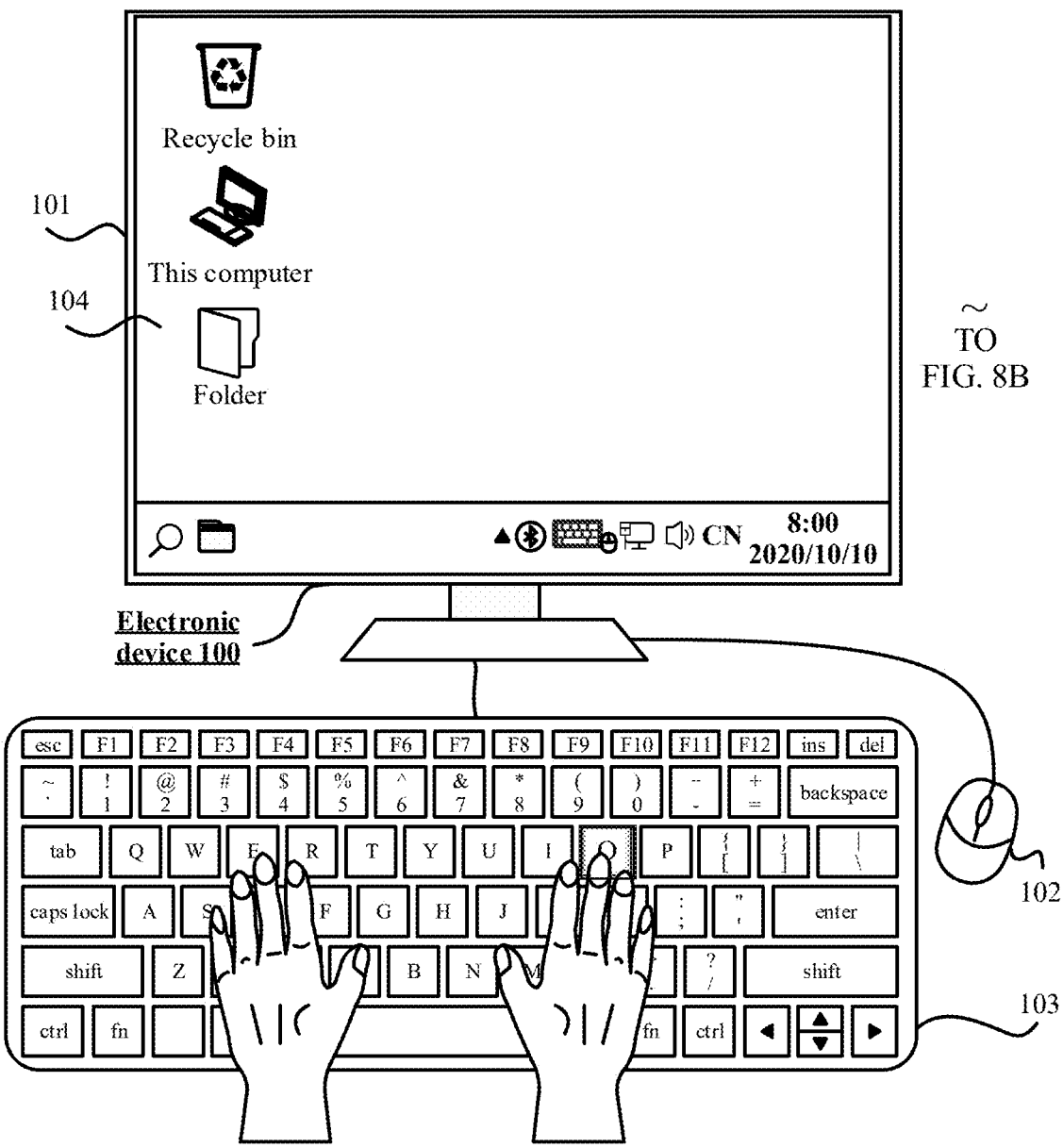
FIG. 8A and FIG. 8B are a schematic diagram of a user interface according to an embodiment of this application.
Figure 8B:
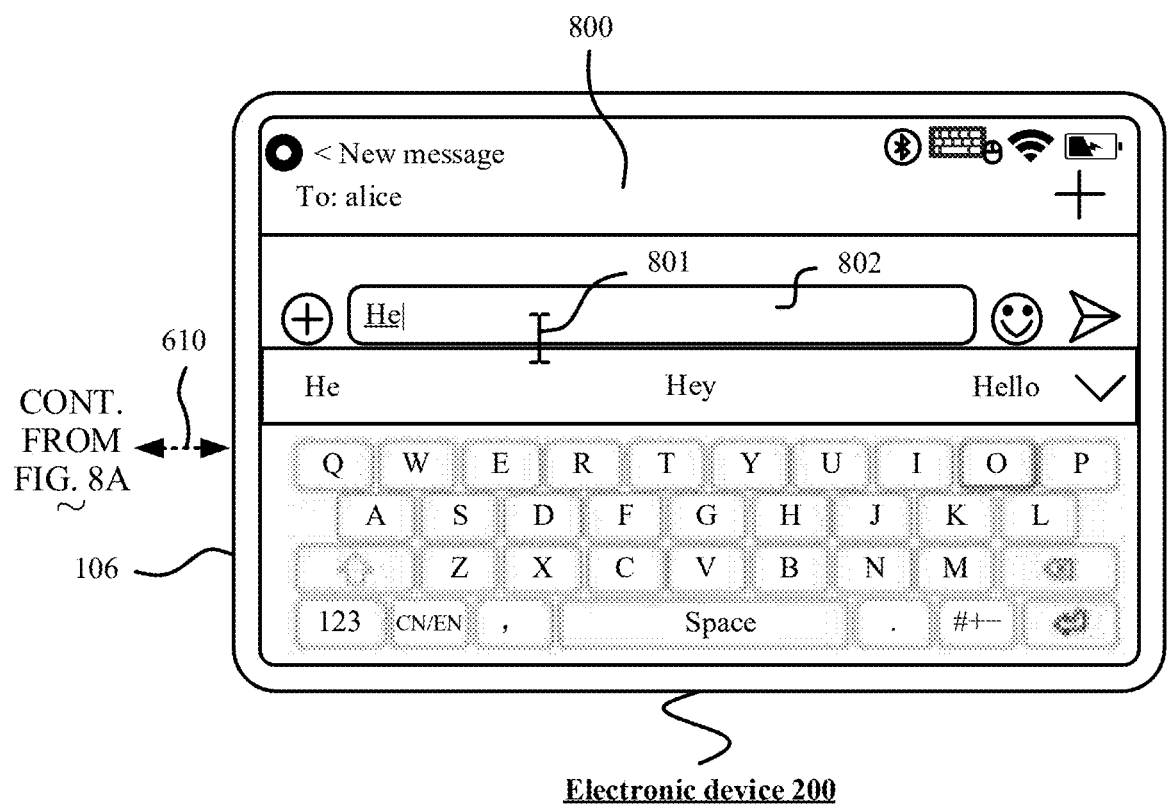

FIG. 8A and FIG. 8B are a schematic diagram of the electronic device 200 responding to an input event of the keyboard 103. In the figure, the electronic device 200 and the electronic device 100 have established the first connection 610, and share the input device. The electronic device 200 may receive an input from the keyboard 103 and respond to the input.

As shown in FIG. 8A and FIG. 8B, the electronic device 200 displays an interface 800. After a mouse pointer 801 clicks an input box 802, content may be entered in the input box 802. For example, after the user taps a first key of the keyboard 103, and the electronic device 100 obtains an operation of pressing the first key, the electronic device 100 may send a message of input content and a corresponding key value of the first key to the electronic device 200 through the first connection 610. After receiving the message of the electronic device 100, the electronic device 200 may display a corresponding character in the input box 802. As shown in FIG. 8A and FIG. 8B, the user taps keys corresponding to a string of characters He on the keyboard 103, and in response to a key operation, the electronic device 200 displays the character string "He" in the input box 802. Certainly, in addition to characters, the electronic device 200 may further respond to a key control command of the keyboard, for example, "enter". This is not limited in this embodiment.

FIG. 7A and FIG. 7B and FIG. 8A and FIG. 8B merely illustrate scenarios of a mouse click event and a keyboard input event. Certainly, the input event includes but is not limited to a mouse movement event, a mouse click event, a mouse wheel scrolling event, a keyboard input event, a remote control lever movement event, a voice input event, and the like. Any operation of the input device of the electronic device 100 may act on the electronic device 200. This is not limited in the foregoing embodiment.

FIG. 9A to FIG. 9C-2 are a schematic diagram of interfaces in a scenario in which a plurality of electronic devices share an input device. A scenario in which three devices, namely, the electronic device 100 (this device), a tablet computer, and a mobile phone, are connected is used as an example for description. A case in which a plurality of other electronic devices share an input device may be deduced in a similar manner. Details are not described again.

In some embodiments, after the electronic device 100 separately establishes a connection for sharing an input device with the tablet computer and the mobile phone, the electronic device 100 may create a virtual screen whose resolution is the same as that of the tablet computer and a virtual screen whose resolution is the same as that of the mobile phone. Then, in the input device sharing setting, a connected device position interface 901 shown in FIG. 9A may be displayed. In a device connection relationship schematic box 902, the user may adjust a connection relationship between the electronic device 100 and the tablet computer or the mobile phone. For example, in the schematic box 902 of a device position relationship in FIG. 9A, the tablet computer is placed on a right side of the electronic device 100 (this device), and the mobile phone is placed on a lower side of this device, that is, a right edge of this device is connected to a left edge of the tablet computer, and a lower edge of this device is connected to an upper edge of the mobile phone. It indicates that the mouse pointer may penetrate from the right edge of the electronic device 100 (this device) and then enter from the left edge of the tablet computer, and the mouse pointer may penetrate from the lower edge of the electronic device 100 (this device) and then enter from an upper edge of the mobile phone.

Figure 9A:
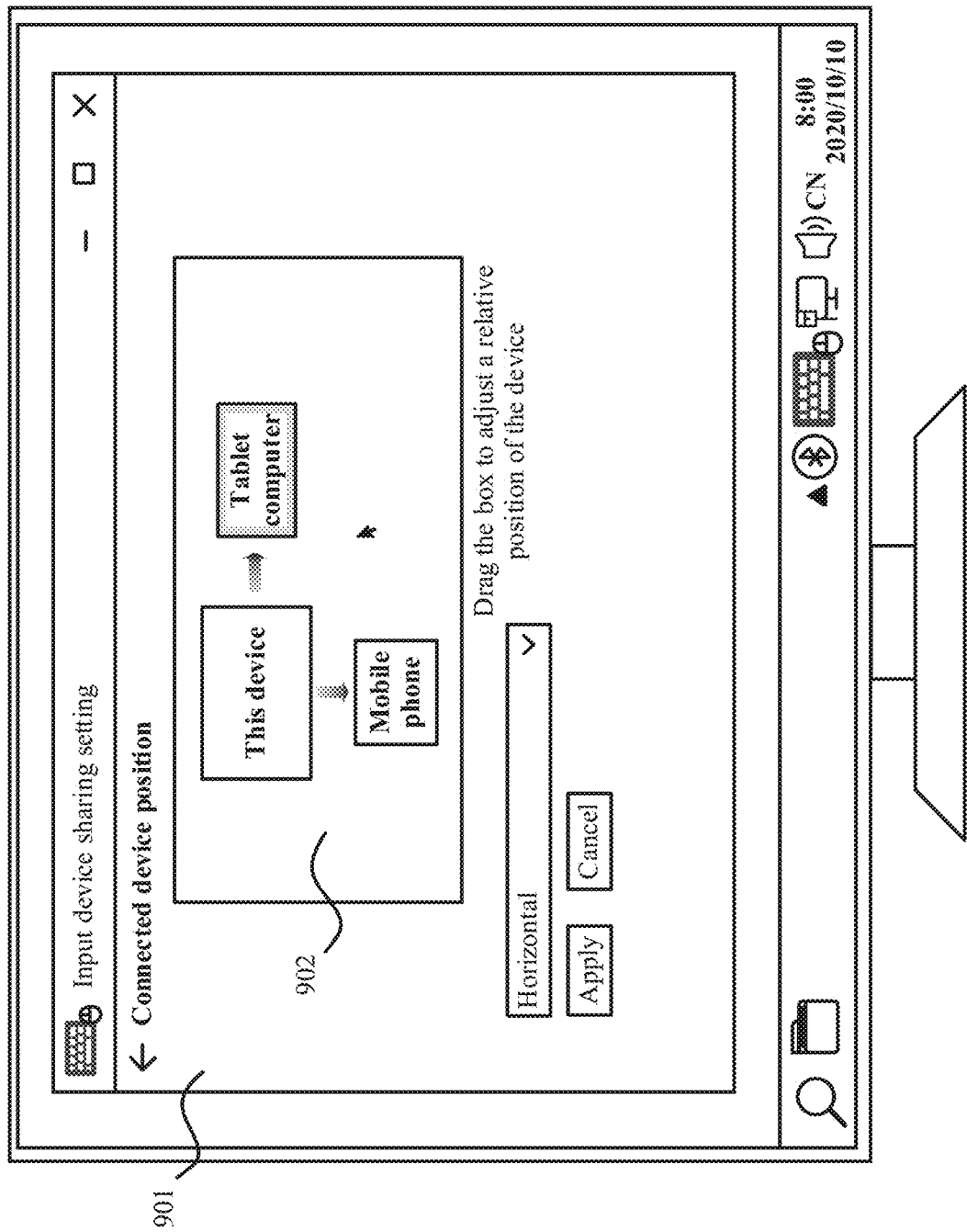
Figures 2, 9B:
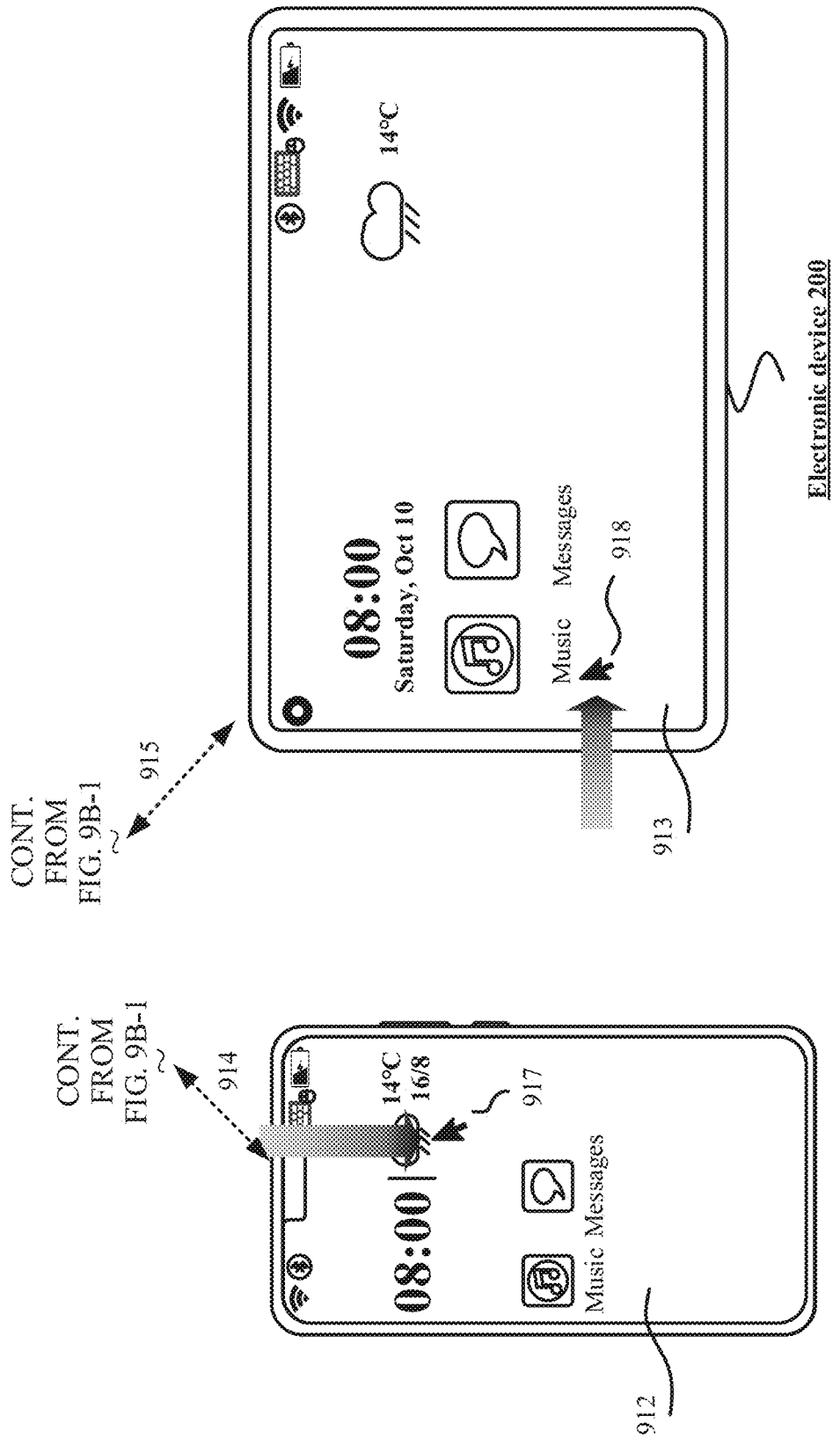

As shown in FIG. 9B-1 and FIG. 9B-2, a connection 915 for sharing an input device is established between the electronic device 100 and the electronic device 200 (the tablet computer), and a connection 914 for sharing an input device is established between the electronic device 100 and the electronic device 300 (the mobile phone). An input device of the electronic device 100, such as a mouse or a keyboard, may be shared by the electronic device 200 and the electronic device 300 for use. For example, the electronic device 200 and the electronic device 300 may use a mouse of the electronic device 100 to perform a click operation or use a keyboard to perform a character input operation. As shown in FIG. 9B-1 and FIG. 9B-2, after the electronic device 100 is connected to the mouse device, a mouse pointer 916 may be displayed in an interface 911 of a display of the electronic device 100. After the connected device position setting shown in FIG. 9A is performed, in response to a mouse movement operation, the mouse pointer 916 may penetrate from a lower edge of the display interface 911 and then enter from an upper edge of a display interface 912 of the electronic device 300, and a mouse pointer 917 is displayed in the interface 912. The mouse pointer 916 may alternatively penetrate from a right edge of the display interface 911 and then enter from a left edge of a display interface 913 of the electronic device 200, and a mouse pointer 918 is displayed in the interface 913. The mouse pointer 917 may move with movement of the mouse, and when the mouse pointer 917 is located in the interface 912 of the electronic device 300, the electronic device 300 may respond to an input operation of the input device, such as clicking of the mouse and a character input of the keyboard. Similarly, the mouse pointer 918 may move with movement of the mouse, and when the mouse pointer 918 is located in the interface 913 of the electronic device 200, the electronic device 200 may respond to an input operation of the input device, such as clicking of the mouse and a character input of the keyboard.

FIG. 9C-1 and FIG. 9C-2 shows a process of moving a mouse pointer from a display of the electronic device 300 to a display of the electronic device 200 in the scenario shown in FIG. 9B-1 and FIG. 9B-2. In the scenario shown in FIG. 9C-1 and FIG. 9C-2, because no direct communication connection is established between the electronic device 200 and the electronic device 300, the mouse pointer cannot directly move from the electronic device 300 to the electronic device 200, but needs to pass through the electronic device 100. For example, as shown by an arrow in FIG. 9C-1 and FIG. 9C-2, as the user moves the mouse upward, a mouse pointer 921 located on the electronic device 300 may penetrate from an upper edge of the interface 912 and then enter from a lower edge of the interface 911 of the electronic device 100, and a mouse pointer 922 is displayed in the interface 911 of the electronic device 100. Then, the user may continue to move the mouse rightward, the mouse pointer 922 located on the electronic device 100 may continue to penetrate from a right edge of the interface 911 and then enter from a left edge of the interface 913 of the electronic device 200, and a mouse pointer 923 is displayed in the interface 913 of the electronic device 200.

Certainly, the user may drag a schematic device in a device connection relationship schematic box 1002, to change an edge connection relationship between the devices. For example, in FIG. 10A, the user may adjust the connection relationship between the electronic device 100 and the mobile phone or the tablet computer. As shown in the schematic box 1002 in a connected device position interface 1001, the tablet computer is placed on a right side of the electronic device 100 (this device), and the mobile phone is placed on a left side of this device. That is, the right edge of this device is connected to the left edge of the tablet computer, and the left edge of this device is connected to the right edge of the mobile phone. It indicates that the mouse pointer may penetrate from the right edge of the electronic device 100 (this device) and then enter from the left edge of the tablet computer, and the mouse pointer may penetrate from the left edge of the electronic device 100 (this device) and then enter from the right edge of the mobile phone.

Figure 10A:
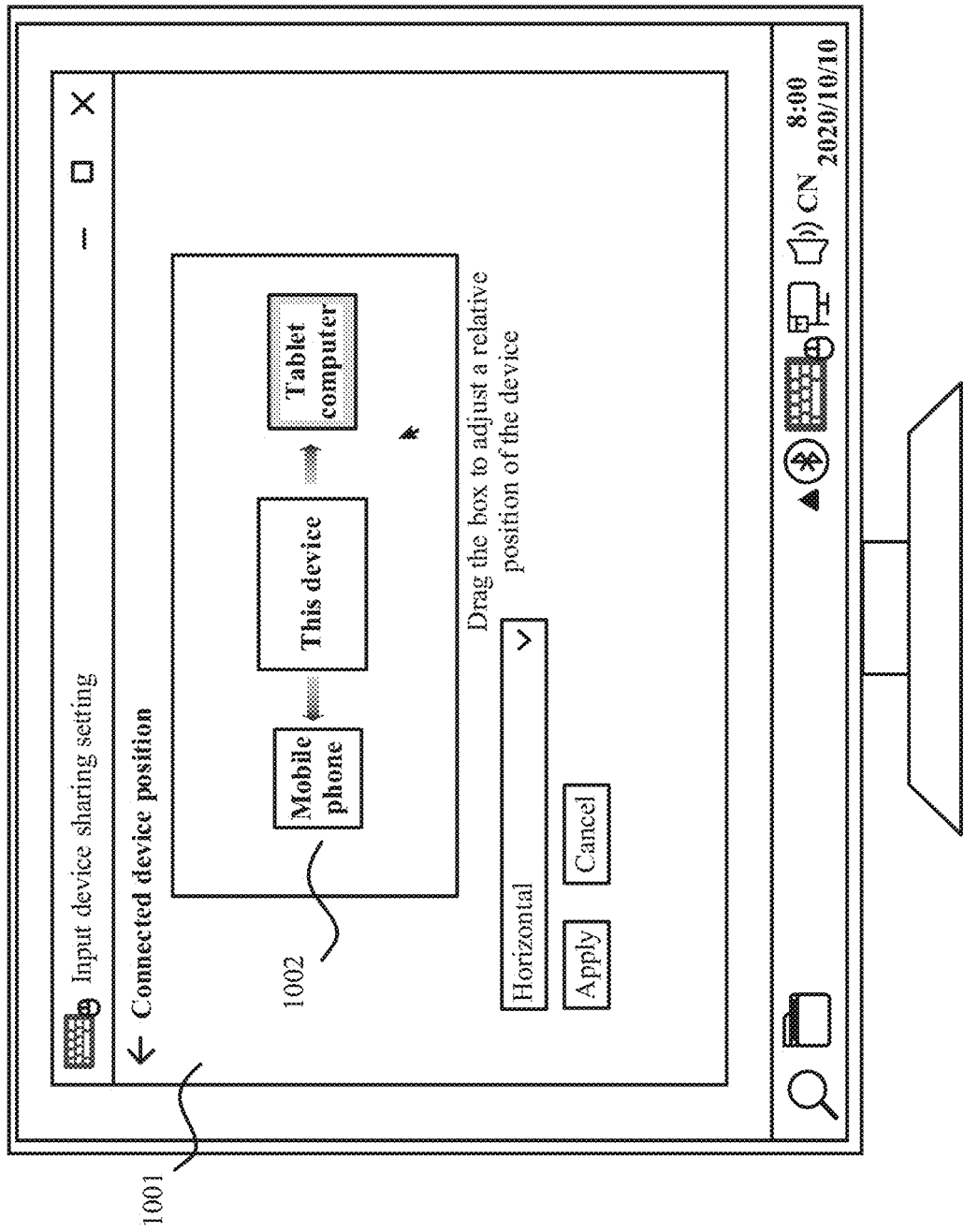
Figures 2, 10B:
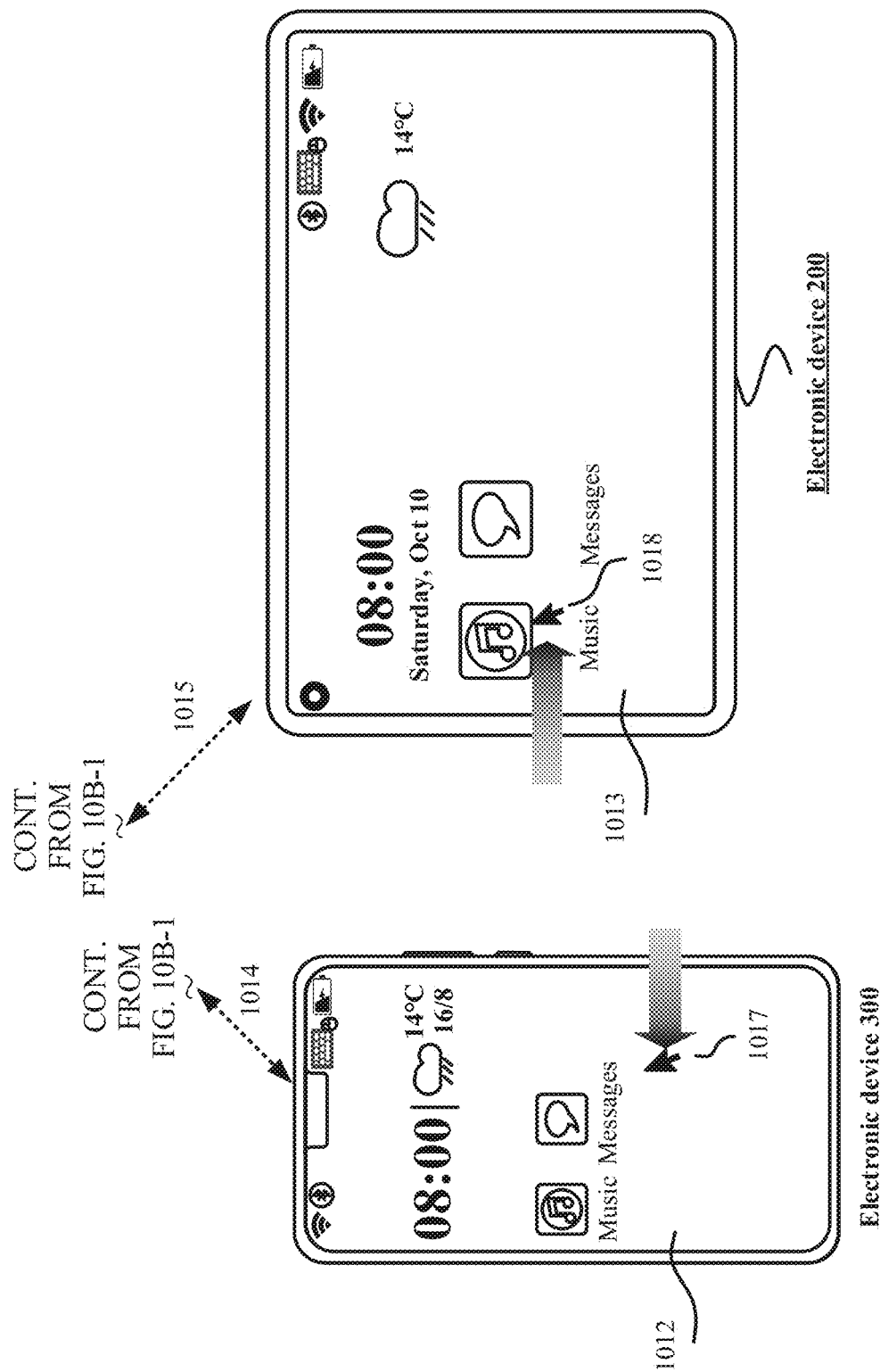

Similarly, as shown in FIG. 10B-1 and FIG. 10B-2, a connection 1015 for sharing an input device is established between the electronic device 100 and the electronic device 200 (the tablet computer), and a connection 1014 for sharing an input device is established between the electronic device 100 and the electronic device 300 (the mobile phone). An input device of the electronic device 100, such as a mouse or a keyboard, may be shared by the electronic device 200 and the electronic device 300 for use. For example, the electronic device 200 and the electronic device 300 may use a mouse of the electronic device 100 to perform a click operation or use a keyboard to perform a character input operation. As shown in FIG. 10B-1 and FIG. 10B-2, after the electronic device 100 is connected to the mouse device, a mouse pointer 1016 may be displayed in an interface 1011 of a display of the electronic device 100. After the connected device position setting shown in FIG. 10A is performed, in response to a mouse movement operation, the mouse pointer 1016 may penetrate from a left edge of the display interface 1011 and then enter from a right edge of a display interface 1012 of the electronic device 300, and a mouse pointer 1017 is displayed in the interface 1012. The mouse pointer 1016 may alternatively penetrate from a right edge of the display interface 1011 and then enter from a left edge of a display interface 1013 of the electronic device 200, and a mouse pointer 1018 is displayed in the interface 1013. The mouse pointer 1017 may move with movement of the mouse, and when the mouse pointer 1017 is located in the interface 1012 of the electronic device 300, the electronic device 300 may respond to an input operation of the input device, such as clicking of the mouse and a character input of the keyboard. Similarly, the mouse pointer 1018 may move with movement of the mouse, and when the mouse pointer 1018 is located in the interface 1013 of the electronic device 200, the electronic device 200 may respond to an input operation of the input device, such as clicking of the mouse and a character input of the keyboard.

FIG. 10C-1 and FIG. 10C-2 show a process of moving a mouse pointer from a display of the electronic device 300 to a display of the electronic device 200 in the scenario shown in FIG. 10B-1 and FIG. 10B-2. In the scenario shown in FIG. 10C-1 and FIG. 10C-2, because no direct communication connection is established between the electronic device 200 and the electronic device 300, the mouse pointer cannot directly move from the electronic device 300 to the electronic device 200, but needs to pass through the electronic device 100. For example, as shown by an arrow in FIG. 10C-1 and FIG. 10C-2, as the user moves the mouse rightward, a mouse pointer 1021 located on the electronic device 300 may penetrate from a right edge of the interface 1012 and then enter from a left edge of the interface 1011 of the electronic device 100, and a mouse pointer 1022 is displayed in the interface 1011 of the electronic device 100. Then, the user may continue to move the mouse rightward, the mouse pointer 1022 located on the electronic device 100 may continue to penetrate from a right edge of the interface 1011 and then enter from a left edge of the interface 1013 of the electronic device 200, and a mouse pointer 923 is displayed in the interface 1013 of the electronic device 200.

Not limited to the arrangement between the plurality of devices shown in the foregoing embodiment, the user may increase or decrease a quantity of devices and/or adjust a connection relationship between the plurality of devices based on a requirement of the user. For a schematic interface and an internal implementation, refer to the foregoing embodiment. This is not limited in this embodiment of this application.

Figure 11:
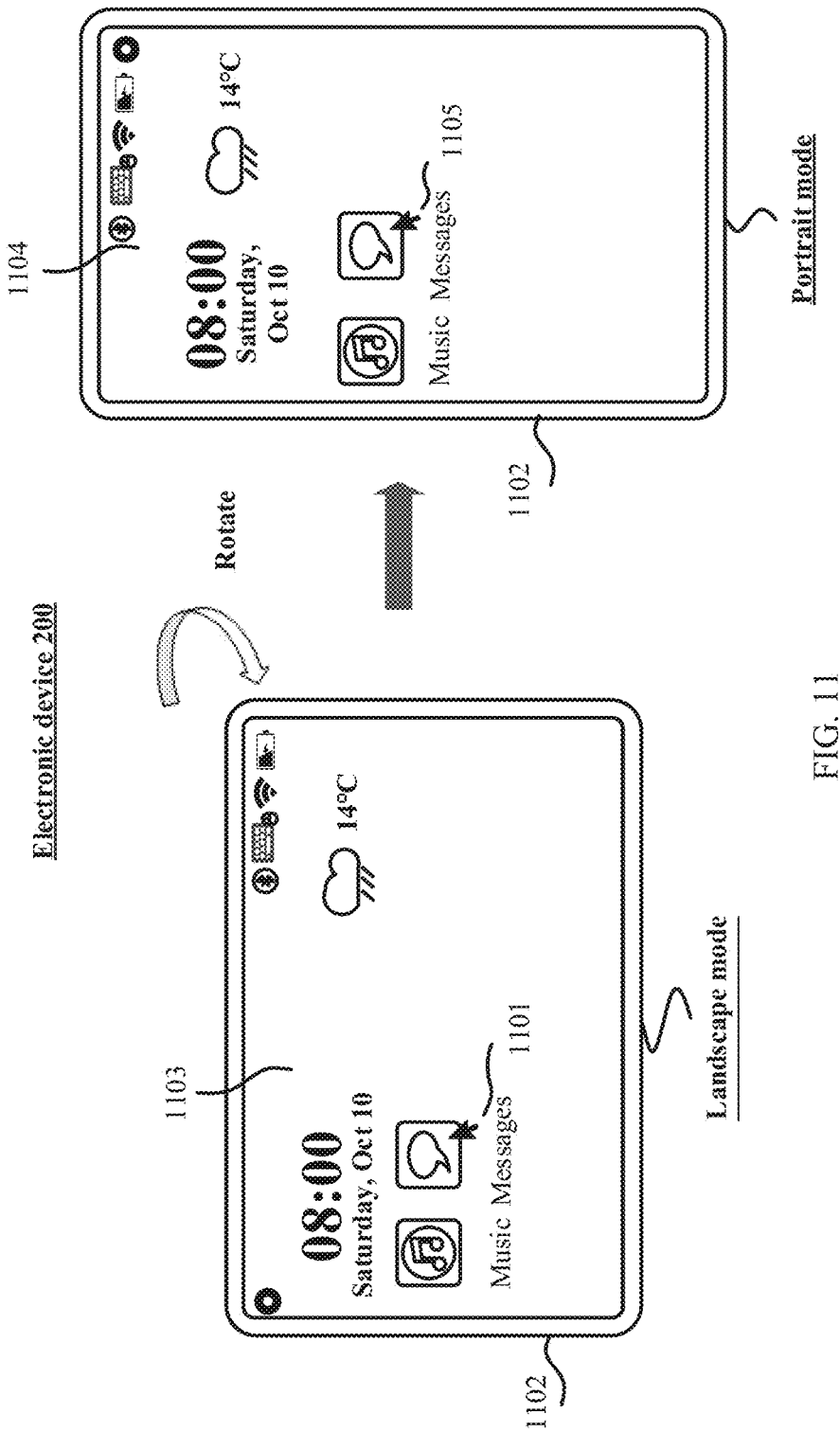
FIG. 11 is a schematic diagram of a user interface according to an embodiment of this application.

FIG. 11 shows a change of a position of a mouse pointer when the electronic device 200 (tablet computer) switches from a landscape mode to a portrait mode in some embodiments. Refer to the foregoing embodiment. The tablet computer shown in FIG. 11 has established a shared input device connection with the electronic device 100, and a user may perform an input on the tablet computer by using an input device (such as a mouse, a keyboard, or a handwriting pad) of the electronic device 100. The landscape mode and the portrait mode are relative concepts of a mode in which the electronic device is placed. For example, as shown in FIG. 11, the landscape mode of the tablet computer indicates that long sides of a display 1102 of the tablet computer are located in upper and lower directions, and short sides are located in left and right directions. When the electronic device is in the portrait mode, a downward direction is defined as a gravity direction. The portrait mode of the tablet computer indicates that short sides of the display 1102 of the tablet computer are located in upper and lower directions, and long sides are located in left and right directions. If a direction of locking a display interface of the electronic device 200 is not set, when the electronic device 200 switches from the landscape mode to the portrait mode, an arrangement layout of the display interface may change under gravity sensing detection. For example, a gravity direction is used as a downward direction, and an interface arrangement layout in the landscape mode is different from an interface arrangement layout in the portrait mode. The electronic device 200 may automatically adjust an arrangement layout of characters, symbols, icons, and the like in the display interface, to facilitate reading by the user. As the arrangement layout of the display interface changes, the position of the mouse pointer may also change.

As shown in FIG. 11, when the tablet computer is in the landscape mode, a mouse pointer 1101 is displayed in a display interface 1103. The tablet computer in the landscape mode is rotated by 90 degrees, so that the tablet computer switches to the portrait mode. As the landscape mode switches to the portrait mode, a layout of a display interface 1104 may also change, and a layout of icons, controls, and characters in the interface 1104 is adapted to the portrait mode. A position of a mouse pointer 1105 in the display interface 1104 may also change accordingly. In some embodiments, for example, as shown in FIG. 11, in the landscape mode, the mouse pointer 1101 points to an application icon "Messages". After the tablet computer rotates to be in the portrait mode, the tablet computer may redraw and display the mouse pointer 1105 at a corresponding position of the application icon "Messages" after the layout changes. In this case, an object pointed by the mouse pointer remains unchanged before and after the landscape/portrait mode is switched. This is more convenient for the user and provides better user experience.

In some other embodiments, an absolute position of the mouse pointer may also remain unchanged in the landscape/portrait mode. For example, resolution of the tablet computer is 1280×800 (pixels), the vertex in the upper left corner is used as the origin (0, 0), and the position of the mouse pointer in the landscape mode is point A (600, 500), if the tablet computer is rotated rightward by 90 degrees, the tablet computer switches to be in the portrait mode. In the portrait mode, the position of the mouse pointer changes to point B (300, 600). Visually, the position of the mouse pointer in the landscape mode is the same as that in the portrait mode, pointing to a same pixel position.

In some other embodiments, a ratio of the horizontal/vertical coordinates of the mouse pointer may remain unchanged. For example, the resolution of the tablet computer is 1280×800 (pixels), the vertex of the upper left corner is used as the origin (0, 0), the position of the mouse pointer in the landscape mode is point C (320, 600), a horizontal coordinate of point C is located at a quarter of a length of the horizontal edge, and a vertical coordinate of point C is located at three-quarters of a length of the vertical edge. If the tablet computer is rotated by 90 degrees rightward, the tablet computer switches to be in the portrait mode, and the position of the mouse pointer in the portrait mode may change to point D (200, 960) if a ratio of the horizontal edge to the vertical edge is consistent with that in the landscape mode.

When the position, mode, layout, or the like of the electronic device changes, the position of the mouse pointer may correspondingly change. The foregoing examples constitute no limitation on this embodiment of this application, and the position of the mouse pointer may change in a plurality of manners.

Figure 12A:
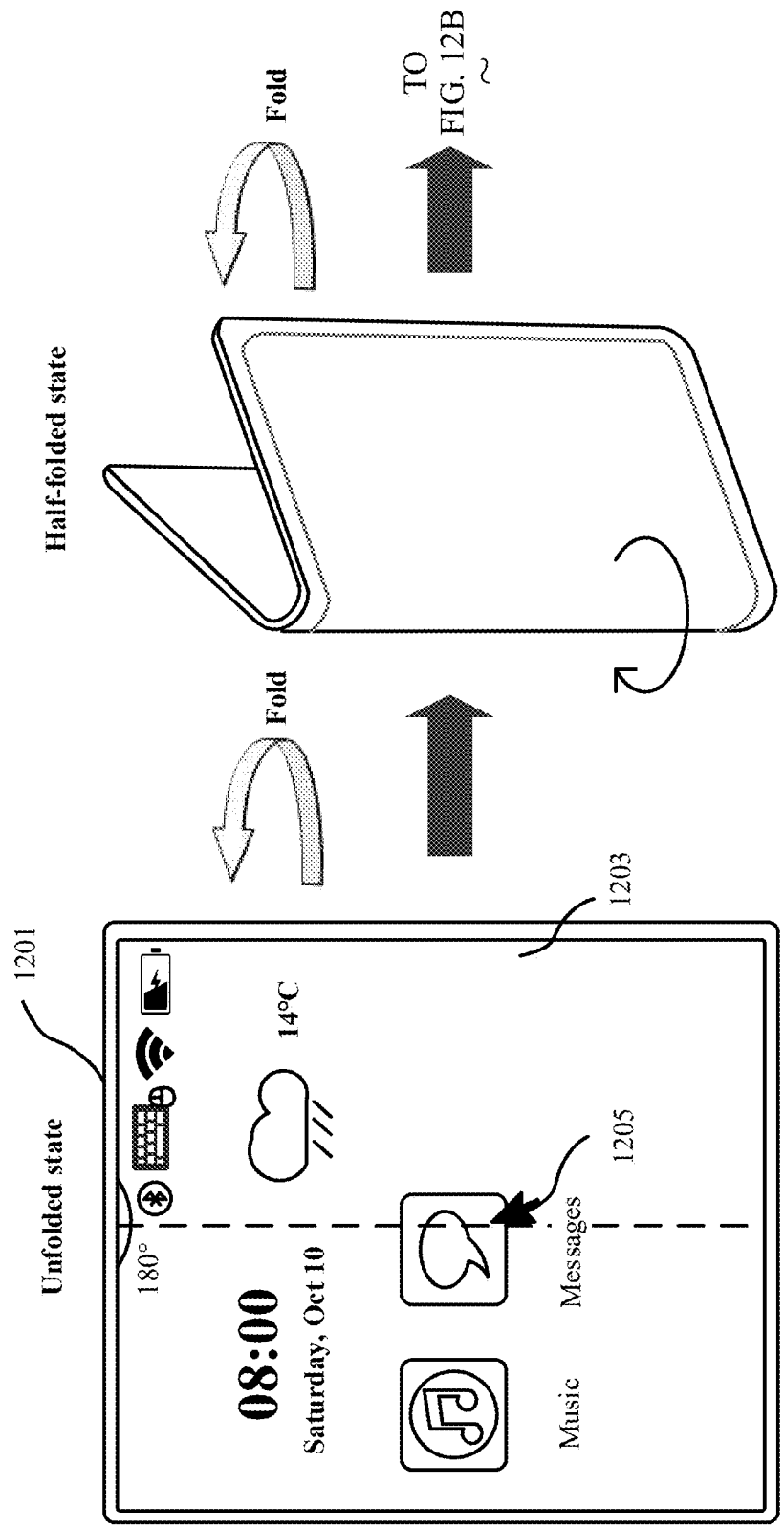
FIG. 12A and FIG. 12B are a schematic diagram of a user interface according to an embodiment of this application.
Figure 12B:
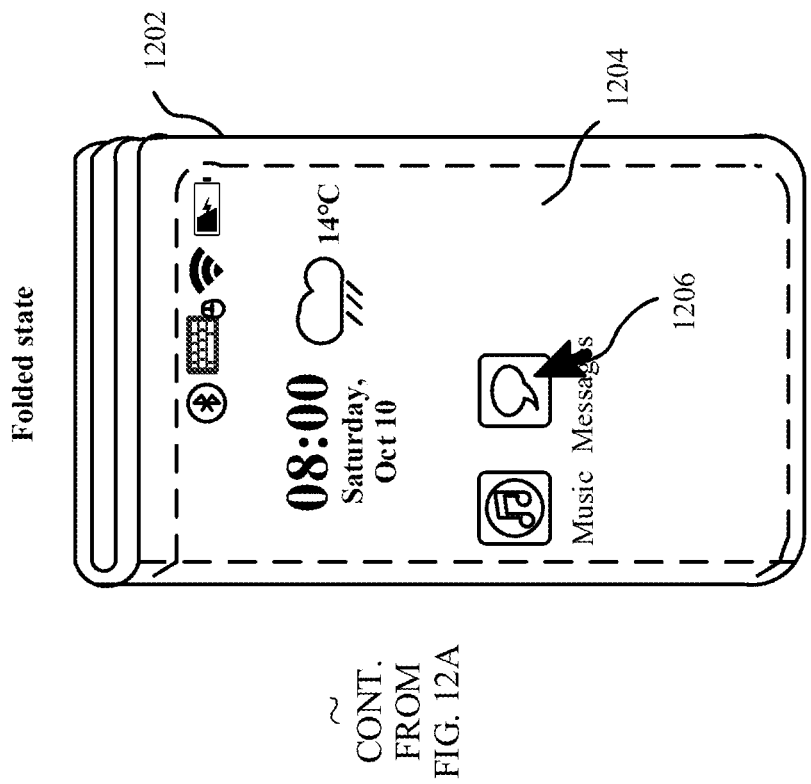

In some embodiments, as shown in FIG. 12A and FIG. 12B, the electronic device 400 is a foldable phone. When a status of the foldable phone changes, for example, when a display changes from an unfolded state to a folded state, a position of a mouse pointer may change accordingly. Refer to the foregoing embodiment. The foldable phone shown in FIG. 12A and FIG. 12B has established a shared input device connection with the electronic device 100, and a user may perform an input on the foldable phone by using an input device (such as a mouse, a keyboard, or a handwriting pad) of the electronic device 100. The unfolded state of the foldable phone means that a first display (large screen) 1201 is in a visible state, and the folded state means that a second display (small screen) 1202 is in a visible state. A size of the first display is greater than a size of the second display. As shown in FIG. 12A and FIG. 12B, in the unfolded state, the first display 1201 displays an interface 1203, and the first display 1201 may be folded along a bent part until edges of two sides of the display are folded and overlap, to display in the folded state. In the folded state, the second display 1202 displays an interface 1204.

As shown in FIG. 12A and FIG. 12B, when the foldable phone is in the unfolded state, a mouse pointer 1205 is displayed in the display interface 1203. If the screen is completely folded, the foldable phone is in the folded state. As the unfolded state changes to the folded state, a layout in the display interface may also change, and a layout of icons, controls, and characters in the interface 1204 is adapted to the folded state. A position of a mouse pointer 1206 in the display interface 1204 may also change accordingly. For example, as shown in FIG. 11, when the foldable phone is in the unfolded state, the mouse pointer 1205 points to an application icon "Messages". After the foldable phone changes to be in the folded state, the mouse pointer 1206 may be redrawn and displayed at a corresponding position of the application icon "Messages" after the layout changes. In this case, an object pointed by the mouse pointer remains unchanged before and after the unfolded/folded state is switched. This is more convenient for the user and provides better user experience. The foregoing examples constitute no limitation on this embodiment of this application, and the position of the mouse pointer may change in a plurality of manners.

With reference to the foregoing embodiments, the following describes a method for sharing an input device according to an embodiment of this application.

Figure 13A:
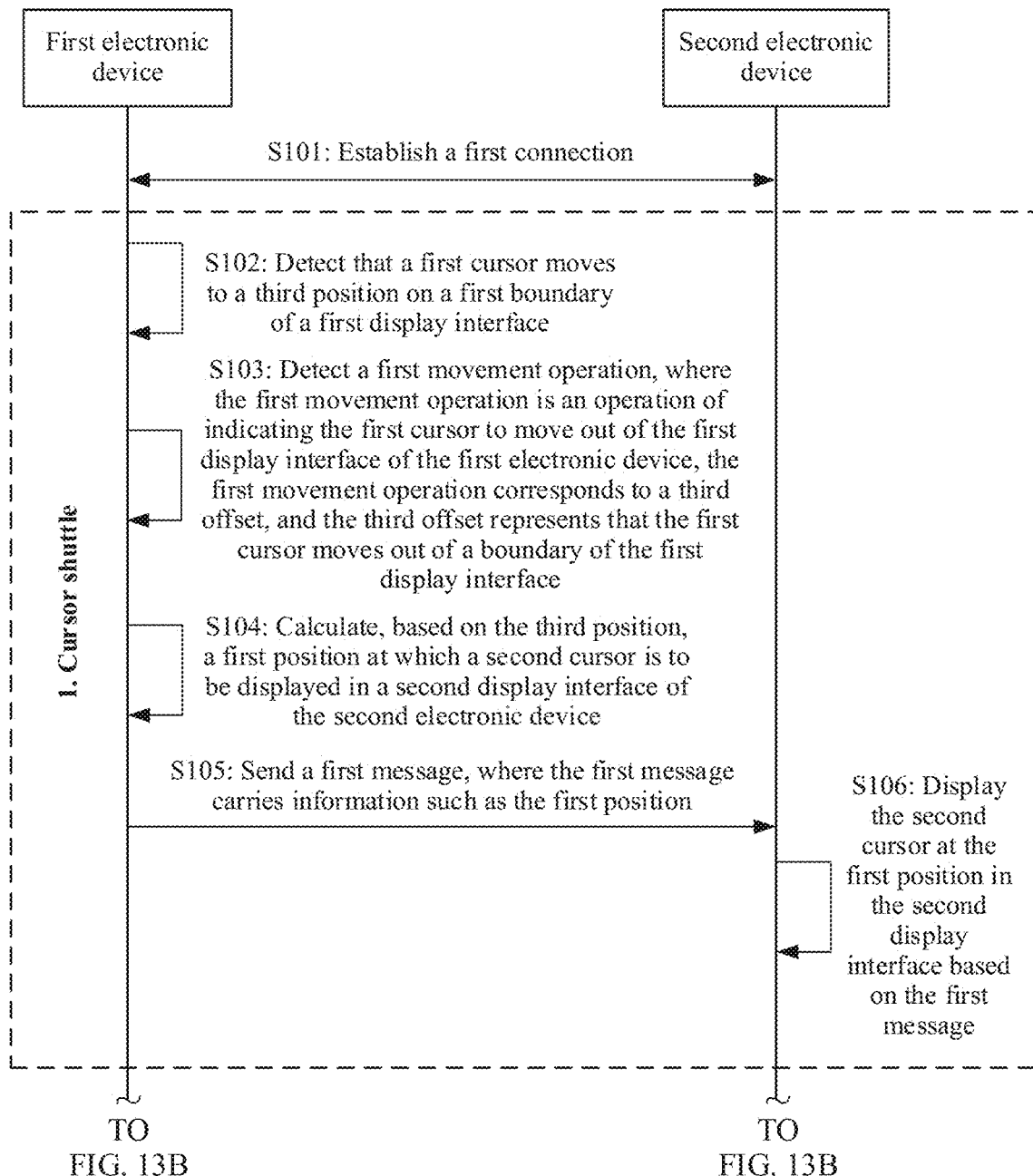
FIG. 13A and FIG. 13B are a flowchart of a method for sharing an input device according to an embodiment of this application.
Figure 13B:
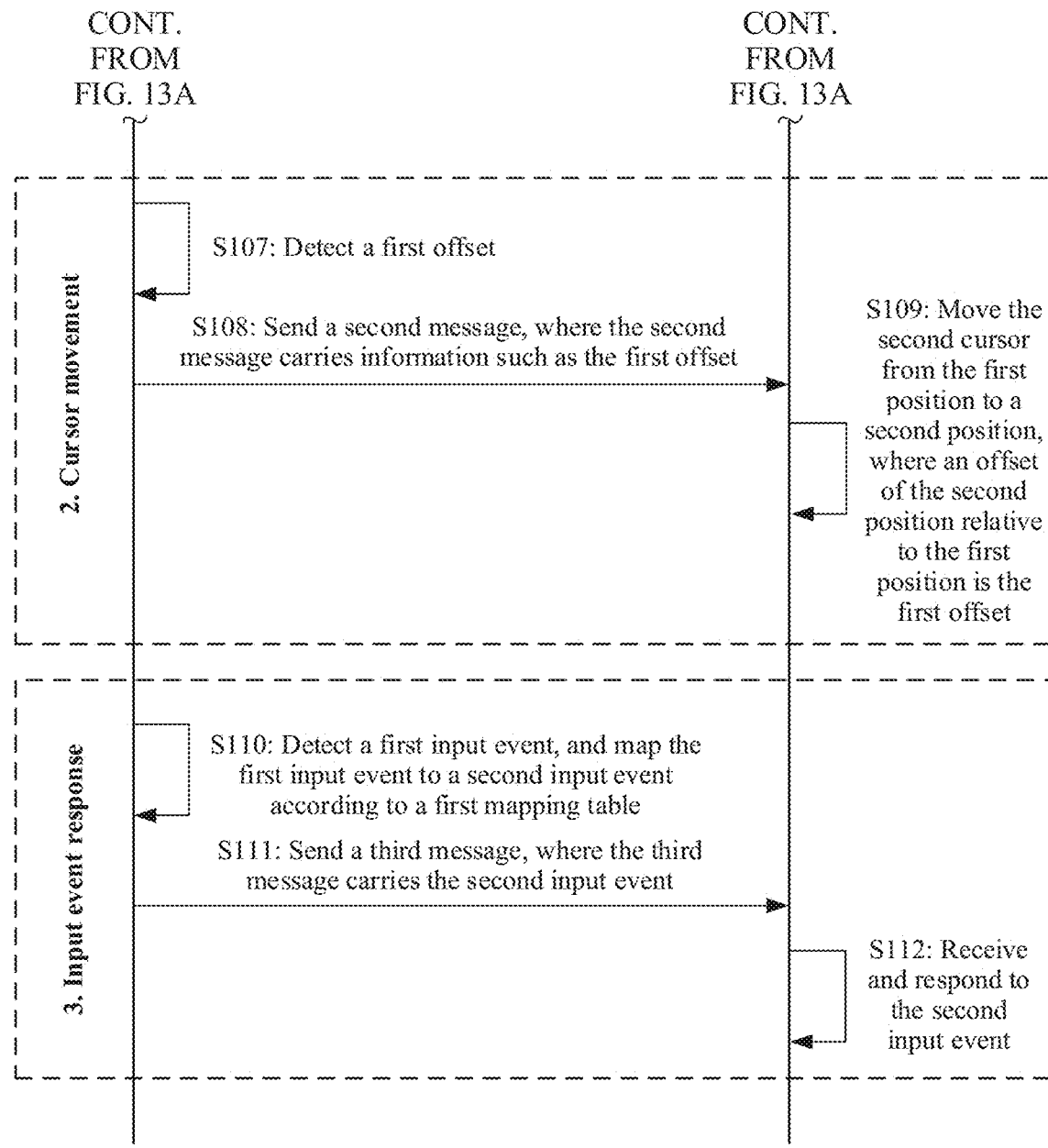

FIG. 13A and FIG. 13B are a flowchart of a method for sharing an input device according to an embodiment of this application. The method may be applied to a first electronic device and a second electronic device. The method may include steps such as cursor shuttle, cursor movement, and input event response. Specific implementation steps are as follows:

S101: The first electronic device establishes a first connection to the second electronic device.

In some embodiments, the first electronic device may be the foregoing electronic device 100 (for example, a PC), the second electronic device may be the foregoing electronic device 200 (for example, a PAD or a mobile phone), and the first electronic device and the second electronic device establish the first connection to form the communication system 10. For a description of the communication system 10, refer to the foregoing embodiment. The first electronic device and the second electronic device may run iOS®, Android®, Windows®, OS®, Linux®, or an operating system of another type. Operating systems of the first electronic device and the second electronic device may be the same or different. This is not limited in this application.

In some embodiments, the first connection may be a wireless connection, for example, a Bluetooth connection or a Wi-Fi connection, or may be a wired connection, for example, a USB connection. A type of the first connection is not limited in this embodiment. A process of establishing the first connection is not limited in this embodiment. In an implementation, the first electronic device and the second electronic device may establish the first connection when touching each other by using an NFC short range communication technology.

The first electronic device may be configured with an input device such as a mouse, a keyboard, and a handwriting pad. After the first electronic device establishes the first connection to the second electronic device, the second electronic device may alternatively use the input device of the first electronic device to perform a content input. The first connection may be a wired connection, for example, a USB connection, or the first connection may be a wireless connection, for example, a Bluetooth connection or a Wi-Fi connection. A type of the first connection is not limited in this embodiment of this application.

In a possible implementation, after the first electronic device establishes the first connection to the second electronic device, the first electronic device may create a virtual screen that is invisible to a user. The virtual screen and a second display interface of the second electronic device have same resolution. The first electronic device creates the virtual screen, so that a mouse pointer or another cursor used to indicate a position may penetrate from an edge of a display interface of the first electronic device, and jumping display between different displays (including the virtual screen) is implemented. If no virtual screen is created or no new external display is connected, the mouse pointer or another cursor used to indicate a position is limited within an edge range of the display interface of the first electronic device. In addition, after the mouse pointer or another indication cursor moves to the virtual screen, because the resolution of the virtual screen is the same as resolution of a display of the second electronic device, coordinates of the mouse pointer on the virtual screen may be directly sent to the second electronic device, and complex coordinate conversion is not required. This is simple and convenient, and reduces CPU resource consumption. For specific descriptions, refer to the foregoing embodiments. Details are not described herein again.

1. Cursor Shuttle (S102 to S106)

S102: The first electronic device detects that a first cursor moves to a third position on a first boundary of a first display interface.

The first cursor is used to indicate a target position in the display interface. For example, the first cursor may be the mouse pointer. The user may control movement of the first cursor by operating a first input device of the first electronic device. For example, when the first input device is a mouse, when the user moves the mouse, the first electronic device may indicate, based on a detected mouse movement direction and distance, the mouse pointer in the display interface to move a specific distance in a corresponding direction. A correspondence between the movement distance of the mouse and the movement distance of the mouse pointer in the display interface may be adjusted in the mouse pointer sensitivity setting. If the first input device is a touchpad or another touch-sensitive panel, the user may control movement of the first cursor by sliding on the touchpad with a finger. Alternatively, the first input device may be a keyboard, and the user may control movement of the first cursor by operating "up, down, left, and right" direction keys. Alternatively, the first input device may be a remote control lever, and the user may control movement of the first cursor by operating the remote control lever. Alternatively, the first input device may be a camera, and movement of the first cursor may be controlled by detecting pupil movement by using the camera. The first input device is not limited in this application.

In this embodiment, the display interface may be a two-dimensional plane interface, and the third position on the first boundary may be represented as two-dimensional coordinates. The first display interface is a display interface for displaying content by the first electronic device. The first display interface does not necessarily cover a display of the first electronic device. In some cases, an aspect ratio of the first display interface may not be consistent with an aspect ratio of the display. In this case, a black area is generated outside the first display interface on the display, and no content is displayed in the black area.

The display interface of the first electronic device may have a plurality of boundaries. For example, a PC, a PAD, and a mobile phone generally have four boundaries. For ease of understanding and description, a display interface in a forward layout facing the user is used as an example, and an upper boundary a lower boundary, a left boundary, and a right boundary may be differentiated. In some embodiments, as shown in FIG. 5B and FIG. 5C, a boundary connection relationship between the display of the first electronic device and the second electronic device/virtual screen may be set. For example, it may be set that the second electronic device/virtual screen is located on the right side of the display of the first electronic device, that is, a right boundary of the display of the first electronic device is connected to a left boundary of the second electronic device/virtual screen. In this case, the first cursor may penetrate from a right boundary of the display interface of the first electronic device, and enter from a corresponding position on a left boundary of an interface of the second electronic device/virtual screen. Certainly, the first cursor may alternatively penetrate from the left boundary of the interface of the second electronic device/virtual screen back to the right boundary of the display interface of the first electronic device. If it is set that the second electronic device/virtual screen is located at a lower side of the display of the first electronic device, that is, a lower boundary of the display of the first electronic device is connected to an upper boundary of the second electronic device/virtual screen, the first cursor may penetrate from a lower boundary of the display interface of the first electronic device, and enter from a corresponding position on an upper boundary of the interface of the second electronic device/virtual screen. Certainly, the first cursor may alternatively penetrate from the upper boundary of the interface of the second electronic device/virtual screen back to the lower boundary of the display interface of the first electronic device. The same applies to other boundary connections. If the first electronic device is connected to a plurality of other devices, generally, to avoid a conflict, the plurality of devices may be correspondingly connected to different boundaries of the display of the first electronic device. For example, if the second electronic device is set to be located on a right side of the first electronic device, a third electronic device may be set to be located below the first electronic device. For specific descriptions, refer to the foregoing embodiments. Details are not described herein again.

In this method embodiment, it may be set that a first boundary of the display interface of the first electronic device and a second boundary of the display interface of the second electronic device are connected, and the connection does not mean that displays of the two electronic devices are leaning against each other. Instead, it indicates that the first cursor may be displayed on the second boundary of the display interface of the second electronic device when the first cursor continues to move along a direction of the first boundary after reaching the first boundary of the display interface of the first electronic device. That is, visually, the first cursor "penetrates" from the first boundary of the first electronic device and then "enters" from the second boundary of the second electronic device, and the first cursor "shuttles" from the display interface of the first electronic device to the display interface of the second electronic device. Similarly, the first cursor may alternatively "penetrate" from the display interface of the second electronic device back to the display interface of the first electronic device. That is, the first cursor may be displayed on the first boundary of the display interface of the first electronic device when the first cursor continues to move along a direction of the second boundary after reaching the second boundary of the display interface of the second electronic device.

S103: The first electronic device detects a first movement operation, where the first movement operation is an operation of indicating the first cursor to move out of the first display interface of the first electronic device, the first movement operation corresponds to a third offset, and the third offset represents that the first cursor moves out of a boundary of the first display interface.

For example, the first movement operation may be moving the mouse by the user. First movement generated by moving the mouse by the user may be converted into the third offset indicating movement of the mouse pointer. The third offset is a vector and includes an offset direction and an offset distance. The third offset represents that the first cursor moves in a first direction. The first direction is a direction that faces outside the boundary of the first display interface. If the first boundary is a right boundary of the first display interface, and the first cursor is located on the first boundary, when it is detected that the direction of the third offset includes a rightward direction component, the first electronic device may perform step S104.

S104: The first electronic device may calculate, based on the third position, a first position at which a second cursor is to be displayed in the second display interface of the second electronic device.

In some embodiments, the first position and the third position may be two-dimensional coordinates. The first electronic device may calculate, based on first resolution of the first display interface, second resolution of the second display interface, and the third position of the first cursor, the first position of the first cursor to appear in the second display interface of the second electronic device. The third position may be a coordinate position on the first boundary of the display interface of the first electronic device, and the first position may be a coordinate position on the second boundary of the display interface of the second electronic device. For some specific calculation methods of how to obtain the first position through calculation based on the third position, refer to the embodiment described in FIG. 4A. Details are not described herein again. Similarly, the second display interface refers to an interface area for displaying content by the second electronic device, and the second display interface may not cover the entire display of the second electronic device.

S105: The first electronic device sends a first message to the second electronic device, where the first message may carry information such as the first position.

The first electronic device may send the first message carrying first position information to the second electronic device, to notify the second electronic device to display the second cursor at the first position. In some other embodiments, the first message may not carry information about a specified position, but only information about notifying to display the second cursor. After receiving a message for displaying the second cursor, the second electronic device may determine a position of the second cursor to be displayed in the second display interface.

S106: The second electronic device displays the second cursor at the first position in the second display interface based on the first message.

After the second electronic device receives the first message, the second electronic device may draw and display the second cursor at the first position. The first position may be a coordinate position on the second boundary of the display interface of the second electronic device, or may be a fixed position. This is not limited in this embodiment.

Correspondingly, the cursor may alternatively "penetrate" from the second display interface of the second electronic device back to the first display interface of the first electronic device. For example, when the second cursor is on the second boundary of the second display interface, the first electronic device detects a third movement operation. The third movement operation is an operation of generating third movement by performing a user operation, the third movement operation is an operation of indicating the second cursor to move out of the second display interface, and the third movement operation corresponds to a second offset. The second offset is used to indicate that the second cursor moves in a second direction, and the second direction is a direction beyond a boundary of the second display interface. Then, the first electronic device may display the first cursor at the third position in the first display interface.

In some embodiments, when the second cursor is displayed in the second display interface, the first cursor is not displayed in the first display interface of the first electronic device, to avoid confusion to the user.

2. Cursor Movement (S107 to S109)

S107: The first electronic device detects a first offset.

In some embodiments, the first electronic device may detect a second movement operation of the user, the second movement operation generates second movement, the second movement corresponds to the first offset, and the first offset is vector coordinates and includes a movement direction and a movement distance. For example, the second movement operation may be that the user controls the mouse to move a specific distance or a finger moves a specific distance on the touchpad, or may be moving the remote control lever, or the like. The second movement operation may indicate the second cursor to move the first offset. In this embodiment, no limitation is imposed on the input device and the type of the input event. Alternatively, the input event that causes cursor movement may be that the camera of the first electronic device detects a gesture operation of the user, eye pupil movement, or the like.

If the first position is a position on a boundary of the second display interface, the first offset generated by the second movement is used to indicate the second cursor to move in a direction in the second display interface.

S108: The first electronic device sends a second message to the second electronic device, where the second message carries information such as the first offset.

The first electronic device sends a second message carrying first offset information to the second electronic device, to notify the second cursor of the second electronic device to generate a displacement of the first offset.

S109: The second electronic device moves the second cursor from the first position to a second position, where an offset of the second position relative to the first position is the first offset.

Because the first electronic device creates the virtual screen that has the same resolution as the second electronic device, when the second electronic device displays the second cursor at the first position in the second display interface, the first cursor moves to a fourth position on the virtual screen. Coordinate values of the fourth position and the first position are the same. When detecting the second movement operation, the second electronic device moves the second cursor from the first position to the second position. At the same time, the first electronic device moves the first cursor from the fourth position to a fifth position. Coordinate values of the fifth position and the second position are the same.

3. Input Event Response (S110 to S112)

Because a first operating system running on the first electronic device may be different from a second operating system running on the second electronic device, when the second cursor is displayed in the display interface of the second electronic device, and when the first electronic device receives an input event from an input device such as a mouse, a keyboard, or a stylus, the first electronic device may convert the input event into a corresponding input event on the second electronic device, and send the input event to the second electronic device. After receiving the input event, the second electronic device may make a corresponding response to the input event. This implements a function that the user performs an input on the second electronic device by using the input device of the first electronic device.

S110: The first electronic device detects a first input event, and may map the first input event to a second input event according to a first mapping table.

The first input event comes from an input operation collected by the first input device of the first electronic device. The first input device may include a mouse, a keyboard, a handwriting pad, a camera, a touchpad, a scanner, a stylus, a remote control lever, a voice input apparatus, and the like. For example, the first input event may be an input event such as clicking a left mouse button, clicking a right mouse button, clicking a middle mouse button, double-clicking a left mouse button, double-clicking a right mouse button, pressing and holding a left mouse button, pressing and holding a right mouse button, sliding a mouse wheel, or tapping a first key of a keyboard, or may be an input event such as voice collection, a stylus, touch and tap, and a combination thereof. This is not limited in this application.

In some embodiments, the first electronic device may store the first mapping table, and the first mapping table may indicate a mapping relationship between a first input event acting on the first electronic device and a second input event acting on the second electronic device. The first electronic device may convert, according to the first mapping table, the obtained first input event of the input device into a corresponding second input event that can act on the second electronic device, and send the second input event to the second electronic device.

For example, the first electronic device such as a PC may map, according to the first mapping table, an input event acting on a Windows® system to an input event acting on a Linux® system, and the second electronic device such as a PAD runs the Linux® system. For example, a left mouse button click event on the Windows® system may be mapped to a click event on the Linux® system, and a right mouse button click event on the Windows® system may be mapped to a touch and hold event on the Linux® system. A key code value of a first key in the Windows® system may be mapped to a corresponding key code value in the Linux® system. For example, for a character "a", a key code value in the Windows® system may be different from a key code value in the Linux® system.

S111: The first electronic device sends a third message to the second electronic device, where the third message carries the second input event.

In some embodiments, the first electronic device may pack the second input event into a data packet that conforms to a transmission protocol format, and then send the data packet to the second electronic device through the first connection (for example, Wi-Fi Direct). Data of the input event may include an occurrence time (time) of the input event, an input event type (type), a code (code) of the input event type, a value (value) of the input event, and the like.

For example, a PAD running the Linux® system has its own input (input) subsystem, configured to manage input events in a unified manner. A uinput implemented based on the input subsystem can conveniently simulate input events in userspace (userspace). The PAD may create, by using the uinput, a virtual device (such as a virtual mouse or a virtual keyboard) and configure attributes of the virtual device, and then write an input event inputevent sequence obtained from the first electronic device such as the PC to a /dev/uinput device file. In this way, the mouse or keyboard of the PC may be used to perform an input on the PAD. For specific descriptions, refer to the foregoing embodiments. Details are not described herein again.

S112: The second electronic device receives and responds to the second input event.

After receiving the second input event, the second electronic device may make a corresponding response to the second input event. For example, music is played in response to a click instruction, an icon is dragged in response to a touch and hold instruction, and a character corresponding to the first key of the keyboard of the first electronic device is displayed.

It may be understood that, with reference to embodiments shown in FIG. 11 and FIG. 12A and FIG. 12B, in some embodiments, when a display interface layout of the second electronic device changes from the second display interface to a third display interface, a position of the second cursor may change from the second position to a sixth position. The second display interface and the third display interface include a same interface element, and resolution of the second display interface is different from resolution of the third display interface. For example, after a tablet computer switches from a landscape mode to a portrait mode, a layout of a display interface changes, but a mouse pointer may point to a same icon before and after the change of the display interface. Alternatively, for example, a foldable screen changes from a folded state to an unfolded state, a size of a display interface of a display changes, and a layout of the display interface also changes. A mouse pointer may be set to point to a same icon before and after the change of the display interface.

In some embodiments, when the second cursor is displayed in the second display interface of the second electronic device, when the second electronic device is screen locked, powered off, screen blank, or restarted, the first cursor may be re-displayed at a position in the first display interface of the first electronic device, to help the user locate and operate the cursor.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used for implementation, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the processes of the methods in embodiments may be implemented by a computer program instructing relevant hardware. The program may be stored in a computer-readable storage medium. When the program runs, the processes in the method embodiments are performed. The foregoing storage medium includes any medium that can store program code, such as a ROM, a random access memory RAM, a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method implemented by a first electronic device, wherein the method comprises:
    establishing a connection to a second electronic device;
    detecting a first movement operation instructing a first cursor to move out of a first display interface of the first electronic device, wherein a first display area of the first display interface has a first resolution;
    sending, to the second electronic device through the connection, a first message notifying the second electronic device to display a second cursor;
    moving, in response to the first movement operation, the first cursor to a virtual screen created by the first electronic device, wherein a second display area of a second display interface of the second electronic device has a second resolution, and wherein a third resolution of the virtual screen is the same as the second resolution;
    detecting a second movement operation controlling the first cursor to move a first offset in the virtual screen; and
    sending, to the second electronic device through the connection, a second message carrying the first offset, wherein the second message notifies the second electronic device to move the second cursor from a first position to a second position,
    wherein a second offset of the second position relative to the first position is the first offset,
    wherein the second position is adjacent a first pixel on the second display, and
    wherein, when the second electronic device is rotated from a landscape orientation to a portrait orientation or vice-versa, the second cursor remains adjacent the first pixel after the rotation.

2. The method of claim 1, further comprising:
    detecting a third movement operation instructing the second cursor to move out of the second display interface; and
    displaying the first cursor at a third position in the first display interface.

3. The method of claim 2, wherein the first position is located on a second boundary of the second display interface, and wherein the third position is located on a first boundary of the first display interface.

4. The method of claim 3, wherein the first display interface comprises a first upper boundary, a first lower boundary, a first left boundary, and a first right boundary in a forward layout, wherein the second display interface comprises a second upper boundary, a second lower boundary, a second left boundary, and a second right boundary in the forward layout, and wherein:
    the first boundary is the first left boundary and the second boundary is the second right boundary;
    the first boundary is the first right boundary and the second boundary is the second left boundary;
    the first boundary is the first upper boundary and the second boundary is the second lower boundary; or
    the first boundary is the first lower boundary and the second boundary is the second upper boundary.

5. The method of claim 1, further comprising:
    detecting, from an input operation collected by an input device of the first electronic device, a first input event when the second cursor is displayed in the second display interface, wherein the input device comprises at least one of a mouse, a keyboard, a handwriting pad, a camera, a touchpad, a scanner, a stylus, a remote control lever, or a voice input apparatus;

mapping, based on a mapping table stored on the first electronic device, the first input event to a second input event, wherein the mapping table stores a mapping relationship between the first input event and the second input event; and sending, to the second electronic device, a third message carrying the second input event.

6. The method of claim 1, wherein after detecting the first movement operation, the method further comprises determining, based on first coordinates of the first cursor in the first display interface, the first resolution, and the second resolution, second coordinates of the first position.

7. The method of claim 6, further comprising:
moving, in response to the first movement operation, the first cursor to a third position on the virtual screen, wherein coordinate values of the third position and the first position are the same; and
moving, in response to the second movement operation, the first cursor from the third position to a fourth position, wherein coordinate values of the fourth position and the second position are the same.

8. A method implemented by a second electronic device, wherein the method comprises:
establishing a connection to a first electronic device;
receiving, from the first electronic device through the connection, a first message that is based on a first movement operation, on the first electronic device, indicating a first cursor to move out of a first display interface of the first electronic device and to a virtual screen, wherein the first display interface has a first resolution;
displaying, based on the first message, a second cursor at a first position in a second display interface of the second electronic device, wherein the second display interface has a second resolution, and wherein the first and second resolutions are different, and wherein a third resolution of the virtual screen is the same as the second resolution;
receiving, from the first electronic device through the connection, a second message carrying a first offset corresponding to a second movement operation on the first electronic device; and
moving the second cursor from the first position to a second position,
wherein a second offset of the second position relative to the first position is the first offset,
wherein the second position is adjacent a first pixel on the second display, and
wherein, when the second electronic device is rotated from a landscape orientation to a portrait orientation or vice-versa, the second cursor remains adjacent the first pixel after the rotation.

9. The method of claim 8, further comprising:
receiving, from the first electronic device, a third offset corresponding to a third movement operation instructing the second cursor to move out of the second display interface; and
canceling, in response to receiving the third offset, displaying of the second cursor.

10. The method of claim 9, wherein cancelling displaying of the second cursor enables the first electronic device to display the first cursor at a third position in the first display interface.

11. The method of claim 10, wherein the first position is located on a second boundary of the second display interface, and wherein the third position is located on a first boundary of the first display interface.

12. The method of claim 11, wherein the first display interface comprises a first upper boundary, a first lower boundary, a first left boundary, and a first right boundary in a forward layout, wherein the second display interface comprises a second upper boundary, a second lower boundary, a second left boundary, and a second right boundary in the forward layout, and wherein:
the first boundary is the first left boundary and the second boundary is the second right boundary;
the first boundary is the first right boundary and the second boundary is the second left boundary;
the first boundary is the first upper boundary and the second boundary is the second lower boundary; or
the first boundary is the first lower boundary and the second boundary is the second upper boundary.

13. The method of claim 8, further comprising:
displaying the second cursor in the second display interface; and
receiving, from the first electronic device, through the connection, and in response to displaying the second cursor in the second display interface, a third message carrying a second input event, wherein the second input event is mapped to a first input event based on a mapping table of the first electronic device, wherein the first mapping table stores a mapping relationship between the first input event and the second input event, wherein the first input event is based on an input operation collected by an input device of the first electronic device, and wherein the input device comprises one or more of a mouse, a keyboard, a handwriting pad, a camera, a touchpad, a scanner, a stylus, a remote control lever, or a voice input apparatus.

14. A first electronic device comprising:
a display comprising a first display interface, wherein a first display area of the first display interface has a first resolution; and
one or more processors coupled to the display and configured to:
establish a connection to a second electronic device, wherein a second display area of a second display interface of the second electronic device has a second resolution;
detect a first movement operation instructing a first cursor to move out of the first display interface;
send, to the second electronic device through the connection, a first message notifying the second electronic device to display a second cursor;
move, in response to the first movement operation, the first cursor to a virtual screen created by the first electronic device, wherein a second display area of a second display interface of the second electronic device has a second resolution, and wherein a third resolution of the virtual screen is the same as the second resolution;
detect a second movement operation controlling the first cursor to move a first offset in the virtual screen; and
send, to the second electronic device through the connection, a second message carrying the first offset,
wherein the second message notifies the second electronic device to move the second cursor from a first position to a second position,
wherein a second offset of the second position relative to the first position is the first offset,
wherein the second position is adjacent a first pixel on the second display, and wherein, when the second electronic device is rotated from a landscape orientation to a portrait orientation or vice-versa, the second cursor remains adjacent the first pixel after the rotation.

15. The first electronic device of claim 14, wherein the one or more processors are further configured to:
detect a third movement operation instructing the second cursor to move out of the second display interface; and
display, in response to the third movement operation, the first cursor at a third position in the first display interface.

16. The first electronic device of claim 15, wherein the first position is located on a second boundary of the second display interface, and wherein the third position is located on a first boundary of the first display interface.

17. The first electronic device of claim 16, wherein the first display interface comprises a first upper boundary, a first lower boundary, a first left boundary, and a first right boundary in a forward layout, wherein the second display interface comprises a second upper boundary, a second lower boundary, a second left boundary, and a second right boundary in the forward layout, and wherein:
the first boundary is the first left boundary and the second boundary is the second right boundary;
the first boundary is the first right boundary and the second boundary is the second left boundary;
the first boundary is the first upper boundary and the second boundary is the second lower boundary; or
the first boundary is the first lower boundary and the second boundary is the second upper boundary.

18. The first electronic device of claim 14, wherein the one or more processors are further configured to:
detect, from an input operation collected by an input device of the first electronic device, a first input event when the second cursor is displayed in the second display interface, wherein the input device comprises at least one of a mouse, a keyboard, a handwriting pad, a camera, a touchpad, a scanner, a stylus, a remote control lever, or a voice input apparatus;
map, based on a mapping table stored on the first electronic device, the first input event to a second input event, wherein the mapping table stores a mapping relationship between the first input event and the second input event; and
send, to the second electronic device, a third message carrying the second input event.

19. The first electronic device of claim 14, wherein after detecting the first movement operation, the one or more processors are further configured to determine, based on first coordinates of the first cursor in the first display interface, the first resolution, and the second resolution, second coordinates of the first position.

20. The first electronic device of claim 19, wherein the one or more processors are further configured to:
move, in response to the first movement operation, the first cursor to a third position on the virtual screen, wherein first coordinate values of the third position and the first position are the same; and
move, in response to the second movement operation, the first cursor from the third position to a fourth position, wherein second coordinate values of the fourth position and the second position are the same.

* * * * *